United States Patent
Soni et al.

(10) Patent No.: US 11,400,859 B2
(45) Date of Patent: Aug. 2, 2022

(54) SYSTEM AND METHOD FOR PROVIDING VEHICLE ALERTS

(71) Applicant: Neapco Intellectual Property Holdings, LLC, Farmington Hills, MI (US)

(72) Inventors: Kiran Natwerlal Soni, Rochester Hills, MI (US); John Ogger, Farmington Hills, MI (US); Alia Comai, Northville, MI (US); Phil Kennedy, Farmington Hills, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 0 days.

(21) Appl. No.: 17/091,137

(22) Filed: Nov. 6, 2020

(65) Prior Publication Data
US 2021/0138959 A1 May 13, 2021

Related U.S. Application Data

(60) Provisional application No. 62/931,870, filed on Nov. 7, 2019.

(51) Int. Cl.
*B60Q 9/00* (2006.01)
*B60Q 5/00* (2006.01)
*G08G 1/16* (2006.01)

(52) U.S. Cl.
CPC .............. *B60Q 9/00* (2013.01); *B60Q 5/006* (2013.01); *G08G 1/16* (2013.01)

(58) Field of Classification Search
CPC ........ B60K 28/10; B60K 28/12; B60Q 5/005; B60Q 5/006; B60Q 9/00; B60Q 9/008; B60W 2050/143; B60W 2520/10; B60W 2540/01; B60W 2540/06; B60W 2540/16; B60W 2554/20; B60W 2554/40; B60W 2554/4029; B60W 2554/80; B60W 50/14; G08G 1/005; G08G 1/16; G08G 1/166
See application file for complete search history.

(56) References Cited

U.S. PATENT DOCUMENTS

| 8,892,302 B1 | 11/2014 | McDonald | |
|---|---|---|---|
| 2011/0128161 A1* | 6/2011 | Bae | B60Q 5/006 340/901 |

(Continued)

FOREIGN PATENT DOCUMENTS

EP 2944516 A1 11/2015

*Primary Examiner* — Omer S Khan
(74) *Attorney, Agent, or Firm* — Dickinson Wright PLLC

(57) ABSTRACT

A method for providing vehicle alerts includes receiving an ignition signal indicating a current status of an ignition of a vehicle and receiving a gear position signal indicating a current gear position of a transmission of the vehicle. The method also includes receiving a vehicle speed signal indicating a current vehicle speed of the vehicle and identifying a vehicle alert data file based on at least the ignition signal, the gear position signal, the vehicle speed signal. The method also includes retrieving the vehicle alert data file from a vehicle alert database and loading data associated with the vehicle alert data file into a buffer. The method also includes outputting contents of the buffer to at least one output device of the vehicle.

16 Claims, 38 Drawing Sheets

(56) References Cited

U.S. PATENT DOCUMENTS

| | | | |
|---|---|---|---|
| 2012/0050021 A1* | 3/2012 | Rao | B60R 99/00 |
| | | | 340/425.5 |
| 2012/0126969 A1 | 5/2012 | Wilbur et al. | |
| 2013/0042176 A1 | 2/2013 | Polehna et al. | |
| 2013/0214920 A1* | 8/2013 | Konet | B60Q 5/008 |
| | | | 340/466 |
| 2015/0054642 A1 | 2/2015 | Carruthers | |
| 2015/0314726 A1* | 11/2015 | Massimo | G08B 13/2491 |
| | | | 340/463 |
| 2017/0016266 A1* | 1/2017 | Van Wiemeersch | B60K 37/06 |
| 2018/0222384 A1 | 8/2018 | Dudar | |
| 2019/0359128 A1* | 11/2019 | Harper | B60Q 5/006 |

* cited by examiner

SYSTEM AND METHOD FOR PROVIDING VEHICLE ALERTS

CROSS-REFERENCES TO RELATED APPLICATIONS

This patent application claims priority to U.S. Provisional Patent Application Ser. No. 62/931,870, filed Nov. 7, 2019 which is incorporated herein by reference in its entirety.

TECHNICAL FIELD

This disclosure relates to vehicles and in particular to systems and methods for providing vehicle alerts.

BACKGROUND

Vehicles, such as cars, trucks, sport utility vehicles, crossovers, mini-vans, light vehicles, heavy duty commercial vehicles, buses, vocational vehicles, two and three wheeled vehicles, all-terrain vehicles, construction and agriculture equipment, autonomous vehicles, fleet vehicles, or other suitable vehicles, are increasingly providing more information to an operator, such as a driver or a vehicle occupant, of the vehicle.

Such information is typically provided by visual or audio indications. For example, the vehicle may include one or more displays that provide visual indications of the information and/or one or our audio output devices that provide audio indications of the information.

SUMMARY

This disclosure relates generally to providing vehicle alerts.

An aspect of the disclosed embodiments includes a system for providing vehicle alerts. The system includes a processor and a memory. The memory includes instructions that, when executed by the processor, cause the processor to: receive various input data; analyze the various input data; generate one or more output signals based on the analysis of the various input data; and selectively control one or more acoustic output devices using the one or more output signals.

Another aspect of the disclosed embodiments includes a system for providing vehicle alerts. The system includes a processor and a memory. The memory includes instructions that, when executed by the processor, cause the processor to: receive an ignition signal indicating a current status of an ignition of a vehicle; receive a gear position signal indicating a current gear position of a transmission of the vehicle; receive a vehicle speed signal indicating a current vehicle speed of the vehicle; identify a vehicle alert data file based on at least the ignition signal, the gear position signal, the vehicle speed signal; retrieve the vehicle alert data file from a vehicle alert database; load data associated with the vehicle alert data file into a buffer; and output contents of the buffer to at least one output device of the vehicle.

Another aspect of the disclosed embodiments includes a method for providing vehicle alerts. The method may include receiving an ignition signal indicating a current status of an ignition of a vehicle and receiving a gear position signal indicating a current gear position of a transmission of the vehicle. The method may also include receiving a vehicle speed signal indicating a current vehicle speed of the vehicle and identifying a vehicle alert data file based on at least the ignition signal, the gear position signal, the vehicle speed signal. The method may also include retrieving the vehicle alert data file from a vehicle alert database and loading data associated with the vehicle alert data file into a buffer. The method may also include outputting contents of the buffer to at least one output device of the vehicle.

Another aspect of the disclosed embodiments includes a vehicle alert system. The vehicle alert system includes a processor and a memory. The memory includes instructions that, when executed by the processor, cause the processor to: receive an ignition signal indicating a current status of an ignition of a vehicle; receive a gear position signal indicating a current gear position of a transmission of the vehicle; identify a vehicle alert data file based on at least the ignition signal and the gear position signal; load data associated with the vehicle alert data file into a buffer; output contents of the buffer to at least one output device of the vehicle; and clear the contents of the buffer.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
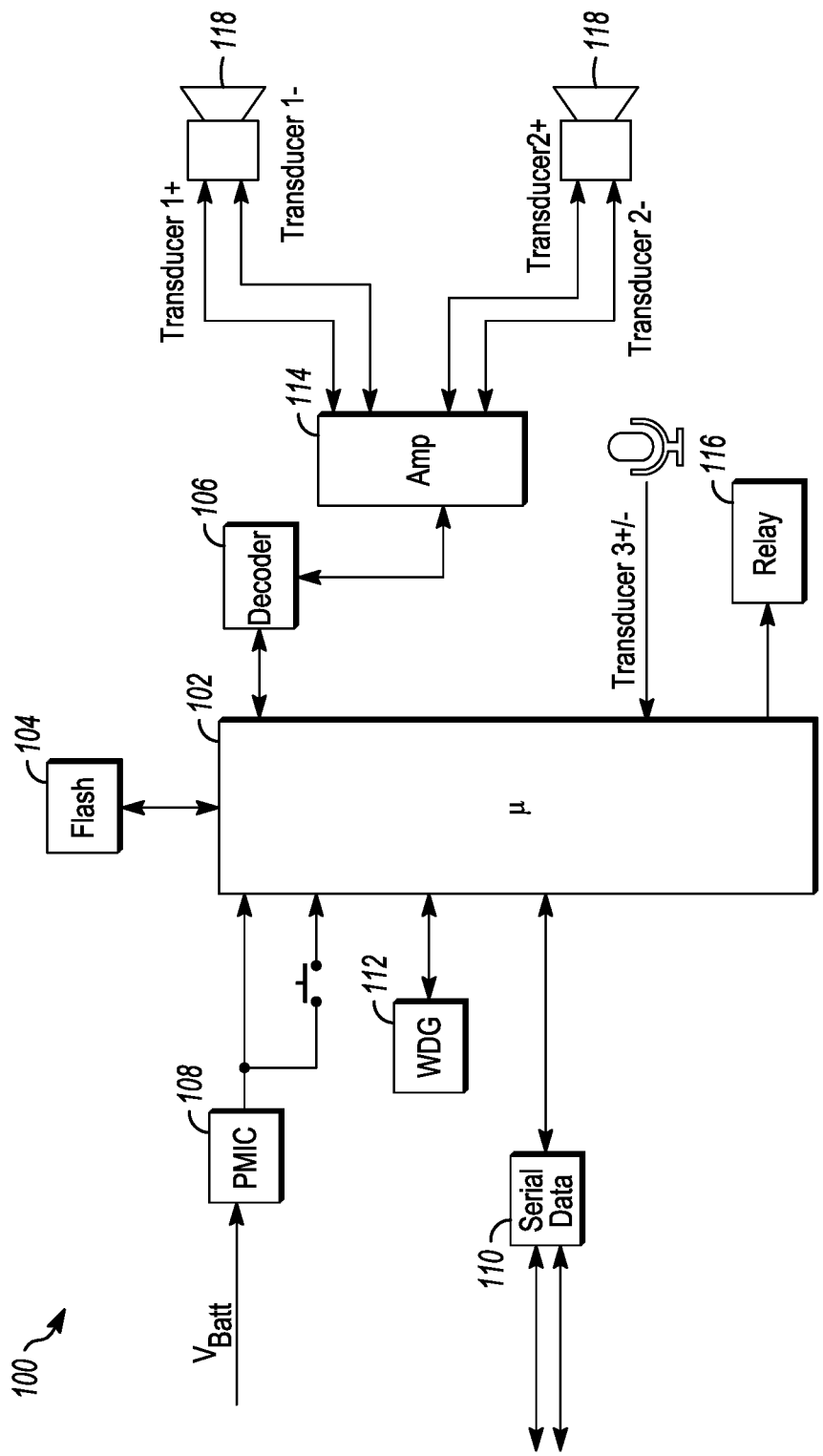
FIG. 1 generally illustrates a vehicle alert system according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, light vehicles, heavy-duty commercial vehicles, buses, vocational vehicles, two and three wheeled vehicles, all-terrain vehicles, construction and agriculture equipment, autonomous vehicles, fleet vehicles, or other suitable vehicles, are increasingly providing more information to an operator, such as a driver or a vehicle occupant, of the vehicle.

Such information is typically provided by visual or audio indications. For example, the vehicle may include one or more displays that provide visual indications of the information and/or one or our audio output devices that provide audio indications of the information. However, typical vehicles do not include or provide a flexible or customizable method to convey audible information on the exterior of a vehicle to pedestrians or other operators of other vehicles.

Accordingly, systems and methods, such as those described herein, that are configured to receive input (either vehicle bus data or direct driver interaction) and generate audible information based on that input, may be desirable. In some embodiments, a system, according to the principles of the present disclosure, may include an electronic controller and one or more audio output devices, such as speakers or other suitable audio output devices. Audible information may include: a horn sound (e.g., the controller may generate horn sound based on customer input); pedestrian alert sound and/or vehicle present sound (e.g., the controller may generate a sound at low speeds to warn pedestrians of the vehicle approaching); walk-up greeting sound (e.g., the controller may generate a pleasing welcoming sound when controller detects that the operator is approaching); vehicle alarm (e.g., the controller may generate alarm sound when intrusion is detected); charge status (e.g., the controller may generate charge sound when the vehicle is charging); tire pressure warning (e.g., the controller may generate external sound during tire inflation when optimum pressure is achieved); tire inflate status (e.g., the controller may generate a sound to denote tires are inflating and/or deflating); door lock and/or unlock sound (e.g., the controller may generate a sound to denote that doors of the vehicle are locked or unlocked); lift gate open and/or close sound (e.g., the controller may generate a sound to denote lift gate is opening or closing or an object is blocking a mechanism of the lift gate); window open alert (e.g., the controller may generate a sound to denote a window is open); sunroof open alert (e.g., the controller may generate a sound to denote a sunroof of the vehicle is open); trunk close sound (e.g., the controller may generate a sound to denote a trunk is ajar); siren (e.g., the controller may generate a siren sound, such as for police or emergency vehicles); hood ajar alarm (e.g., the controller may generate a sound to denote a hood is ajar); rear occupant alarm (e.g., the controller may generate a sound to denote occupant left in one or more back seats open); noise cancellation, such as music, engine, tire, voice, "stealth mode" for police vehicles (e.g., the controller may generate a phased sound to cancel or mask ambient noise); powertrain sound enhancement (e.g., the controller may generate a sound to mimic desired engine sounds); directional warnings for turning (e.g., the controller may generate directional sounds to denote vehicle turning); music, such as playing music from an auxiliary input (e.g., the controller may generate music output); back up warning (e.g., the controller may generate a sound to denote vehicle is backing up); audible warnings for autonomous fleet vehicles (e.g., the controller may generate sounds for passenger boarding and/or deboarding, left objects, vehicle approaching/leaving, etc.); suspicious sound detection, such as broken glass, bending and/or hammering metal (e.g., the controller may detect sounds of possible intrusion and reports to vehicle); pa system and/or loudspeaker (e.g., the controller may generate audio from an auxiliary source); road surface detection, such as road type, pothole detection, snow, rain, ice, etc. (e.g., the controller may detect pavement type or surface conditions based on acoustic feedback); binaural audio (e.g., the controller may use two speakers to generate constructive or destructive interferences in order to enhance or mask sounds); sensing vehicle component status (e.g., the controller may detect component condition with respect to potential failure based on acoustic feedback) text to speech (e.g., the controller may generate audible speech from a secondary source); distress signal for assistance (e.g., the controller may generate a siren sound to alert bystanders that assistance is needed; customizable vehicle locator sound (e.g., the controller may generate sounds to help detect the vehicle in a crowded area); other suitable audio output; or a combination thereof.

In some embodiments, the systems and methods described herein may be configured to receive various input data. The systems and methods described herein may be configured to analyze the various input data. The systems and methods described herein may be configured to generate one or more output signals based on the analysis of the various input data. The systems and methods described herein may be configured to selectively control one or more acoustic output devices using the one or more output signals.

FIG. 1 generally illustrates a system 100 according to the principles of the present disclosure. The system 100 may be configured to provide audio (e.g., audible) alerts in response to receiving various input data, as will be described. The system 100 may be embedded in vehicle. The vehicle may include any suitable vehicle, such as those described herein. The vehicle may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. The vehicle may include any suitable number of wheels, such as 1, 2, 3, 4, or any other suitable number of wheels. The vehicle may include any suitable features in addition to or other than those described herein.

In some embodiments, the vehicle may include a petrol or gasoline fuel engine, such as a spark ignition engine. In some embodiments, the vehicle may include a diesel fuel engine, such as a compression ignition engine. The vehicle may include automatic vehicle propulsion systems, such as a cruise control, an adaptive cruise control, automatic braking control, other automatic vehicle propulsion systems, or a combination thereof. The vehicle may be an autonomous or semi-autonomous vehicle, or other suitable type of vehicle. The vehicle may include additional or fewer features than those generally illustrated and/or disclosed herein.

In some embodiments, the system 100 includes controller 102. The controller 102 may include any suitable controller, such as an electronic control unit or other suitable controller. The controller 102 may include a processor. The processor may include any suitable processor, such as those described herein. Additionally, or alternatively, the controller 102 may include any suitable number of processors. The controller 102 may be in communication with a memory 104. Additionally, or alternatively, the controller 102 may include the memory 104. The memory 104 may include any suitable memory, such as those described here, including flash or other non-volatile memory. The memory 104 may include any suitable memory structure, such as a memory array, or other suitable memory structure. The memory 104 may be disposed within the vehicle and/or may include one or more portions of the memory 104 may disposed external to the vehicle, such as in remote cloud or server computing system.

In some embodiments, the memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof.

In some embodiments, the memory 104 may include instructions that, when executed by the processor of the controller 102, may cause the processor to receive an ignition signal indicating a current status of an ignition of a vehicle. The instructions may further cause the processor to receive a gear position signal indicating a current gear position of a transmission of the vehicle. The instructions may further cause the processor to receive a vehicle speed signal indicating a current vehicle speed of the vehicle. The instructions may further cause the processor to identify a vehicle alert data file based on at least the ignition signal, the gear position signal, the vehicle speed signal. The instructions may further cause the processor to retrieve the vehicle alert data file from a vehicle alert database. The instructions may further cause the processor to load data associated with the vehicle alert data file into a buffer. The instructions may further cause the processor to output contents of the buffer to at least one output device of the vehicle.

In some embodiments, the memory 104 may include instructions that cause the processor to perform the various methods described herein.

The system 100 may include a power management integrated circuit (PMIC) 108. The PMIC 108 may be configured to provide power management to the system 100. The system may include a WatchDog WDG 112. The WDG 112 may include a time, such as an external timer that may monitor the status of the controller 102 and may initiate a reset in appropriate situations. The system 100 may include a relay 116. The relay 116 may include any suitable relay, a combination, or various relays.

In some embodiments, the controller 102 receives various sensor data from one or more sensors disposed throughout (e.g. within and external to) the vehicle. The various sensor data may be communicated as serial data 110 to the controller 102. The serial data 110 may be communicated to the controller 102 via any suitable communication network or line, such as wireless network, wired network, via a bus, such as a CAN bus, LIN bus, WAN bus, or other suitable bus, or other suitable network or communication line, or a combination thereof. The controller 102 may be configured to analyze the various sensor data and, for example, generate one or more output signals that indicate an alert corresponding to the various sensor data. The controller 102 may be configured to selectively control to one or more input/output devices 118 based on the output signals. The input/output devices 118 may include one or more speakers and one or more microphones. The input/output devices 118 may include any suitable input and/or output device, such as a horn or horns or other suitable input and/or output device.

The controller 102 may communicate the output signals to a decoder 106. The decoder 106 may include any suitable decoder and may be configured to decode the output signals. The decoder 106 may communicate the decoded output signals to an amplifier 114.

The amplifier 114 may include any suitable amplifier and may be configured to amplify the decoded output signals. The amplifier 114 may communicate the amplified decoded output signals to the one or more input/output device 118. The one or more input/output devices 118 may be configured to output an audible signal based on the amplified decoded output signals. In some embodiments, the input/output devices 118 are configured to receive audible or other suitable input from an environment proximate to the vehicle. The input/output devices 118 may be configured to communicate the input to the controller 102.

In some embodiments, the system 100 may be configured to provide a flexible sound design and may be configured to multiple different sounds, such as up to 26 different sounds or any other suitable number of different sources, used by the system 100 to generate attractive dynamic sounds, such as: pedestrian alert; horn short press; horn long press; alarm; siren; rear occupant detected; distress signal; welcome approach; charging status; low tire pressure; tire inflating; maintenance alert; door lock/unlock; lift gate open/closed; window open alert; sunroof open alert; trunk/hatch open; trunk/hatch closed; trunk left open; powertrain sound enhancement; music; directional turn warning; back up warning; autonomous fleet warnings; pa system/loudspeaker; hood ajar; other suitable, or a combination thereof.

In some embodiments, the system 100 may perform the methods described herein. However, the methods described herein as performed by system 100 are not meant to be limiting, and any type of software executed on a controller can perform the methods described herein without departing from the scope of this disclosure. For example, a controller, such as a processor executing software within a computing device, can perform the methods described herein.

Figure 2:
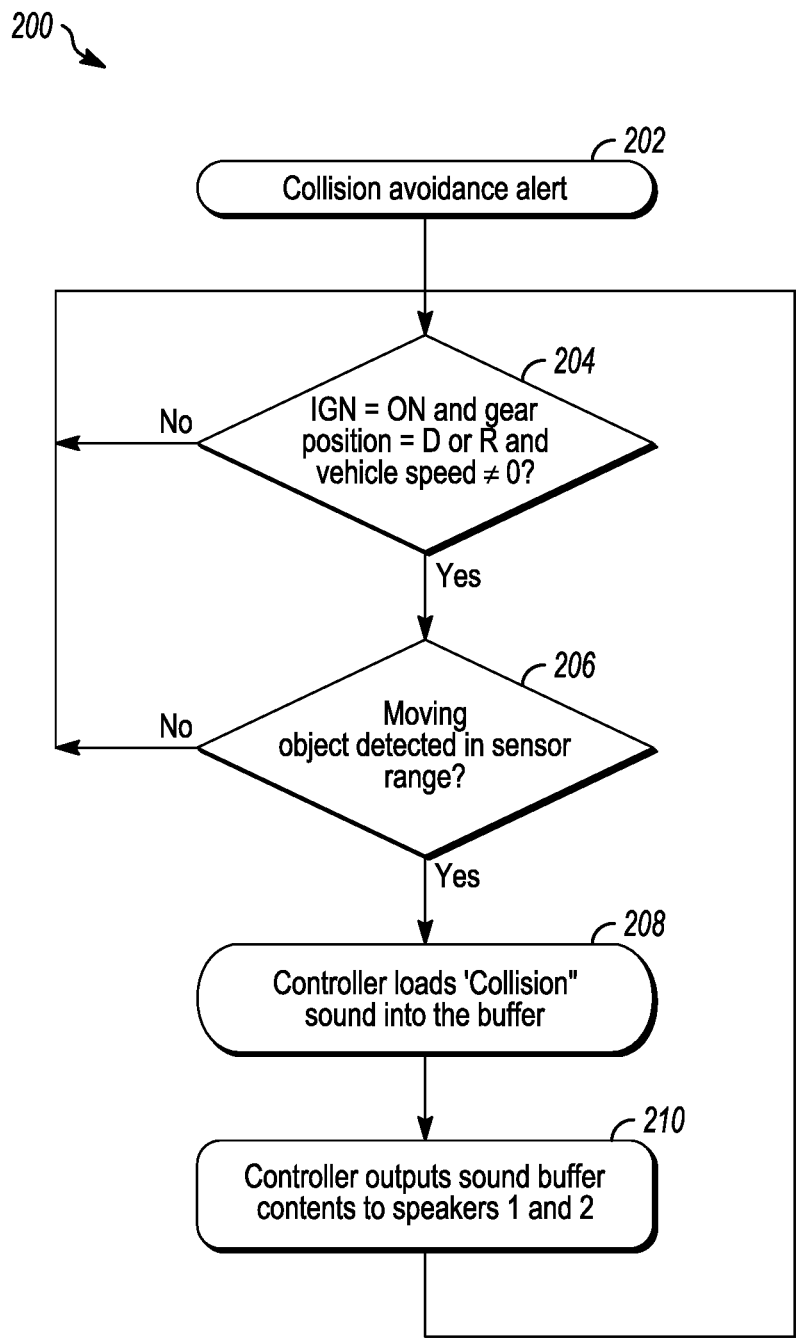
FIG. 2 is a flow diagram generally illustrating a vehicle alert generation method according to the principles of the present disclosure.

FIG. 2 is a flow diagram generally illustrating a vehicle alert generation method 200 according to the principles of the present disclosure. The method 200 may be configured to warn others that a collision may be imminent. At 202, the method 200 begins. At 204, the method 200 determines if the ignition is on, the gear position is in 'D' or 'R' and the vehicle speed is not equal to zero. For example, the system 100 determines if the ignition is on, the gear position is in 'D' or 'R', and the vehicle speed is not equal to zero based on the various sensor data. It should be understood that, in some embodiments of the vehicle, 'D' may refer to a drive gear, a proposition position, or other suitable position or gear configured to propel the vehicle forward. Additionally, or alternatively, 'R' may refer to a reverse gear, a reverse propulsion position, or other suitable position or gear configured to propel the vehicle backward. If false, the method 200 continues at 204. If true, the method 200 continues at 206. At 206, the method 200 determines if the there is a moving object detected within sensor range. For example, the system 100 determines whether a moving object is in sensor range based on the various sensor data. If false, the method 200 continues at 204. If true, the method 200 continues at 208. At 208, the method 200 loads a collision sound into the buffer. For example, the system 100 loads the collision sound into the buffer. The collusion sound may include and/or be referred to as a vehicle alert data file. At 210, the method 200 outputs the sound buffer contents. For example, the system 100 outputs the sound buffer contents to the devices 118.

Figure 3:
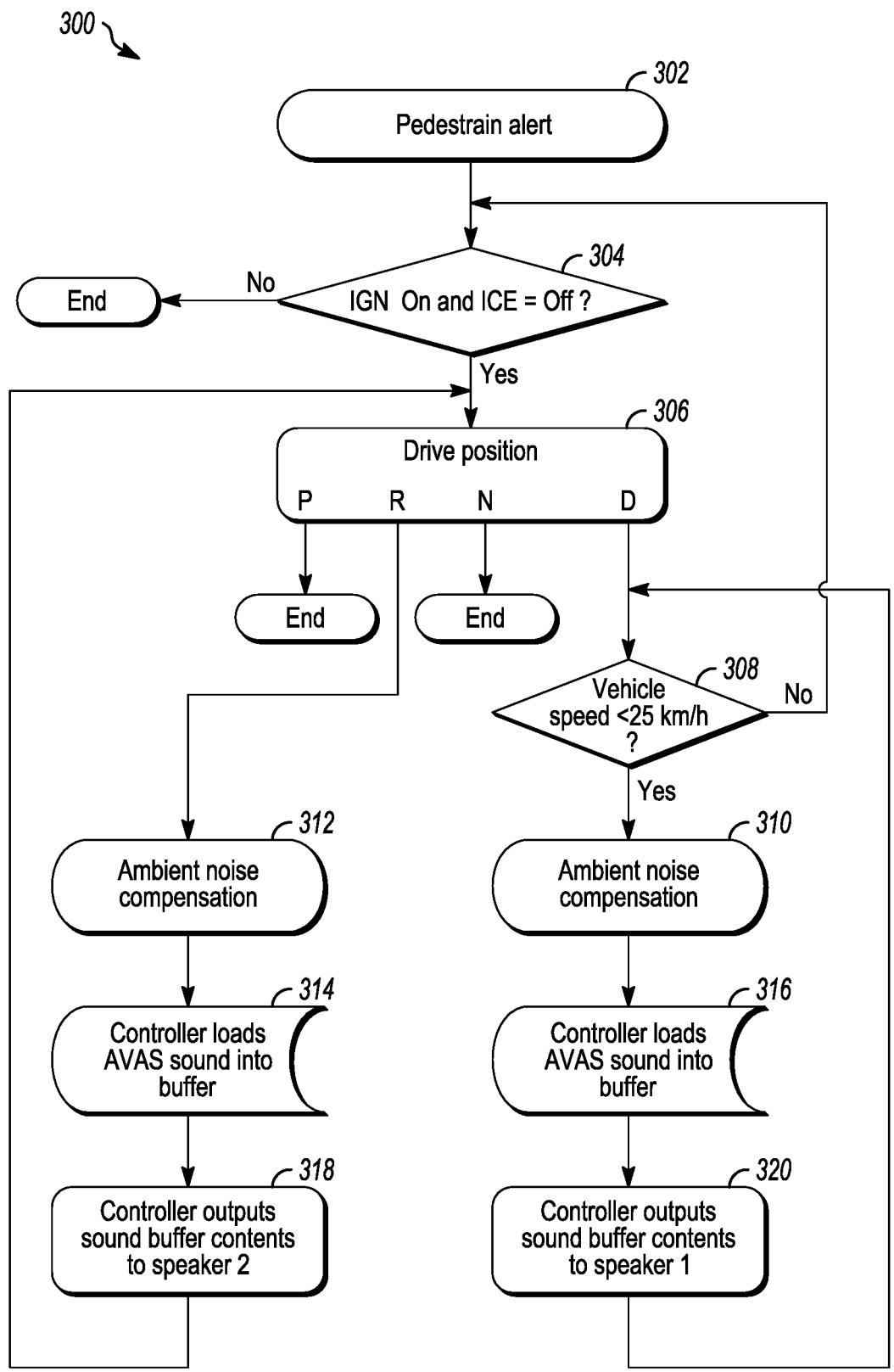
FIG. 3 is a flow diagram generally illustrating an alternative vehicle alert generation method according to the principles of the present disclosure.

FIG. 3 is a flow diagram generally illustrating a vehicle alert generation method 300 according to the principles of the present disclosure. The method 300 may be configured to alert pedestrians and bystanders that an electric vehicle is approaching, maneuvering, or leaving their vicinity. At 302, the method 300 begins. At 304, the method 300 determines whether an ignition and an engine/motor of the vehicle are both off. For example, the system 100 determines whether the ignition and the engine/motor of the vehicle are off based on the various sensor data. If the system 100 determines that the ignition and the engine/motor are both off, the method 300 ends. If the system 100 determines that the ignition and the engine/motor are both on, the method 300 continues at 306. At 306, the method 300 determines a drive or propulsion position (e.g., the drive or propulsion position may be referred to as any suitable position configured to propel the vehicle forward) of the vehicle. For example, the system 100 determines whether the vehicle is in park, reverse, neutral or drive based on the various sensor data. If the system 100 determines that the vehicle is in park or neutral, the method 300 ends. If the system 100 determines that the vehicle is in drive, the method 300 continues at 308. If the system 100 determines that the vehicle is in reverse, the method 300 continues at 312. In some embodiments, the vehicle may include an alternative fuel system, such as Hybrid, EV, Fuel Cell or other suitable alternative fuel system. The vehicle may use an alternate method of drive designations other than Part, Neutral, Drive, and Reverse. Such alternate designations may be used interchangeably (e.g., propulsion instead of drive).

At 312, the method 300 applies an ambient noise compensation. For example, the system 100 determines the loudness of the sound based on the various sensor data. At 314, the method 300 loads a sound into a buffer. For example, the system 100 loads a sound corresponding to a pedestrian alert into a buffer associated with the system 100. At 318, the method 300 outputs the sound buffer contents. For example, the system 100 outputs the sound in the buffer to the devices 118 (e.g., speakers). At 308, the method 300 determines whether the vehicle speed is below a threshold. For example, the system 100 determines whether the vehicle speed is less than 25 kilometers per hour, or other suitable speed, based on the various sensor data. If the system 100 determines that the vehicle speed is greater than the threshold, the method 300 continues at 304. If the system 100 determines that the vehicle speed is less than the threshold, the method 300 continues at 310. At 310, the method 300 applies an ambient noise compensation. For example, the system 100 determines the loudness of the sound based on the various sensor data. At 316, the method 300 loads a sound into a buffer. For example, the system 100 loads a sound corresponding to a pedestrian alert into the buffer. At 320, the method 300 outputs the sound buffer contents. For example, the system 100 outputs the sound in the buffer to the devices 118.

Figure 4:
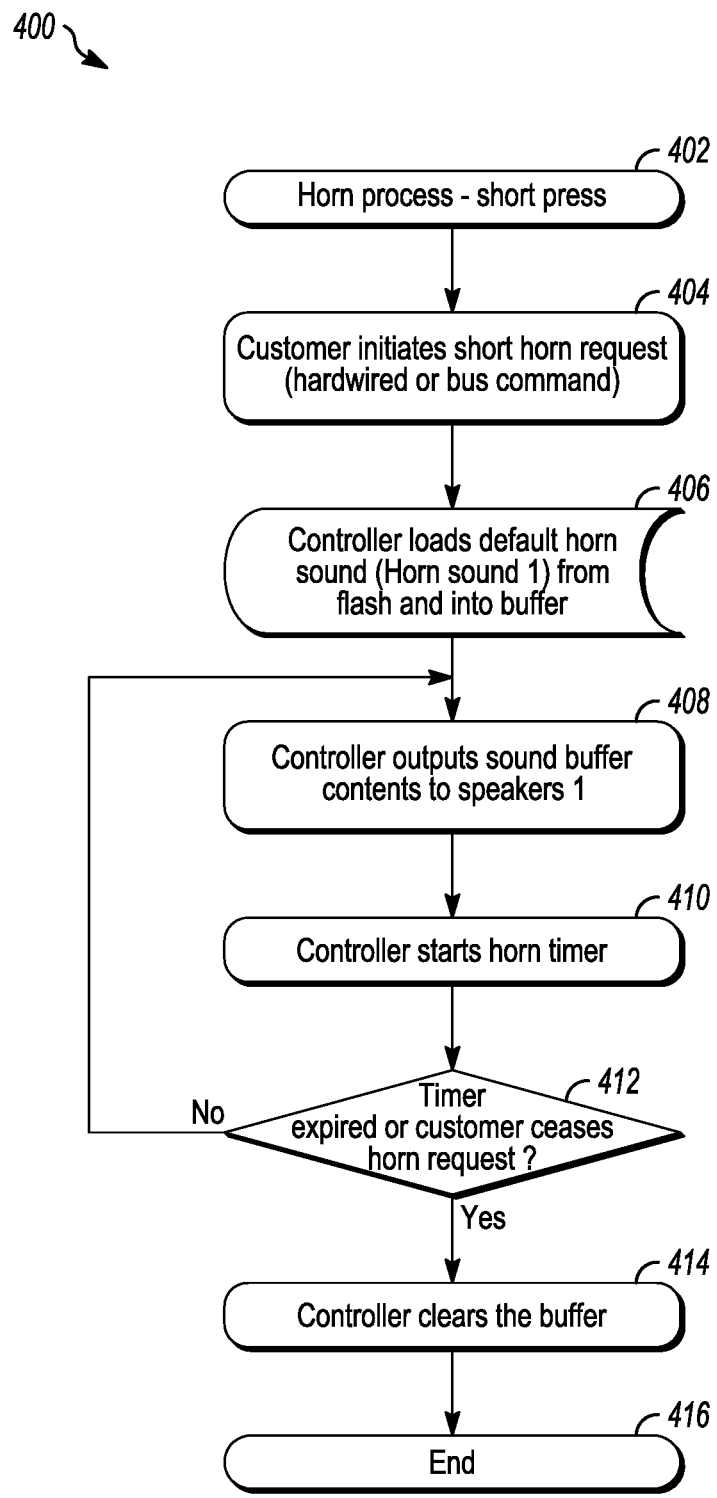
FIG. 4 is a flow diagram generally illustrating an alternative vehicle alert generation method according to the principles of the present disclosure.

FIG. 4 is a flow diagram generally illustrating an alternative vehicle alert generation method 400 according to the principles of the present disclosure. The method 400 may be configured to alert pedestrians, bystanders and other vehicles. At 402, the method 400 begins. At 404, the method 400 initiates a short horn request. For example, an operator of the vehicle initiates a short horn request. At 406, the method 400 loads horn sound into the buffer. For example, the system 100 loads a horn sound into the buffer. At 408, the method 400 outputs the buffer contents. For example, the system 100 outputs the contents of the buffer to the input/output device 118. At 410, the method 400 starts a horn timer. For example, the system 100 starts a horn timer. At 412, the method 400 determines whether the timer expired or whether the operator ceased the horn request. For example, if the system 100 determines that either are true, the method 400 continues at 414. If the system 100 determines that both are false, the method 400 continues at 408. At 414, the method 400 clears the buffer. For example, the system 100 clears the buffer. The method 400 ends at 416.

Figure 5:
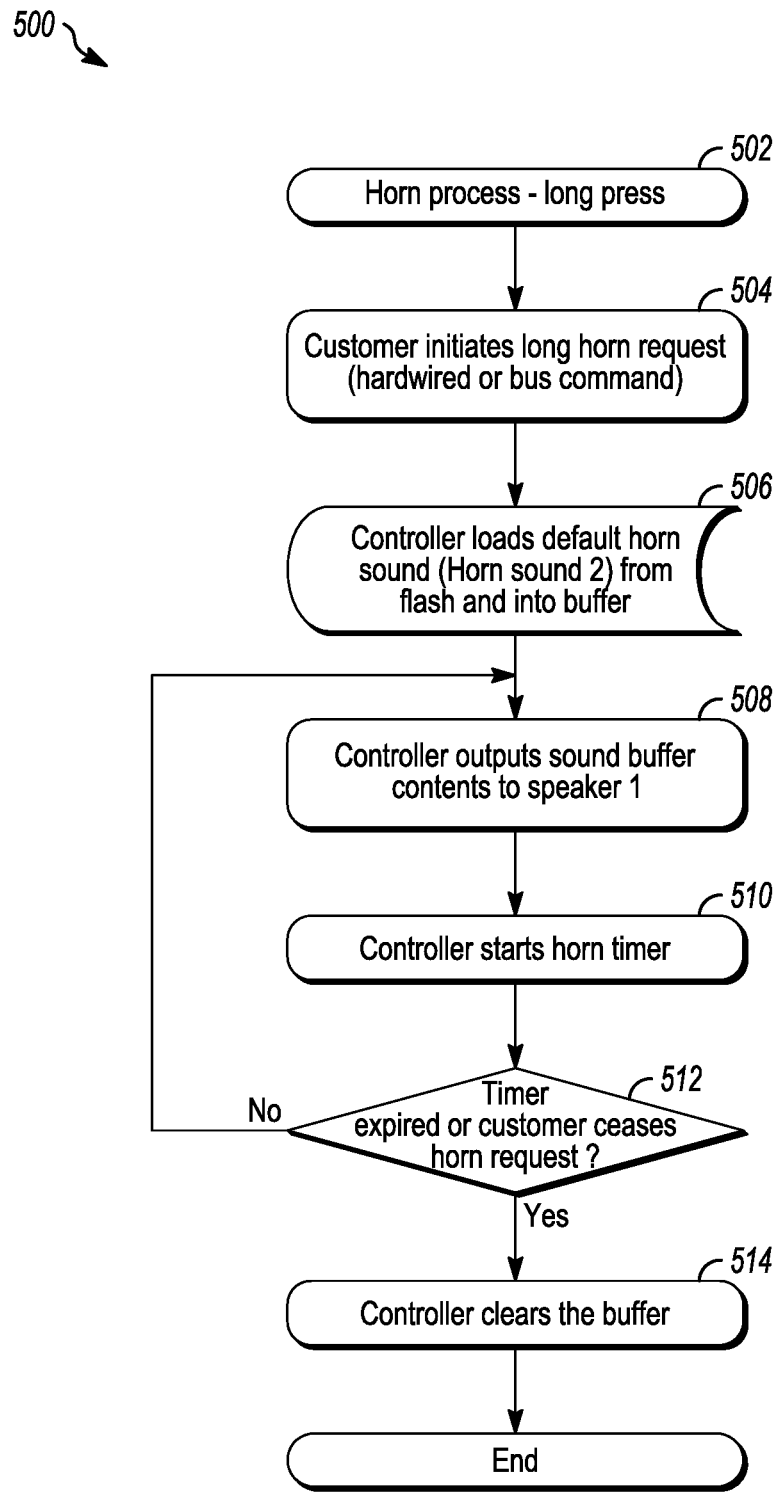
FIG. 5 is a flow diagram generally illustrating an alternative vehicle alert generation method according to the principles of the present disclosure.

FIG. 5 is a flow diagram generally illustrating an alternative vehicle alert generation method 500 according to the principles of the present disclosure. The method 500 may be configured to alert pedestrians, bystanders and other vehicles. At 502, the method 500 begins. At 504, the method 500 initiates a long horn request. For example, an operator of the vehicle initiates a long horn request. At 506, the method 500 loads horn sound into the buffer. For example, the system 100 loads a horn sound into the buffer. At 508, the method 500 outputs the buffer contents. For example, the system 100 outputs the contents of the buffer to the input/output device 118. At 510, the method 500 starts a horn timer. For example, the system 100 starts a horn timer. At 512, the method 500 determines whether the timer expired or whether the operator ceased the horn request. For example, if the system 100 determines that either are true, the method 500 continues at 514. If the system 100 determines that both are false, the method 500 continues at 508. At 514, the method 500 clears the buffer. For example, the system 100 clears the buffer. The method 500 ends after 514.

Figure 6:
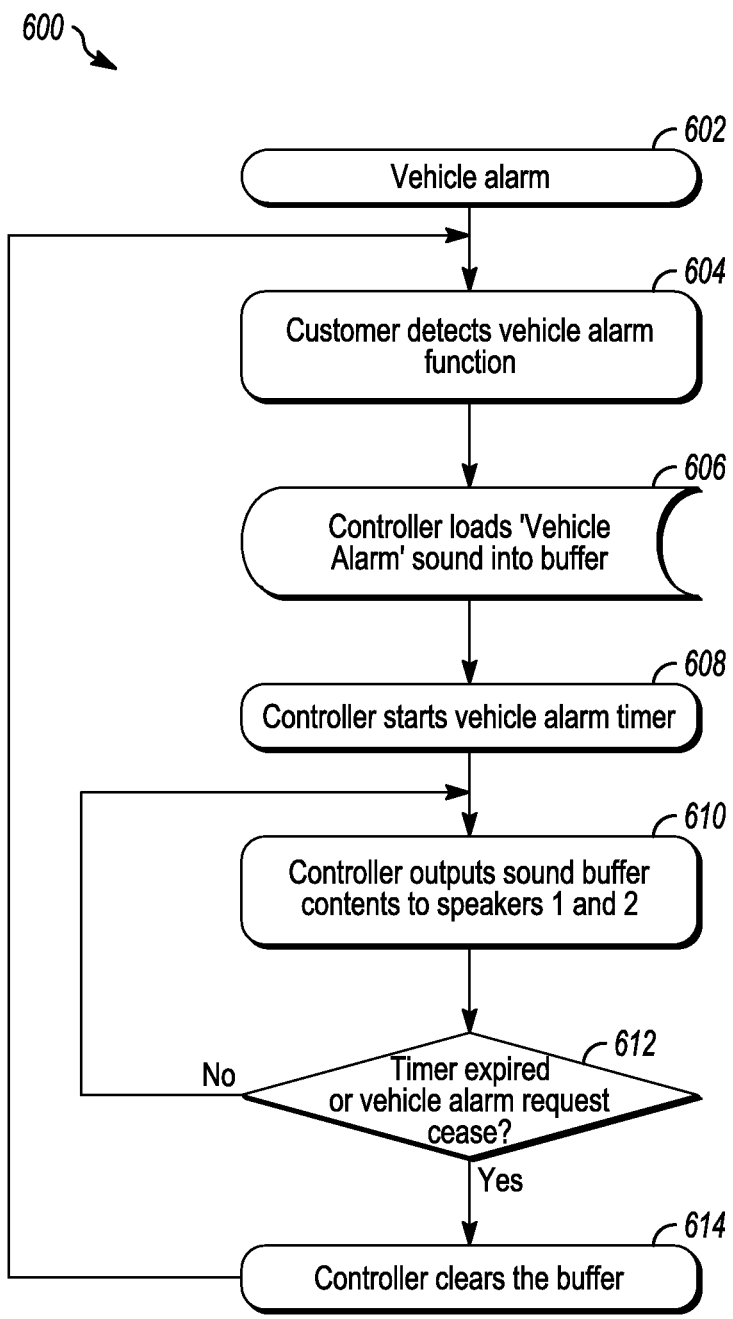
FIG. 6 is a flow diagram generally illustrating an alternative vehicle alert generation method according to the principles of the present disclosure.

FIG. 6 is a flow diagram generally illustrating an alternative vehicle alert generation method 600 according to the principles of the present disclosure. The method 600 may be configured to alert of a vehicle intrusion event. At 602, the method 600 begins. At 604, the method 600 detects a vehicle alarm condition. For example, system 100 detects a vehicle alarm condition using the various sensor data. At 606, the method 600 loads the alarm sound into the buffer. For example, the system 100 loads an alarm sound into the buffer. At 608, the method 600 starts an alarm timer. For example, the system 100 starts an alarm timer. At 610, the method 600 outputs the buffer contents. For example, the system 100 outputs the contents of the buffer to the input/output device 118. At 612, the method 600 determines whether the timer expired or whether the alarm ceased. For example, if the system 100 determines that either are true, the method 600 continues at 614. If the system 100 determines that either is false, the method 600 continues at 610. At 614, the method 600 clears the buffer. For example, the system 100 clears the buffer. The method 600 continues at 604.

Figure 7:
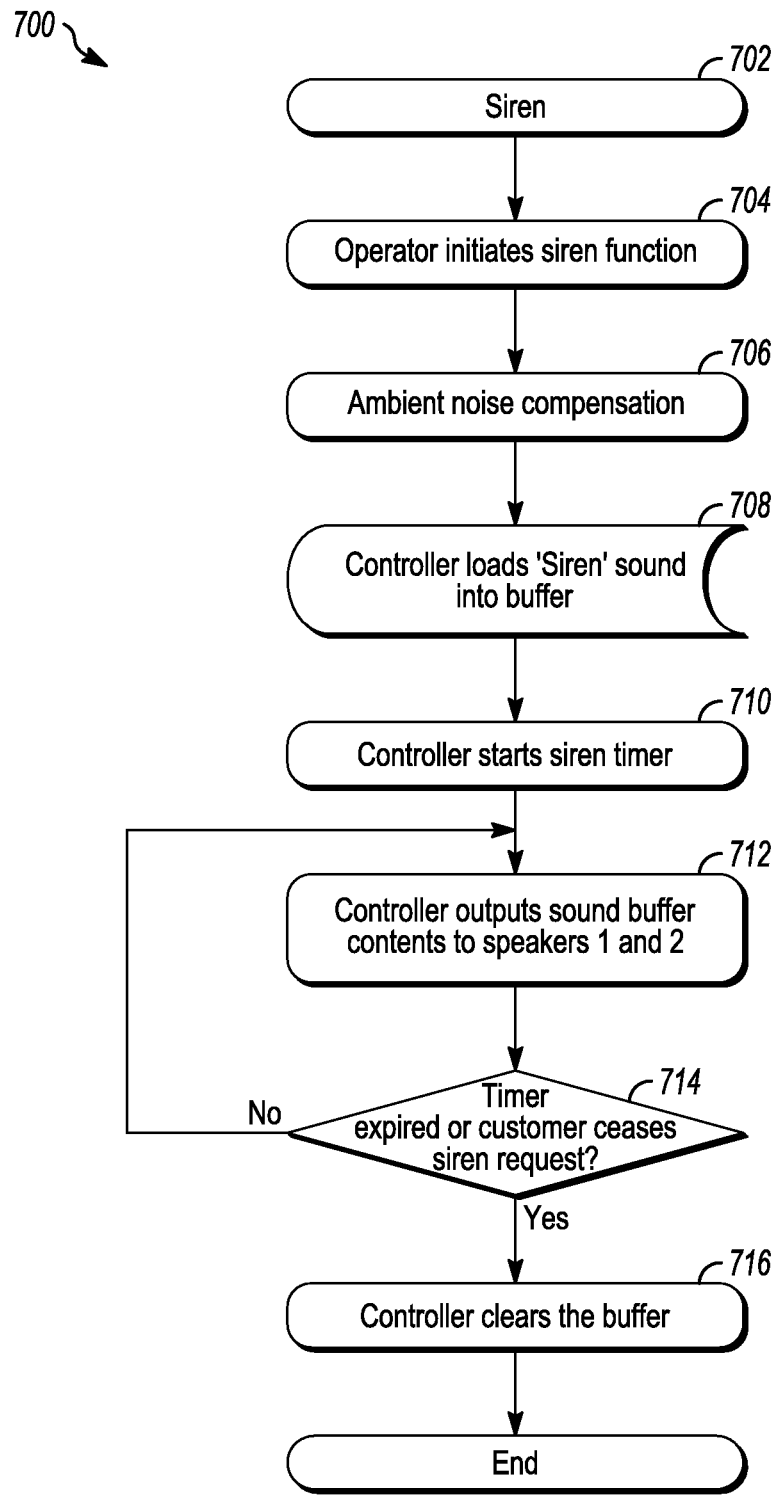
FIG. 7 is a flow diagram generally illustrating an alternative vehicle alert generation method according to the principles of the present disclosure.

FIG. 7 is a flow diagram generally illustrating an alternative vehicle alert generation method 700 according to the principles of the present disclosure. The method 700 may be configured generate a siren. At 702, the method 700 begins. At 704, the method 700 detects a siren function. For example, system 100 detects that an operator initiated a siren function using the various sensor data. At 706, the method 700 applies an ambient noise compensation. For example, the system 100 determines the loudness of the sound based on the various sensor data. At 708, the method 700 loads a siren sound into the buffer. For example, the system 100 loads a siren sound into the buffer. At 710, the method 700 starts a siren timer. For example, the system 100 starts a siren timer. At 712, the method 700 outputs the buffer contents. For example, the system 100 outputs the contents of the buffer to the input/output device 118. At 714, the method 700 determines whether the timer expired or whether the siren request is ceased. For example, if the system 100 determines that either are true, the method 700 continues at 716. If the system 100 determines that either is false, the method 700 continues at 712. At 716, the method 700 clears the buffer. For example, the system 100 clears the buffer. The method 700 ends at 704.

Figure 8:
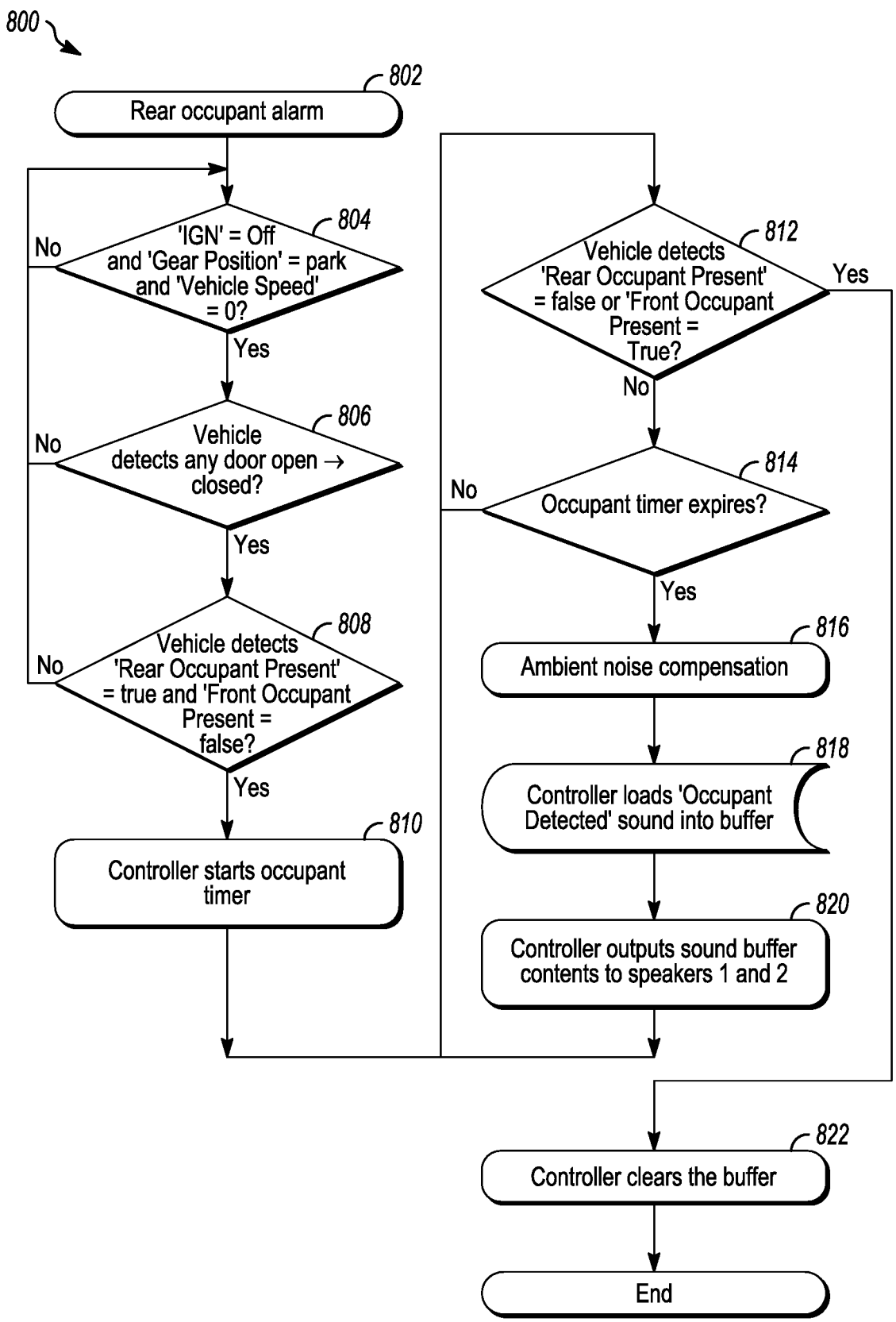
FIG. 8 is a flow diagram generally illustrating an alternative vehicle alert generation method according to the principles of the present disclosure.

FIG. 8 is a flow diagram generally illustrating an alternative vehicle alert generation method 800 according to the principles of the present disclosure. The method 800 may be configured to generate an alert intended to notify or indicate to a vehicle operator of a person or animal that is left in the rear seat of a vehicle. At 802, the method 800 begins. At 804, the method 800 determines whether the ignition is off and the vehicle gear position is park and the vehicle speed is 0. For example, the system determines whether the ignition is off and the vehicle gear position is park and the vehicle speed is 0 based on the various sensor data. If the system 100 determines all are not true, the method continues at 804. If the system 100 determines all are true, the method 800 continues at 806. At 806, the method 800 determines whether any door opened and closed. For example, the system 100 determines whether any door opened and closed using the various sensor data. If true, the method 800 continues at 808. If false, the method 800 continues at 804. At 808, the method 800 determines if the rear occupant present message is equal to true and the front occupant present message is equal to false. For example, the system 100 determines if the rear occupant present message is equal to true and the front occupant present message is equal to false based on the various sensor data. If either conditions are not satisfied, the method 800 continues at 804. If both conditions are satisfied, the method 800 continues at 810. At 810, the method 800 starts the occupant timer. For example, the system 100 starts a timer. At 812, the method 800 determines if the rear occupant present message is equal to false or the front occupant present message is equal to true. For example, the system 100 determines if the rear occupant present message is equal to false or the front occupant present message is equal to true based on the various sensor data. If the system 800 determines either condition is satisfied, the method 800 continues at 822. If false, the method 800 continues at 814. At 814, the method 800 determines if the occupant timer has expired. For example, the system 100 determines if the occupant timer has expired. If false, the method 800 continues at 812. If true, the method 800 continues at 816. At 816, the method 800 applies an ambient noise compensation. For example, the system 100 determines the loudness of the sound based on the various sensor data. At 818, the method 800 loads an occupant detected sound into the buffer. For example, the system 100 loads the occupant-detected sound into the buffer. At 820, the method 800 outputs the contents of the buffer. For example, the system 100 outputs the contents of the buffer to the input/output devices 118. The method 800 continues at 812. At 822, the method 800 clears the buffer and ends. For example, the system 100 clears the buffer and ends the method 800.

Figure 9:
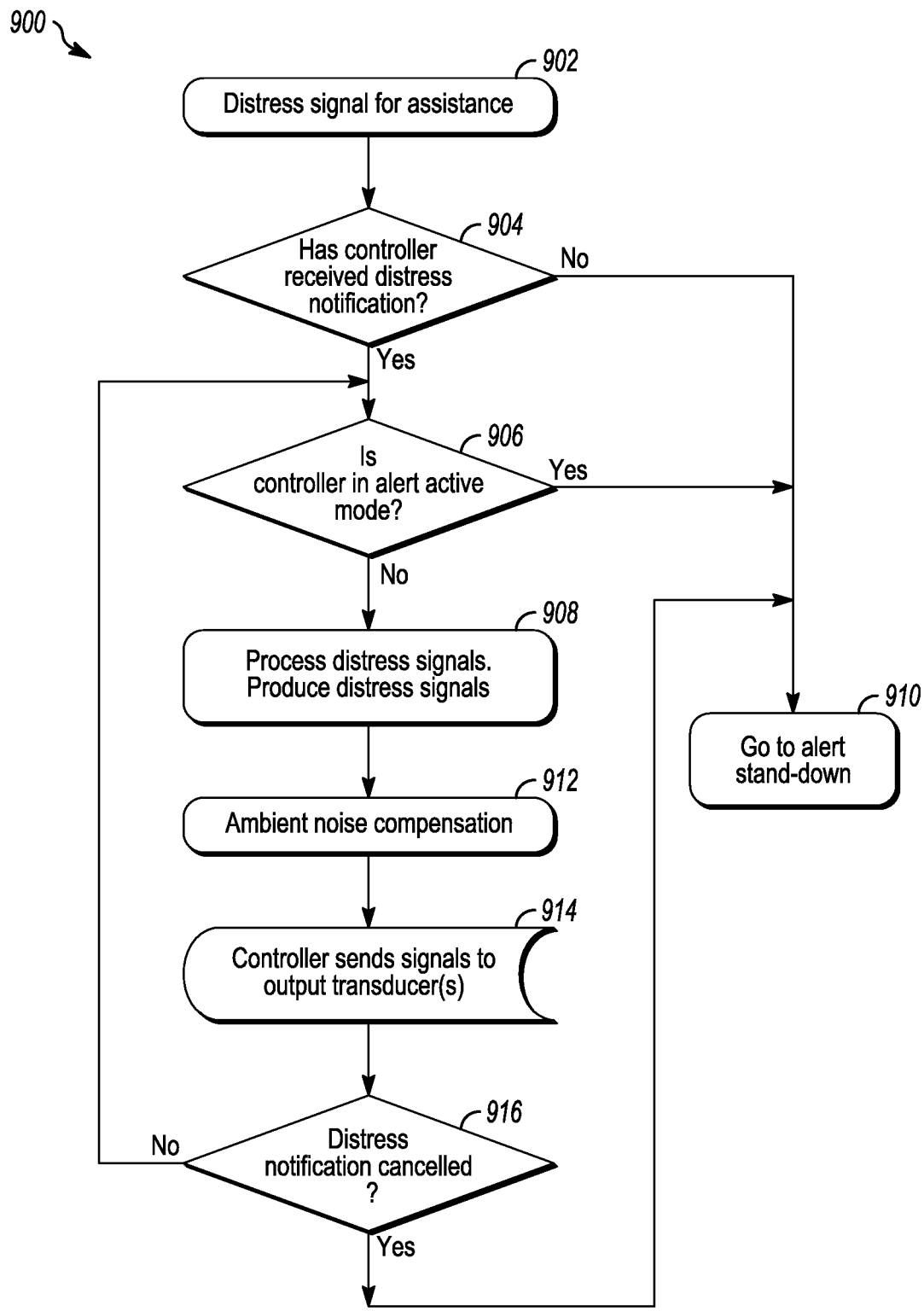
FIG. 9 is a flow diagram generally illustrating an alternative vehicle alert generation method according to the principles of the present disclosure.

FIG. 9 is a flow diagram generally illustrating an alternative vehicle alert generation method 900 according to the principles of the present disclosure. The method 900 may be configured to notify of driver and/or passengers in the vehicle needing assistance. At 902, the method 900 begins. At 904, the method 900 determines whether a distress notification was received. For example, the system 100 determines whether a distress notification was received using the various sensor data. If false, the method 900 continues at 910. If true, the method 900 continues at 906. At 906, the method 900 determines whether the controller 102 is in an alert active mode. For example, the system 100 determines whether the controller 102 is in an alert active mode. If true, the method 900 continues at 910. If false, the method 900 continues at 908. At 908, the method 900 processes distress signals and produces distress signals. For example, the system 100 may process the distress signals and/or generate distress signals based on the various sensor data. At 912, the method 900 applies an ambient noise compensation. For example, the system 100 determines the loudness of the sound based on the various sensor data. At 914, the method 900 sends out signals to output transducers. For example, the system 100 may output distress signals to the input/output devices 118. At 916, the method 900 determines whether the distress notification is cancelled. For example, the system 100 determines whether the distress notification was cancelled using the various sensor data. If false, the method 900 continues at 906. If true, the method 900 continues at 910. At 910, the method 900 goes to an alert stand-down. For example, the system 100 goes to an alert stand-down.

Figure 10:
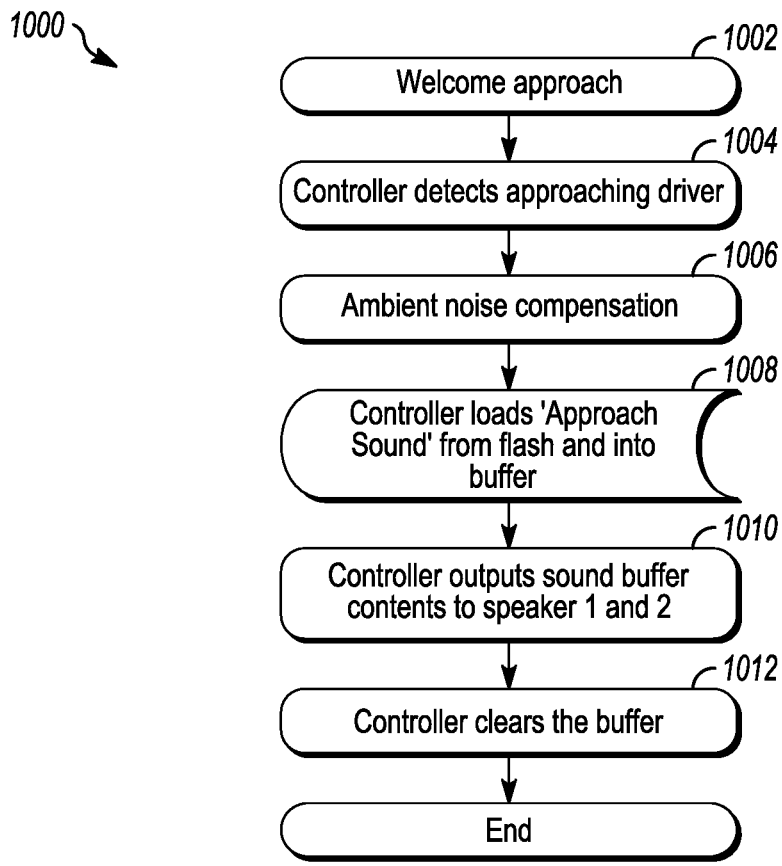
FIG. 10 is a flow diagram generally illustrating an alternative vehicle alert generation method according to the principles of the present disclosure.

FIG. 10 is a flow diagram generally illustrating an alternative vehicle alert generation method 1000 according to the principles of the present disclosure. The method 1000 may be configured to greet the driver as they approach the vehicle. At 1002, the method 1000 begins. At 1004, the method 1000 detects an approaching driver. For example, the system 100 determines that the operator of the vehicle is approaching the vehicle using the various sensor data. At 1006, the method 1000 applies an ambient noise compensation. For example, the system 100 determines the determines the loudness of the sound based on the various sensor data. At 1008, the method 1000 loads an approach sound into the buffer. For example, the system 100 loads the approach sound into the buffer. At 1010, the method 1000 outputs the contents of the buffer. For example, the system 100 outputs the contents of the buffer to the input/output devices 118. At 1012, the method 1000 clears the buffer. The method 1000 ends.

Figure 11:
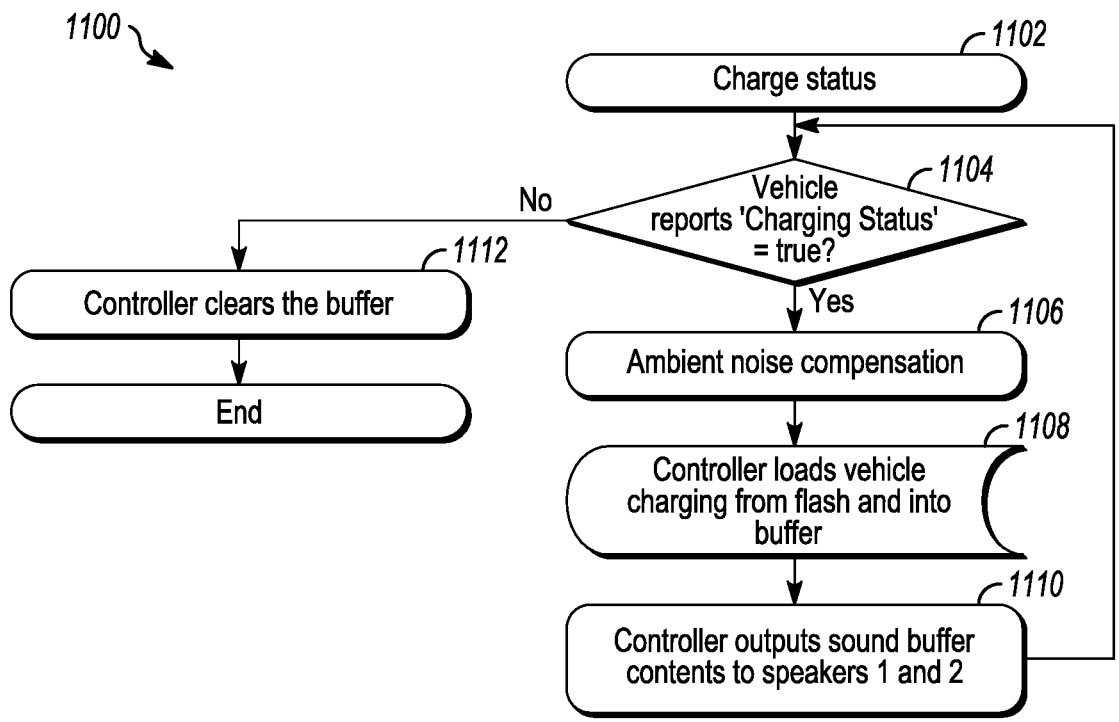
FIG. 11 is a flow diagram generally illustrating an alternative vehicle alert generation method according to the principles of the present disclosure.

FIG. 11 is a flow diagram generally illustrating an alternative vehicle alert generation method 1100 according to the principles of the present disclosure. The method 1100 may be configured to inform the driver the electric vehicle is in charging mode. At 1102, the method 1100 begins. At 1104, the method 1100 determines whether the vehicle charging status is true. For example, the system 100 determines whether the charging status is true based on the various sensor data. If false, the method 1100 continues at 1112. If true, the method 1100 continues at 1106. At 1106, the method 1100 applies an ambient noise compensation. For example, the system 100 determines the determines the loudness of the sound based on the various sensor data. At 1108, the method 1100 loads a vehicle charging sound into the buffer. For example, the system 100 loads the vehicle charging sound into the buffer. At 1110, the method 1100 outputs the contents of the buffer. For example, the system 100 outputs the contents of the buffer to the input/output devices 118. The method continues at 1104. At 1112, the method 1100 clears the buffer. For example, the system 100 clears the buffer. The method 1100 ends.

Figure 12:
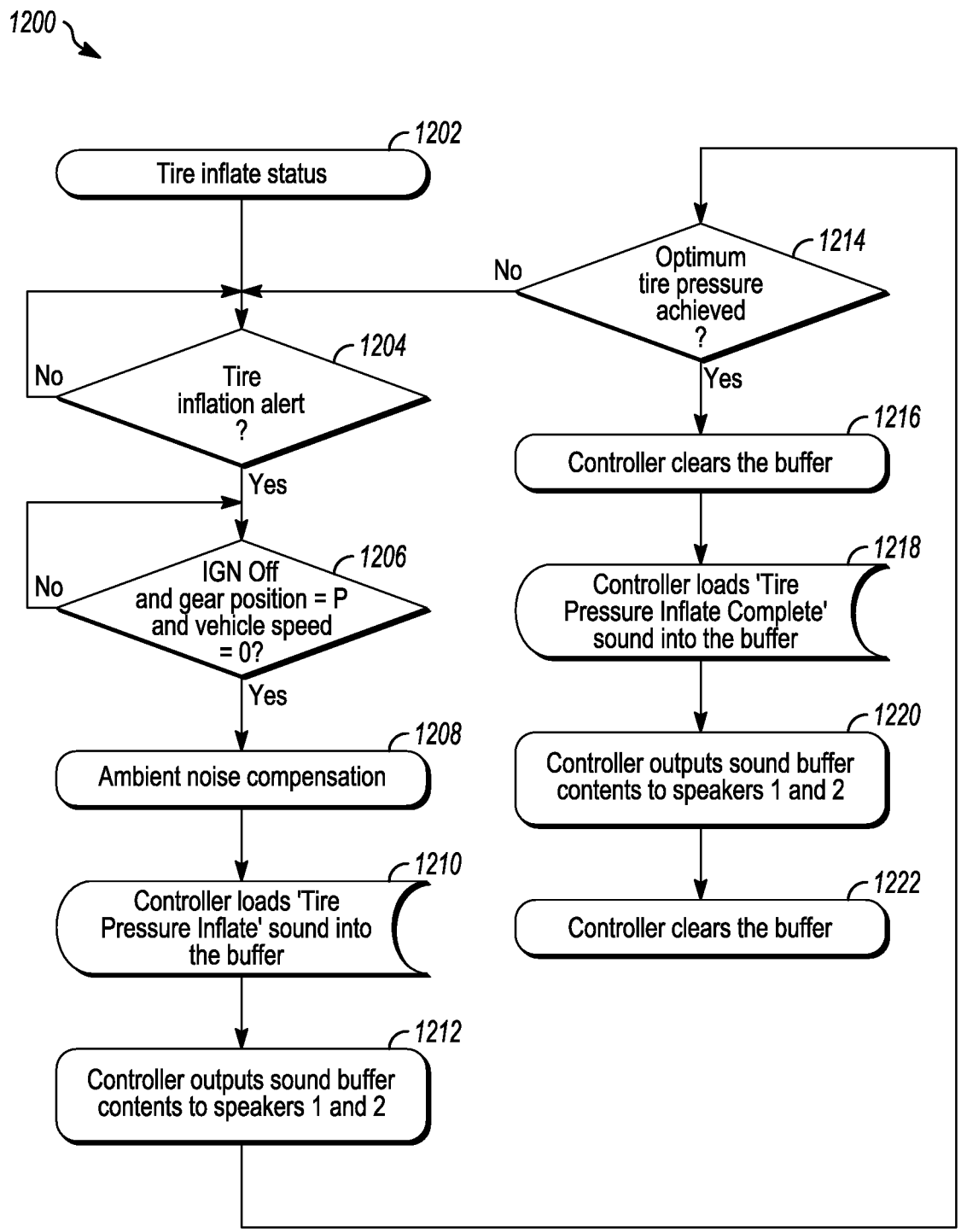
FIG. 12 is a flow diagram generally illustrating an alternative vehicle alert generation method according to the principles of the present disclosure.

FIG. 12 is a flow diagram generally illustrating an alternative vehicle alert generation method 1200 according to the principles of the present disclosure. The method 1200 may be configured to inform the driver of the tire inflate status. At 1202, the method 1200 begins. At 1204, the method 1200 determines whether a low tire presser alert is true. For example, the system 100 determines whether the low tire pressure alert is on using the various sensor data. If false, the method 1200 continues at 1214. If true, the method 1200 continues at 1206. At 1206, the method 1200 determines whether the ignition is off and the gear position is park and the vehicle speed is 0. For example, the system 100 determines whether the ignition is off and the gear position is park and the vehicle speed is 0 based on the various sensor data. If false, the method 1200 continues at 1206. If true, the method 1200 continues at 1208. At 1208, the method 1200 applies an ambient noise compensation. For example, the system 100 determines the loudness of the sound based on the various sensor data. At 1210, the method 1200 loads a tire pressure inflate sound into the buffer. For example, the system 100 loads a tire pressure inflate sound into the buffer. At 1212, the method 1200 outputs the contents of the buffer to a first set of the input/output devices. For example, the system 100 outputs the contents of the buffer to a first set of input/output devices 118. At 1214, the method 1200 determines if the optimum tire pressure has been achieved. For example, the system 100 determines the optimum tire pressure using various sensor data. If false, the method 1200 continues at 1204. If true, the method 1200 continues at 1216. At 1216, the method 1200 clears the buffer. For example, the system 100 clears the buffer. The method 1200 continues at 1218. At 1218, the method 1200 loads a tire pressure inflate complete sound into the buffer. For example, the system 100 loads the tire pressure inflate complete sound into the buffer. At 1220, the method 1200 outputs the contents of the buffer. For example, the system 100 outputs the contents of the buffer to the input/output devices 118. At 1222, the method 1200 clears the contents of the buffer. For example, the system 100 clears the buffer. The method 1200 ends.

Figure 13:
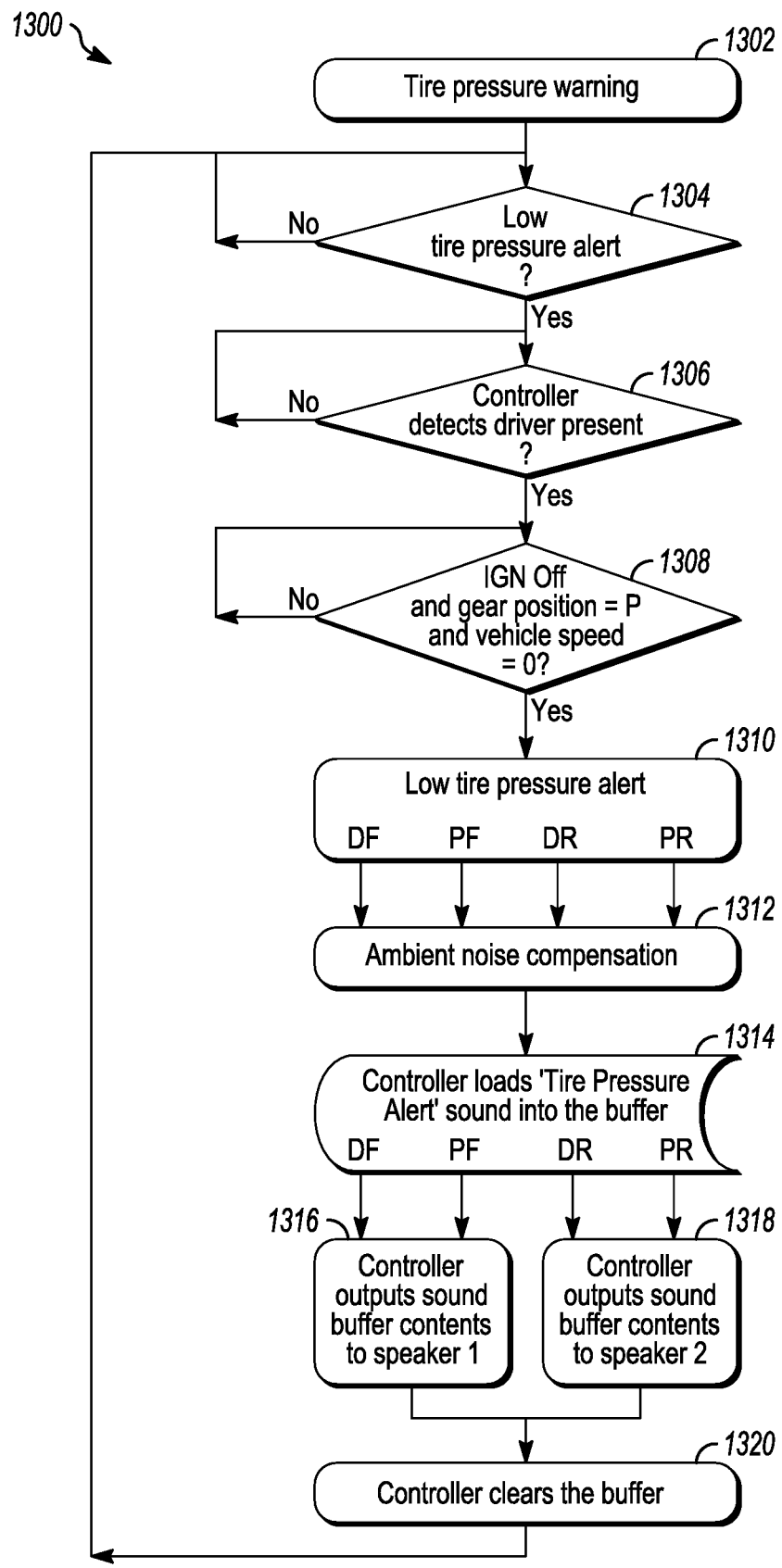
FIG. 13 is a flow diagram generally illustrating an alternative vehicle alert generation method according to the principles of the present disclosure.

FIG. 13 is a flow diagram generally illustrating an alternative vehicle alert generation method 1300 according to the principles of the present disclosure. The method 1300 may be configured to inform the driver of one or more tires with low air pressure. At 1302, the method 1300 begins. At 1304, the method 1300 determines whether a low tire presser alert is true. For example, the system 100 determines whether the low tire pressure alert is true using the various sensor data. If false, the method 1300 continues at 1304. If true, the method 1300 continues at 1306. At 1306, the method 1300 determines whether the operator is present near the vehicle. For example, the system 100 determines whether the occupant is in the vehicle based on the various sensor data. If false, the method 1300 continues at 1306. If true, the method 1300 continues at 1308. At 1308, the method 1300 determines whether the ignition is off and the gear position is park and the vehicle speed is 0. For example, the system 100 determines whether the ignition is off and the gear position is park and the vehicle speed is 0 based on the various sensor data. If false, the method 1300 continues at 1308. If true, the method 1300 continues at 1310. At 1310, the method 1300 determines whether the low tire alert originates from the driver front, passenger front, driver rear or passenger rear tire. The method 1300 then continues to 1312. At 1312, the method 1300 applies an ambient noise compensation. For example, the system 100 determines the loudness of the sound based on the various sensor data. The method 1300 then continues to 1314. At 1314 the method 1300 loads a low tire sound into the buffer. If the method 1300 determines the low tire pressure alert originated at the driver front or passenger front tire, the method 1300 continues at 1316. At 1316 the system 100 outputs sound buffer contents to the input/output devices 118. For example, the system 100 outputs the contents of the buffer to a first set of input/output devices 118. If the method 1300 determines the low tire pressure alert originated at the driver rear or passenger rear tire, the method 1300 continues at 1318. At 1318, the system 100 outputs sound buffer contents to the input/output devices 118. For example, the system 100 outputs the contents of the buffer the set of input/output devices 118. At 1320, the method 1300 clears the buffer. For example, the system 100 clears the buffer. The method 1300 continues at 1304.

Figure 14:
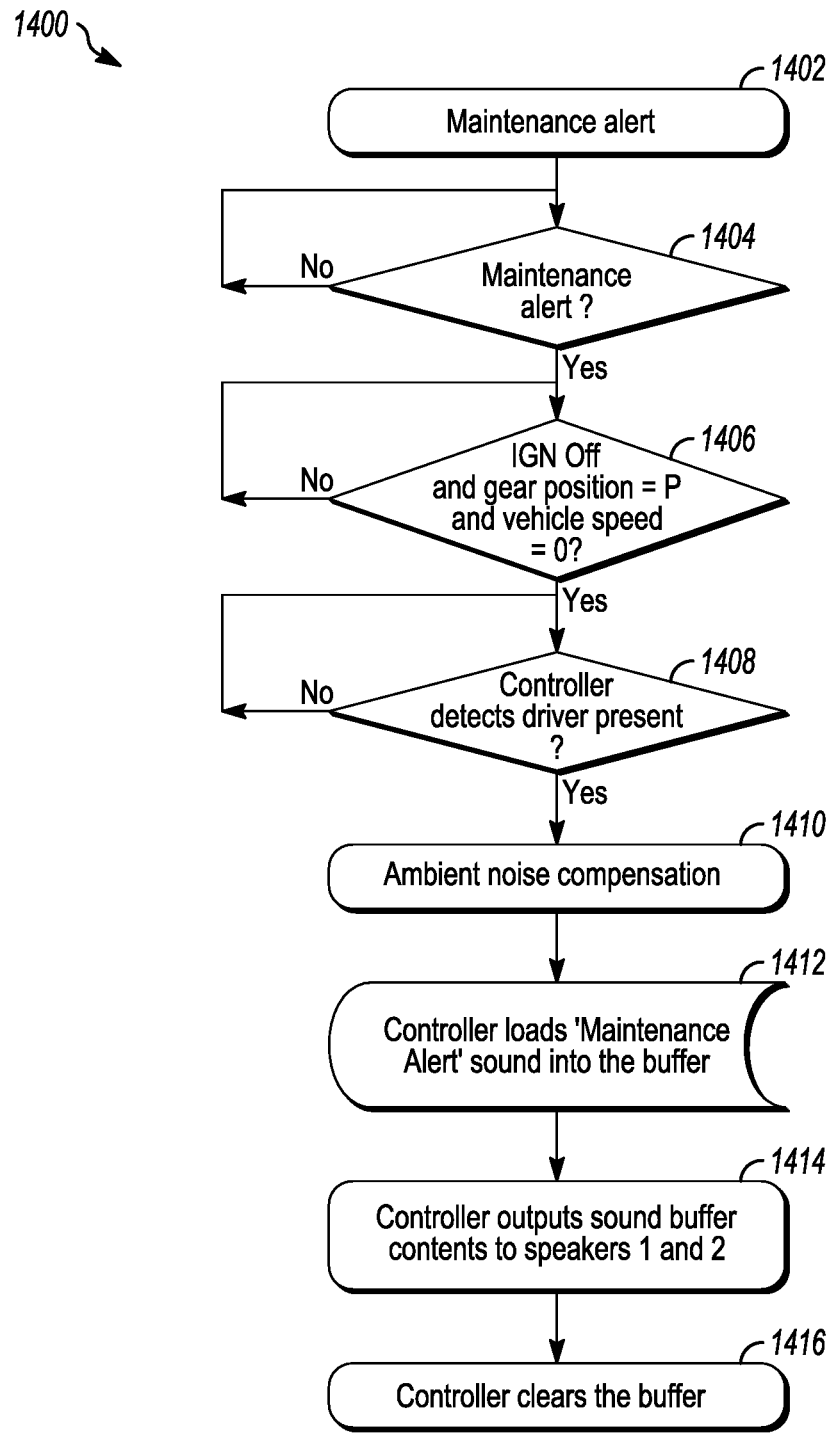
FIG. 14 is a flow diagram generally illustrating an alternative vehicle alert generation method according to the principles of the present disclosure.

FIG. 14 is a flow diagram generally illustrating an alternative vehicle alert generation method 1400 according to the principles of the present disclosure. The method 1400 may be configured to inform the operator of a maintenance alert condition. At 1402, the method 1400 begins. At 1404, the method 1400 determines whether a maintenance alert is detected. For example, the system 100 determines whether a maintenance alert is detected using the various sensor data. If false, the method 1400 continues at 1404. If true, the method 1400 continues at 1406. At 1406, the method 1400 determines whether the ignition is off and the gear position is park and the vehicle speed is 0. For example, the system 100 determines whether the ignition is off and the gear position is park and the vehicle speed is 0 based on the various sensor data. If false, the method 1400 continues at 1406. If true, the method 1400 continues at 1408. At 1408, the method 1400 determines whether the operator is present in the vehicle. For example, the system 100 determines whether the occupant is in the vehicle based on the various sensor data. If false, the method 1400 continues at 1408. If true, the method 1400 continues at 1410. At 1410, the method 1400 applies an ambient noise compensation. For example, the system 100 determines the loudness of the sound based on the various sensor data. At 1412, the method 1400 loads a maintenance alert sound into the buffer. For example, the system 100 loads the maintenance alert sound into the buffer. At 1414, the method 1400 outputs the contents of the buffer. For example, the system 100 outputs the contents of the buffer to the input/output devices 118. At 1416, the method 1400 clears the buffer. For example, the system 100 clears the buffer.

Figure 15:
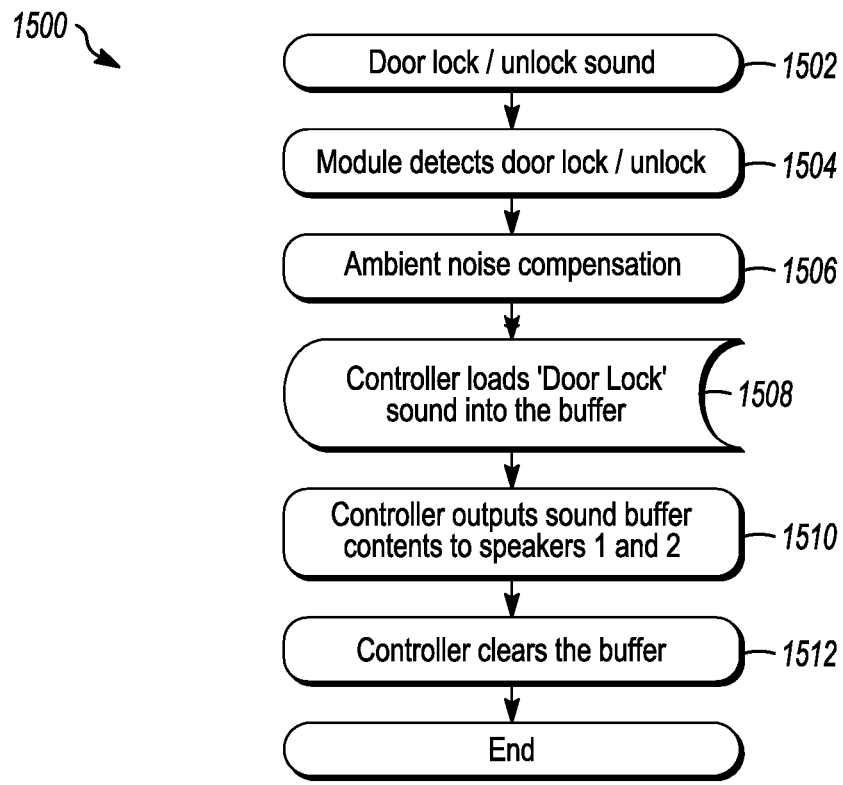
FIG. 15 is a flow diagram generally illustrating an alternative vehicle alert generation method according to the principles of the present disclosure.

FIG. 15 is a flow diagram generally illustrating an alternative vehicle alert generation method 1500 according to the principles of the present disclosure. The method 1500 may be configured to inform the operator if the doors are locked or unlocked. At 1502, the method 1500 begins. At 1504, the method 1500 detects that the doors are locked/unlocked. For example, the system 100 detects that the doors are locked or unlocked based on the various sensor data. At 1506, the method 1500 applies an ambient noise compensation. For example, the system 100 determines the determines the loudness of the sound based on the various sensor data. At 1508, the method 1500 loads a door lock sound into the buffer. For example, the system 100 loads the door lock sound into the buffer. At 1510, the method 1500 outputs the contents of the buffer. For example, the system 100 outputs the contents of the buffer to the input/output devices 118. At 1512, the method 1500 clears the buffer. For example, the system 100 clears the buffer.

Figure 16:
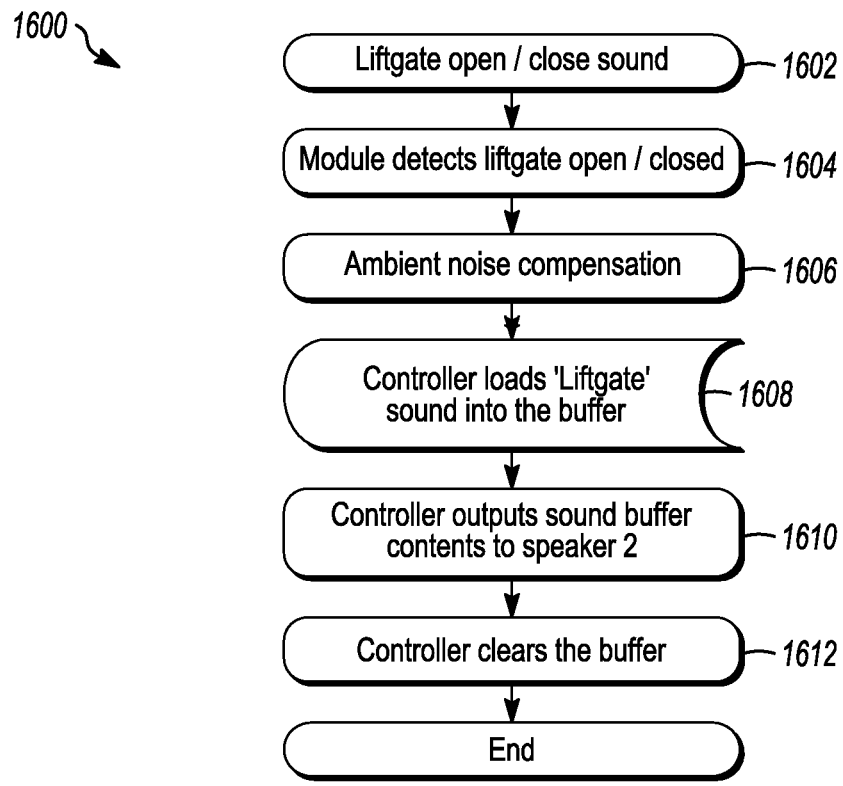
FIG. 16 is a flow diagram generally illustrating an alternative vehicle alert generation method according to the principles of the present disclosure.

FIG. 16 is a flow diagram generally illustrating an alternative vehicle alert generation method 1600 according to the principles of the present disclosure. The method 1600 may be configured to inform the operator that the lift gate is opening or closing. At 1602, the method 1600 begins. At 1604, the method 1600 detects that a lift gate is opening or closing. For example, the system 100 detects that the lift gate is opening based on the various sensor data. At 1606, the method 1600 applies an ambient noise compensation. For example, the system 100 determines the determines the loudness of the sound based on the various sensor data. At 1608, the method 1600 loads a lift gate sound into the buffer. For example, the system 100 loads the lift gate sound into the buffer. At 1610, the method 1600 outputs the contents of the buffer. For example, the system 100 outputs the contents of the buffer to the input/output devices 118. At 1612, the method 1600 clears the buffer. For example, the system 100 clears the buffer.

Figure 17:
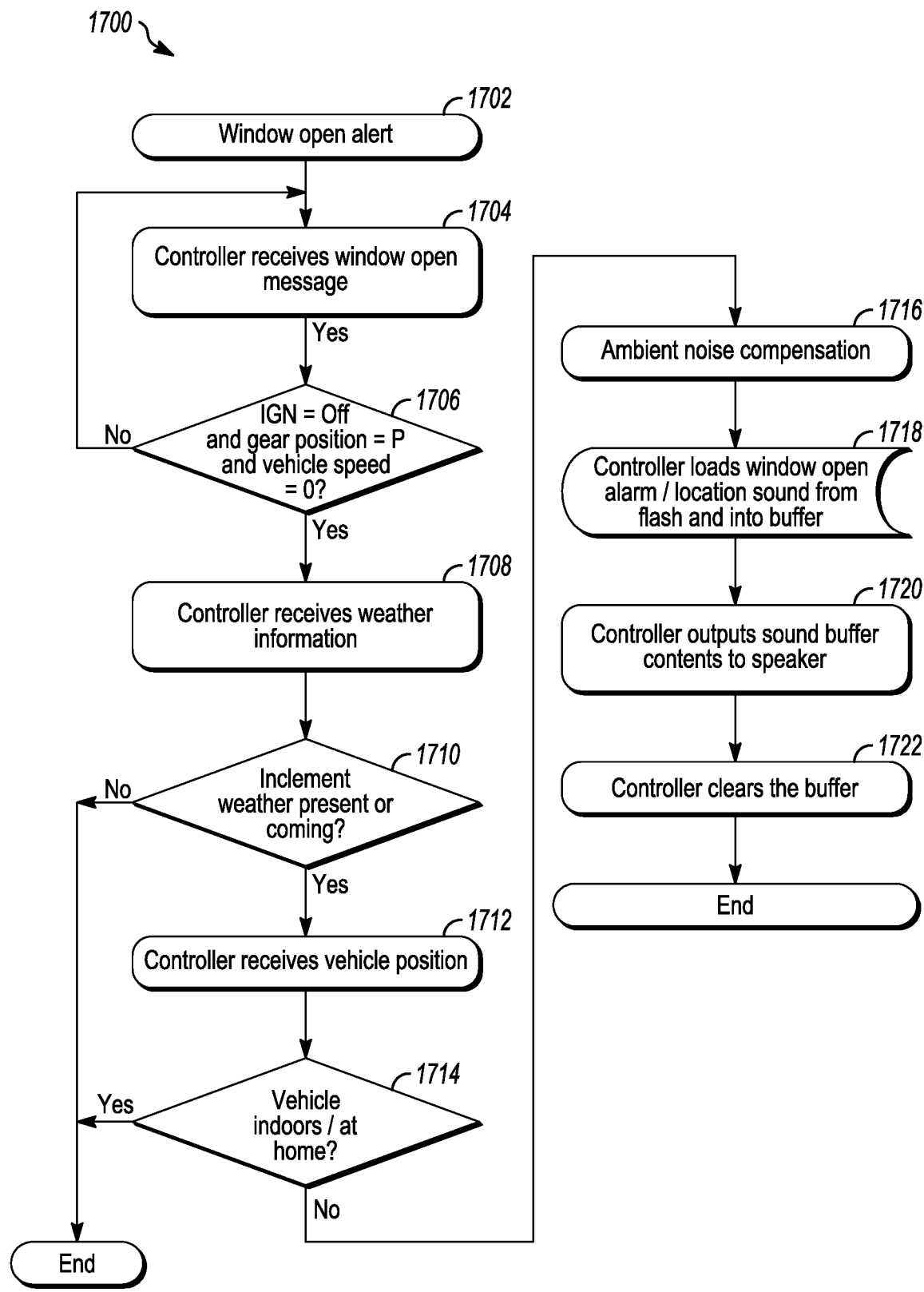
FIG. 17 is a flow diagram generally illustrating an alternative vehicle alert generation method according to the principles of the present disclosure.

FIG. 17 is a flow diagram generally illustrating an alternative vehicle alert generation method 1700 according to the principles of the present disclosure. The method 1700 may be configured to inform the operator if the windows of the vehicle are open. At 1702, the method 1700 begins. At 1704, the method 1700 receives a window open message. For example, the system 100 receives the window open message and determines the window is open based on the various sensor data. At 1706, the method 1700 determines whether the ignition is off, the gear position is park and the vehicle speed is equal to zero. For example, the system 100 determines whether the ignition is off, the gear position is park and the vehicle speed is equal to 0 based on various sensor data. If false, the method 1700 continues at 1704. If true, the method 1700 continues at 1708. At 1708, the method 1700 receives current weather information. At 1710, the method 1700 determines whether inclement weather is present or coming. For example, the system 100 may determine whether inclement weather is present or coming based on the various sensor data. If false, the method 1700 ends. If true, the method 1700 continues at 1712. At 1712, the method receives vehicle position data. At 1714, the method determines if the vehicles is located indoors or at home. For example, the system 100 determines whether the vehicle is indoors at home (e.g., in a garage) based on the various sensor data. If true, the method 1700 ends. If false, the method 1700 continues at 1716. At 1716, the method 1700 applies an ambient noise compensation. For example, the system 100 determines the loudness of the sound based on the various sensor data. At 1718, the method 1700 loads a window open alarm/location sound into the buffer. For example, the system 100 loads the window open alarm/location sound into the buffer. At 1720, the method 1700 outputs the contents of the buffer. For example, the system 100 outputs the contents of the buffer to the input/output devices 118. At 1722, the method 1700 clears the buffer. For example, the system 100 clears the buffer. The method 1700 ends.

Figure 18:
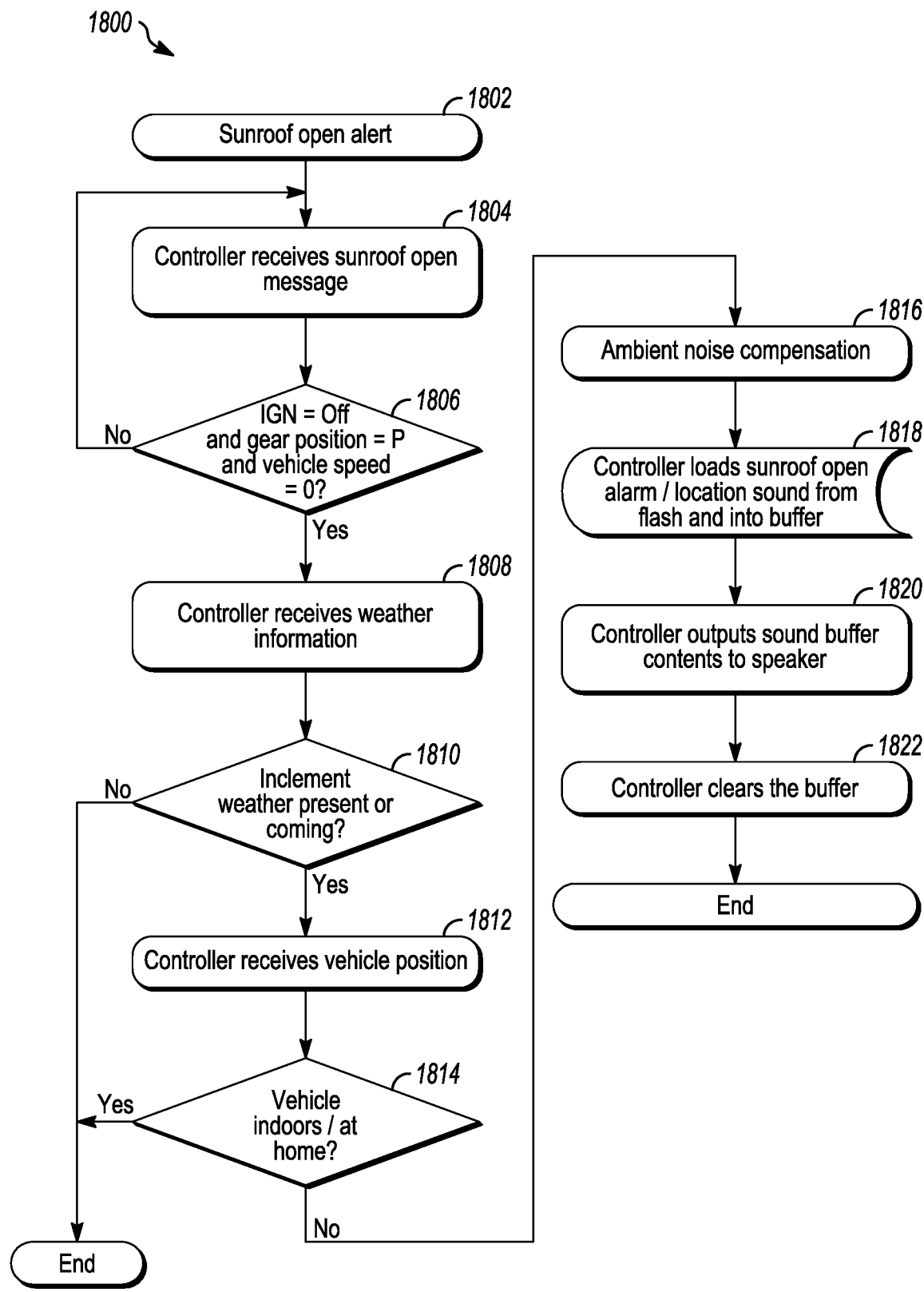
FIG. 18 is a flow diagram generally illustrating an alternative vehicle alert generation method according to the principles of the present disclosure.

FIG. 18 is a flow diagram generally illustrating an alternative vehicle alert generation method 1800 according to the principles of the present disclosure. The method 1800 may be configured to inform the operator if the windows of the vehicle are open. At 1802, the method 1800 begins. At 1804, the method 1800 receives a sunroof open message. For example, the system 100 receives the sunroof open message and determines the sunroof is open based on the various sensor data. At 1806, the method 1800 determines whether the ignition is off, the gear position is park and the vehicle speed is equal to zero. For example, the system 100 determines whether the ignition is off, the gear position is park and the vehicle speed is equal to 0 based on various sensor data. If false, the method 1800 continues at 1804. If true, the method 1800 continues at 1808. At 1808, the method 1800 receives current weather information. At 1810, the method 1800 determines whether inclement weather is present or coming. For example, the system 100 may determine whether inclement weather is present or coming based on the various sensor data. If false, the method 1800 ends. If true, the method 1800 continues at 1812. At 1812, the method receives vehicle position data. At 1814, the method determines if the vehicles is located indoors or at home. For example, the system 100 determines whether the vehicle is indoors at home (e.g., in a garage) based on the various sensor data. If true, the method 1800 ends. If false, the method 1800 continues at 1816. At 1816, the method 1800 applies an ambient noise compensation. For example, the system 100 determines the determines the loudness of the sound based on the various sensor data. At 1818, the method 1800 loads a window open alarm/location sound into the buffer. For example, the system 100 loads the window open alarm/location sound into the buffer. At 1820, the method 1800 outputs the contents of the buffer. For example, the system 100 outputs the contents of the buffer to the input/output devices 118. At 1822, the method 1800 clears the buffer. For example, the system 100 clears the buffer. The method 1800 ends.

Figure 19:
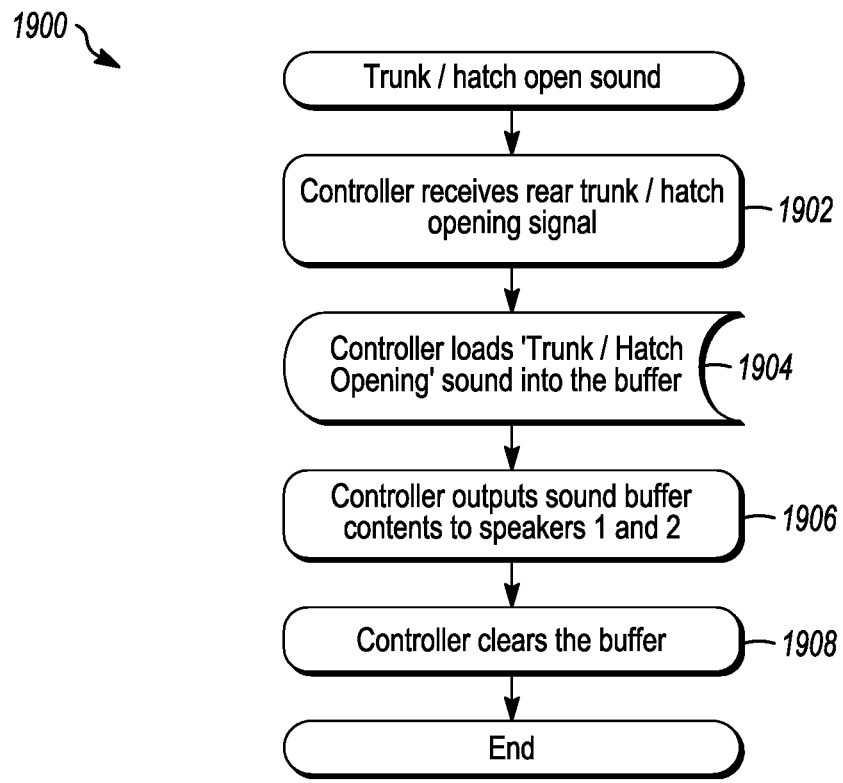
FIG. 19 is a flow diagram generally illustrating an alternative vehicle alert generation method according to the principles of the present disclosure.

FIG. 19 is a flow diagram generally illustrating an alternative vehicle alert generation method 1900 according to the principles of the present disclosure. The method 1900 may be configured to inform the operator if the trunk/hatch is opening. At 1902, the method 1900 begins. At 1902, the method 1900 receives a signal that a rear trunk/hatch is opening. At 1904, the method 1900 loads a trunk/hatch opening sound into the buffer. For example, the system 100 loads the trunk/hatch opening sound into the buffer. At 1906, the method 1900 outputs the contents of the buffer. For example, the system 100 outputs the contents of the buffer to the input/output devices 118. At 1908, the method 1900 clears the buffer. For example, the system 100 clears the buffer.

Figure 20:
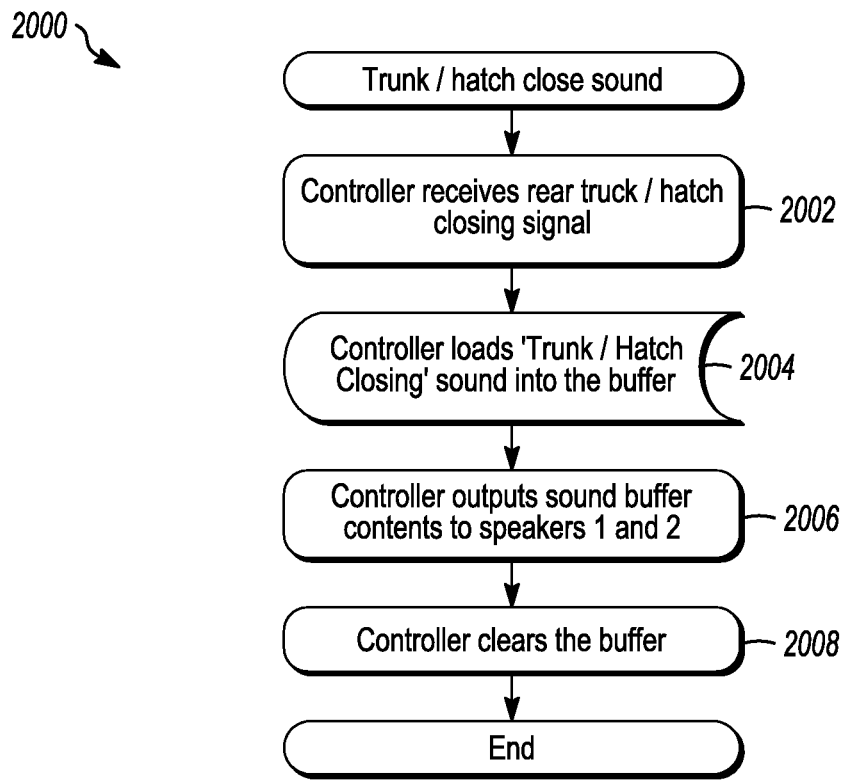
FIG. 20 is a flow diagram generally illustrating an alternative vehicle alert generation method according to the principles of the present disclosure.

FIG. 20 is a flow diagram generally illustrating an alternative vehicle alert generation method 2000 according to the principles of the present disclosure. The method 2000 may be configured to inform the operator if the trunk/hatch is closing. At 2002, the method 2000 begins. At 2002, the method 2000 receives a signal that a rear trunk/hatch is closing. At 2004, the method 2000 loads a trunk/hatch opening sound into the buffer. For example, the system 100 loads the trunk/hatch opening sound into the buffer. At 2006, the method 2000 outputs the contents of the buffer. For example, the system 100 outputs the contents of the buffer to the input/output devices 118. At 2008, the method 2000 clears the buffer. For example, the system 100 clears the buffer.

Figure 21:
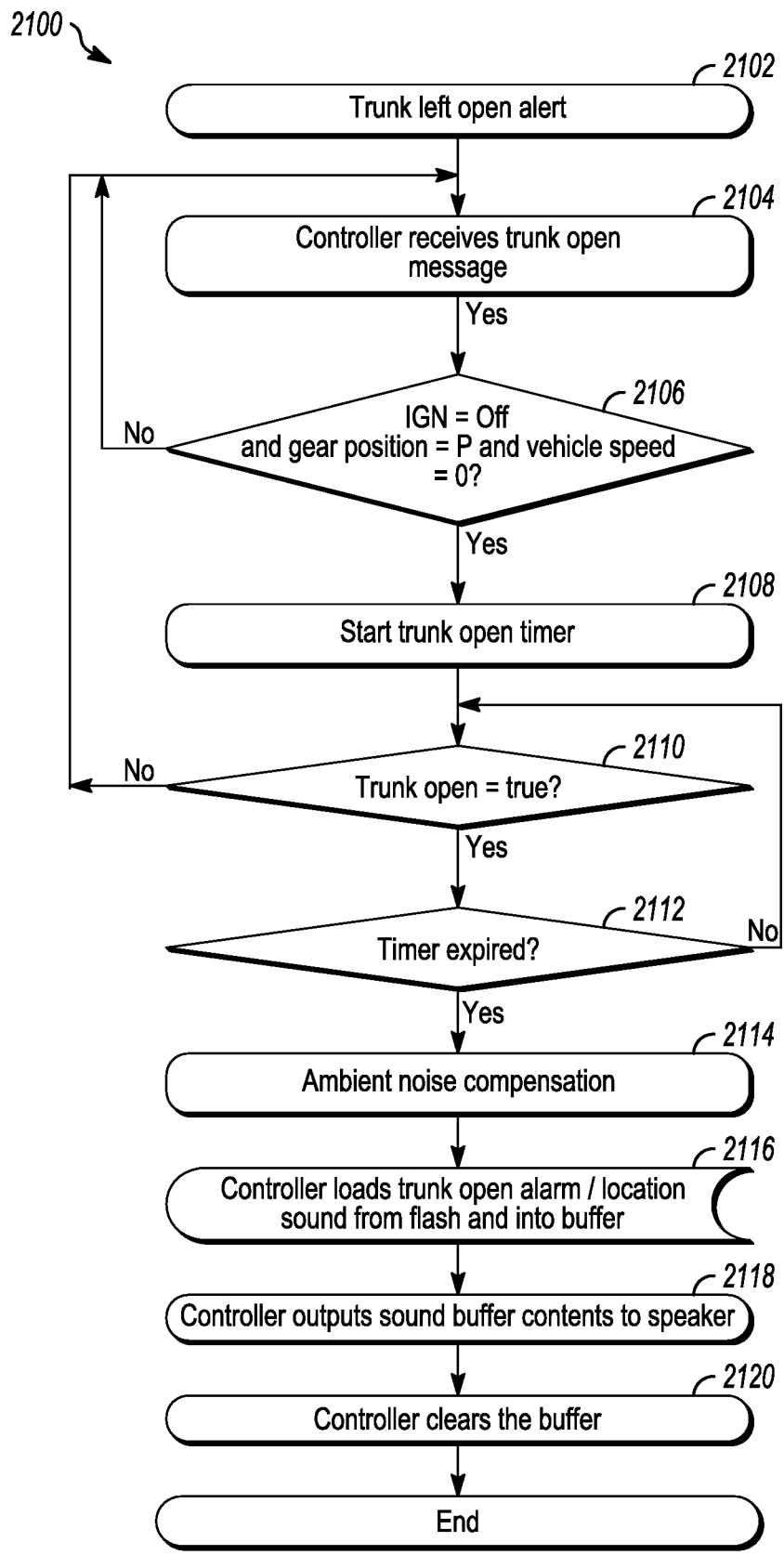
FIG. 21 is a flow diagram generally illustrating an alternative vehicle alert generation method according to the principles of the present disclosure.

FIG. 21 is a flow diagram generally illustrating an alternative vehicle alert generation method 2100 according to the principles of the present disclosure. At 2102, the method 2100 begins. At 2104, the method 2100 receives a trunk position signal. For example, the system 100 receives the trunk position signal. At 2106, the method 2100 determines whether the ignition is off, the gear position is equal to park, and the vehicle speed is equal to zero. For example, the method 2100 determines whether the gear position is equal to park, the vehicle speed is equal to zero and the ignition is off based on the various sensor data. If false, the method 2100 continues at 2104. If true, the method 2100 continues at 2108. At 2108, the method 2100 starts the trunk open timer. For example, the system 100 starts a trunk open timer. At 2110, the method 2100 determines if the trunk is open. For example, the system 100 receives the trunk open message. If false, the method 2100 continues at 2104. If true, the method continues at 2112. At 2112, the method 2100 determines if the trunk open timer has expired. If false, the method 2100 continues at 2110. If true, the method 2100 continues at 2114. At 2114, the method 2100 applies an ambient noise compensation. For example, the system 100 determines the loudness of the sound based on the various sensor data. At 2116, the method 2100 loads a trunk open sound into the buffer. For example, the system 100 loads the trunk open sound into the buffer. At 2118, the method 2100 outputs the contents of the buffer. For example, the system 100 outputs the contents of the buffer to the input/output devices 118. At 2120, the method 2000 clears the buffer. For example, the system 100 clears the buffer. The method 2100 ends.

Figure 22:
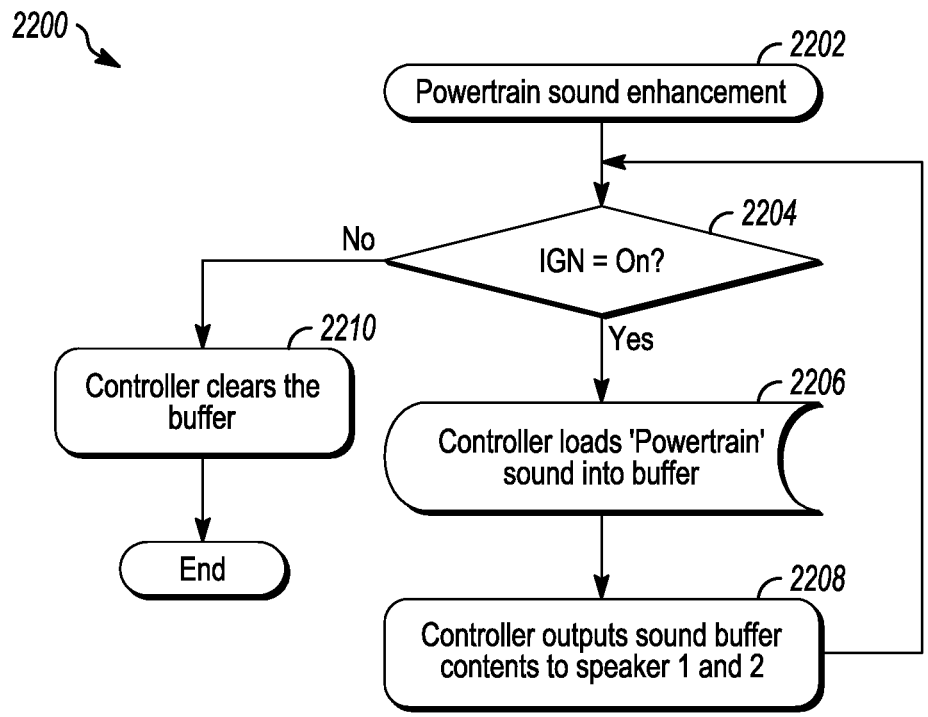
FIG. 22 is a flow diagram generally illustrating an alternative vehicle alert generation method according to the principles of the present disclosure.

FIG. 22 is a flow diagram generally illustrating an alternative vehicle alert generation method 2200 according to the principles of the present disclosure. The method 2200 may be customizable. For example, the operator may interact with the system 100 to customize the method 2200 (e.g., by providing various input and/or instructions). At 2202, the method 2200 begins. At 2204, the method 2200 determines whether the ignition is on. For example, the system 100 determines whether the ignition is on based on the various sensor data. If true, the method continues at 2206. If false, the method continues at 2210. At 2206, the method 2200 loads the powertrain enhancement sound into the buffer. At 2208, the method 2200 outputs the contents of the buffer. For example, the system 100 outputs the contents of the buffer to the input/output devices 118. At 2210, the method 2200 clears the buffer. For example, the system 100 clears the buffer. The method 2200 ends.

Figure 23:
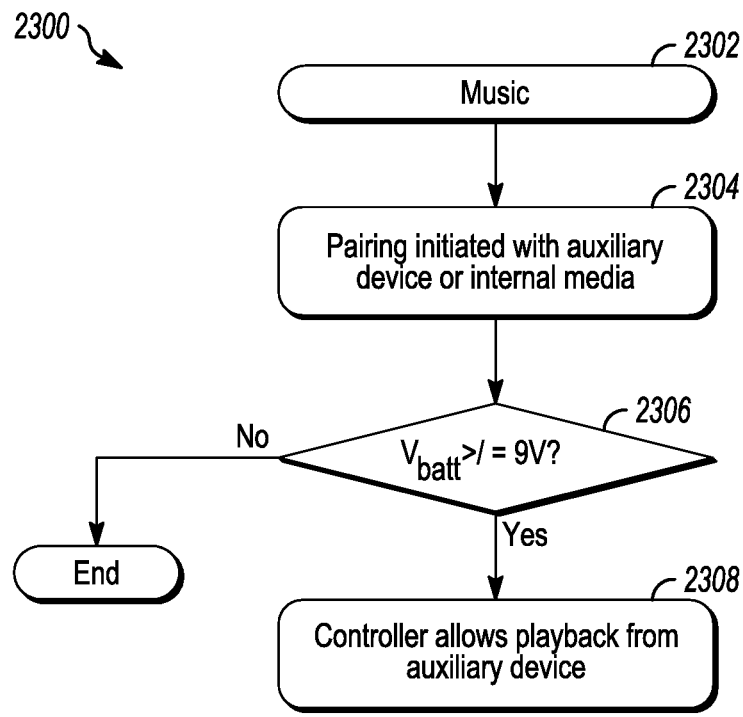
FIG. 23 is a flow diagram generally illustrating an alternative vehicle alert generation method according to the principles of the present disclosure.

FIG. 23 is a flow diagram generally illustrating an alternative vehicle alert generation method 2300 according to the principles of the present disclosure. The method 2300 may be customizable. For example, the operator may interact with the system 100 to customize the method 2300 (e.g., by providing various input and/or instructions). At 2302, the method 2300 begins. At 2304, the method 2300 initiates pairing with an auxiliary device or internal media. For example, the system 100 initiates pairing with an auxiliary device or internal media. At 2306, the method 2300 determines whether a battery voltage is greater than or equal to a threshold voltage. For example, the system 100 may determine whether the battery voltage of a battery of the vehicle is greater than or equal to 9 volts. It should be understood that the threshold voltage may include any suitable voltage. For example, the threshold voltage may include 9 volts, 12 volts, 24 volts, or any suitable voltage value. The system 10 may determine whether the battery voltage is greater than or equal to the threshold voltage based on the various sensor data. If false, the method 2300 ends. If true, the method 2300 allows playback from the auxiliary device. For example, the system 100 allows playback through output devices within the vehicle of the auxiliary device.

Figure 24:
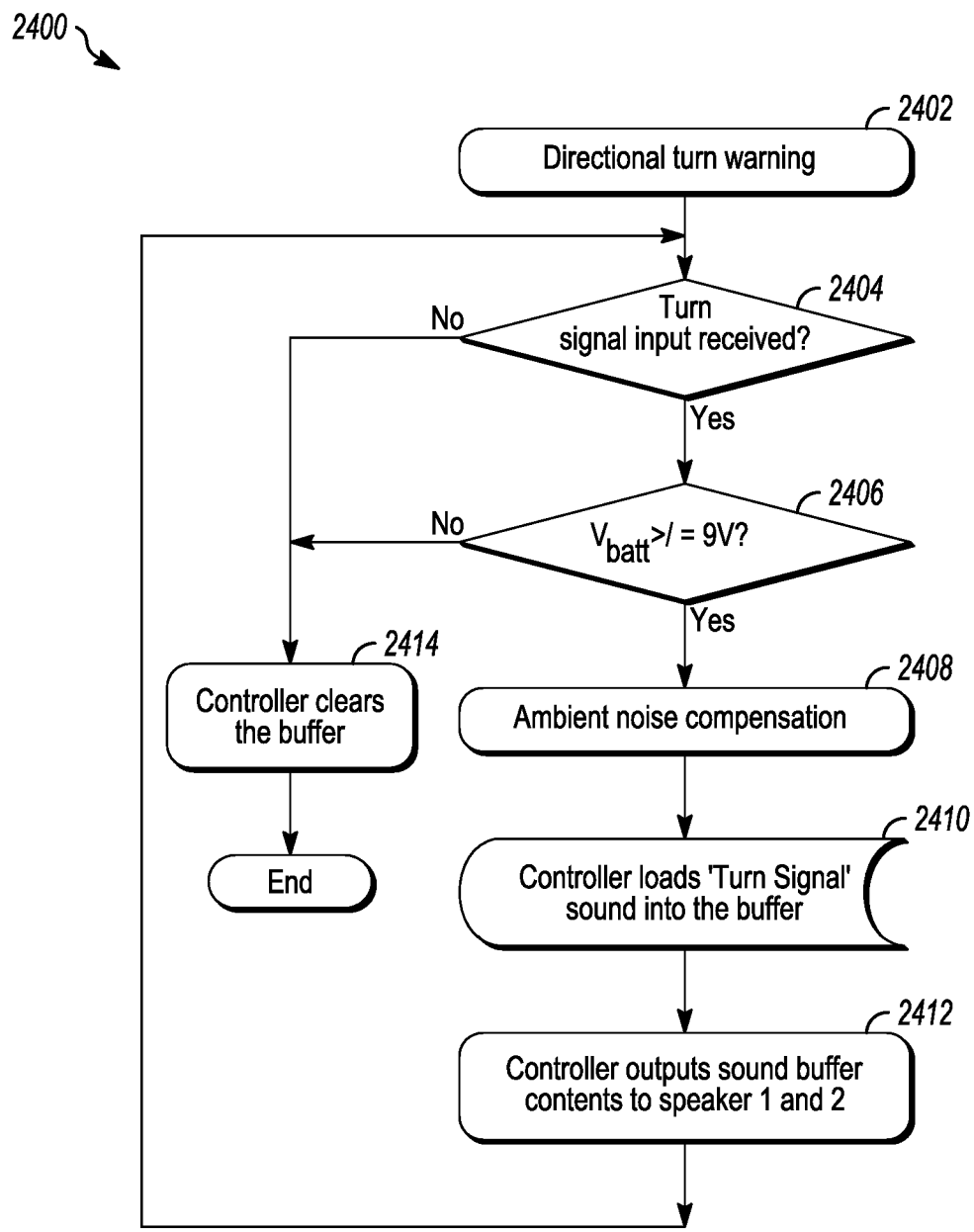
FIG. 24 is a flow diagram generally illustrating an alternative vehicle alert generation method according to the principles of the present disclosure.

FIG. 24 is a flow diagram generally illustrating an alternative vehicle alert generation method 2400 according to the principles of the present disclosure. At 2402, the method 2400 begins. At 2404, the method 2400 determines whether turn signal input is received. For example, the system 100 determines whether a turn signal input is received based on the various sensor data. If true, the method continues at 2406. If false, the method continues at 2414. At 2406, the method 2400 determines whether a battery voltage is greater than or equal to a threshold voltage. For example, the system 100 may determine whether the battery voltage of a battery of the vehicle is greater than or equal to 9 volts. It should be understood that the threshold voltage may include any suitable voltage. For example, the threshold voltage may include 9 volts, 12 volts, 24 volts, or any suitable voltage value. The system 10 may determine whether the battery voltage is greater than or equal to the threshold voltage based on the various sensor data. If false, the method 2400 continues at 2414. If true, the method 2400 continues at 2408. At 2408, the method 2400 applies an ambient noise compensation. For example, the system 100 determines the loudness of the sound based on the various sensor data. At 2410, the method 2400 loads a turn signal sound into the buffer. At 2412, the method 2400 outputs the contents of the buffer. For example, the system 100 outputs the contents of the buffer to the input/output devices 118. At 2414, the method 2400 clears the buffer. For example, the system 100 clears the buffer. The method 2400 ends.

Figure 25:
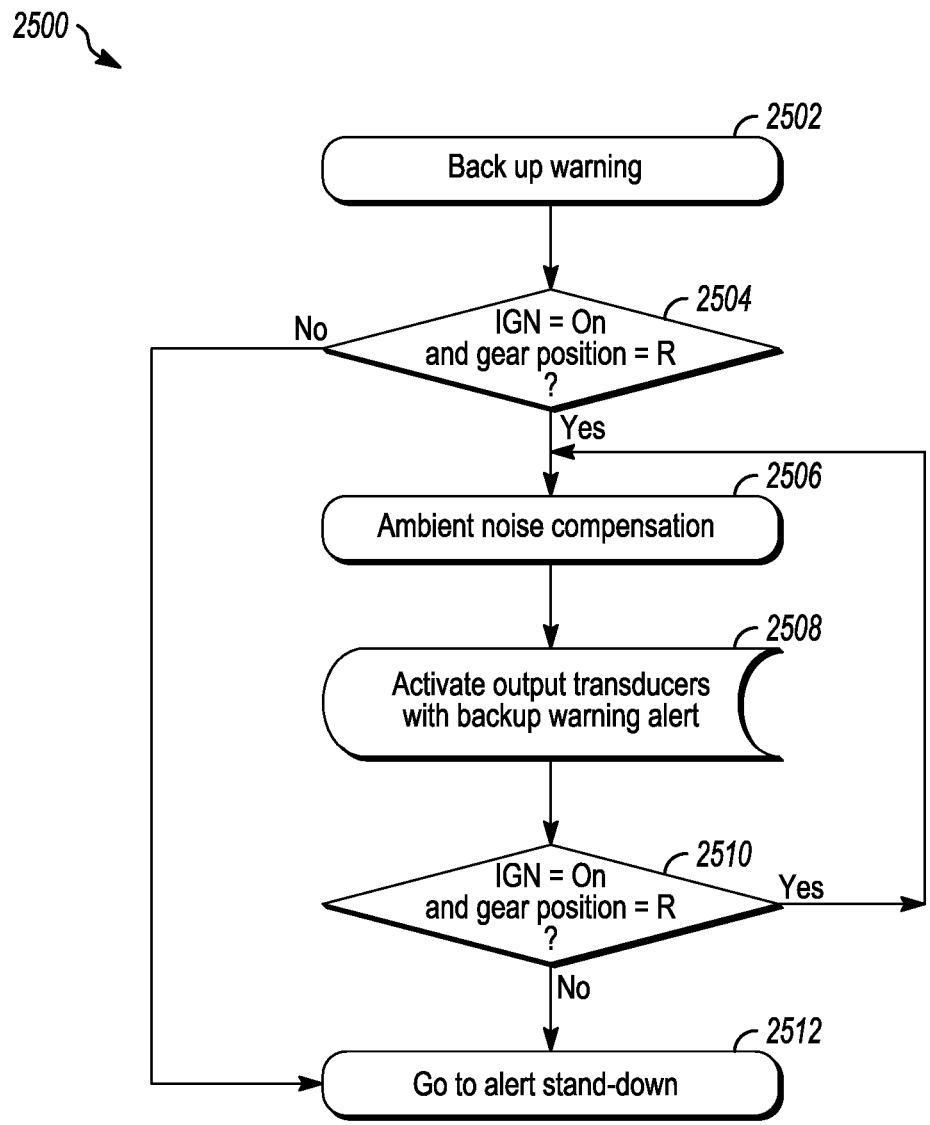
FIG. 25 is a flow diagram generally illustrating an alternative vehicle alert generation method according to the principles of the present disclosure.

FIG. 25 is a flow diagram generally illustrating an alternative vehicle alert generation method 2500 according to the principles of the present disclosure. At 2502, the method 2500 begins. At 2504, the method 2500 determines whether the vehicle ignition is on and the gear position is equal to reverse. For example, the system 100 determines whether the vehicle ignition is on and in a reverse or backup mode based on the various sensor data. If false, the method 2500 continues at 2512. If true, the method 2500 continues at 2506. At 2506, the method 2500 applies an ambient noise compensation. For example, the system 100 determines the loudness of the sound based on the various sensor data. At 2508, the method 2500 activates the output transduces with backup warning alert. For example, the system 100 activates the transducers 118. At 2510, the method 2500 determines if vehicle ignition is on and the gear position is equal to reverse. If true, the method 2500 continues at 2506. If false, the method 2500 continues at 2512. At 2512, the method 2500 goes into alert stand down.

Figure 26:
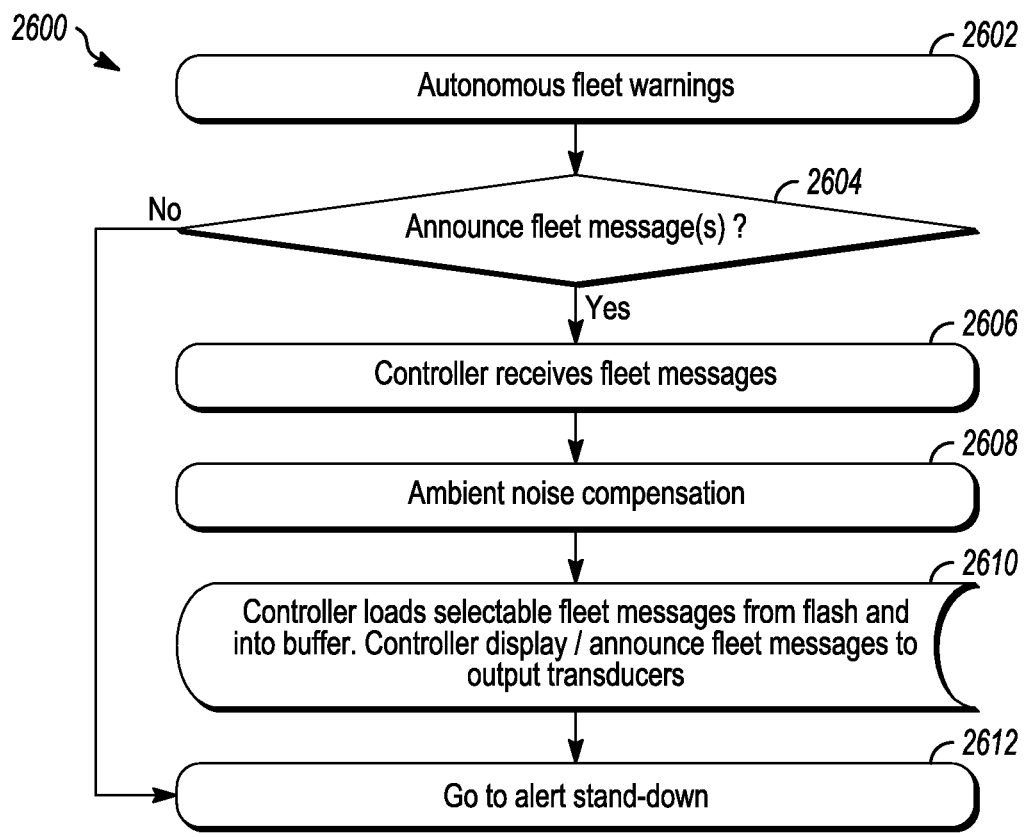
FIG. 26 is a flow diagram generally illustrating an alternative vehicle alert generation method according to the principles of the present disclosure.

FIG. 26 is a flow diagram generally illustrating an alternative vehicle alert generation method 2600 according to the principles of the present disclosure. At 2602, the method 2600 begins. At 2604, the method 2600 determines whether an announce fleet message was received. For example, the system 100 may determine whether an announce message was received using the various sensor data. If false, the method 2600 continue at 2612. If true, the method 2600 continues at 2606. At 2606, the method 2600 receives the fleet messages. For example, the system 100 may receive fleet messages as part of the various sensor data. At 2608, the method 2600 applies an ambient noise compensation. For example, the system 100 determines the loudness of the sound based on the various sensor data. At 2610, the method 2600 loads selectable fleet message sounds into the buffer. For example, the system 100 loads the selectable fleet message sounds into the buffer and outputs the contents of the buffer. For example, the system 100 outputs the contents of the buffer to the input/output devices 118. At 2610, the method 2600 goes to an alert stand-down mode. For example, the system 100 enters an alert stand-down mode.

Figure 27:
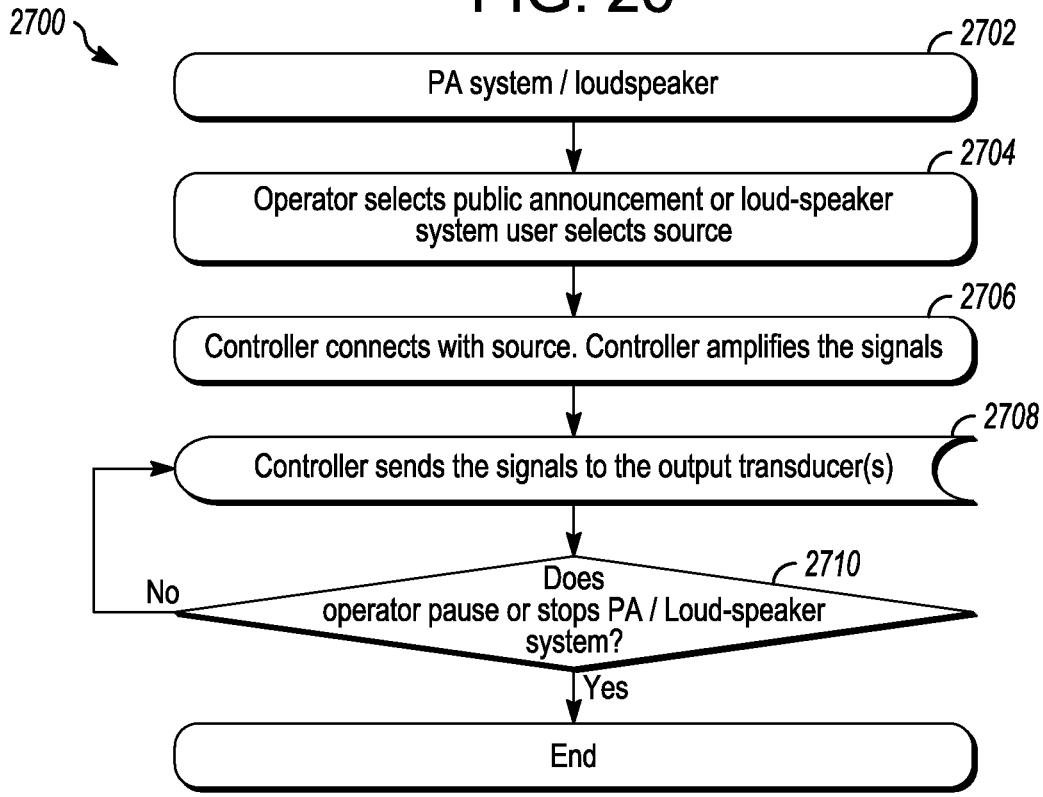
FIG. 27 is a flow diagram generally illustrating an alternative vehicle alert generation method according to the principles of the present disclosure.

FIG. 27 is a flow diagram generally illustrating an alternative vehicle alert generation method 2700 according to the principles of the present disclosure. At 2702, the method 2700 begins. At 2704, the method 2700 selects public announcement or loudspeaker system and selects a source. For example, the operator may select the public announcement or load-speaker system and the source. At 2706, the method 2700 connects with the selected source and amplifies the signal. For example, the system 100 may connect with the selected source and amplify the signal. At 2708, the method 2700 send the signal to the output transducers. For example, the system 100 communicates the signals to the input/output devices 118. At 2710, the method 2700 determines whether the operator paused or stopped the public announcement or loudspeaker system. For example, the system 100 determines whether the operator paused or stopped the public announcement or loudspeaker system using the various sensor data. If false, the method 2700 continues at 2708. If true, the method 2700 ends.

Figure 28:
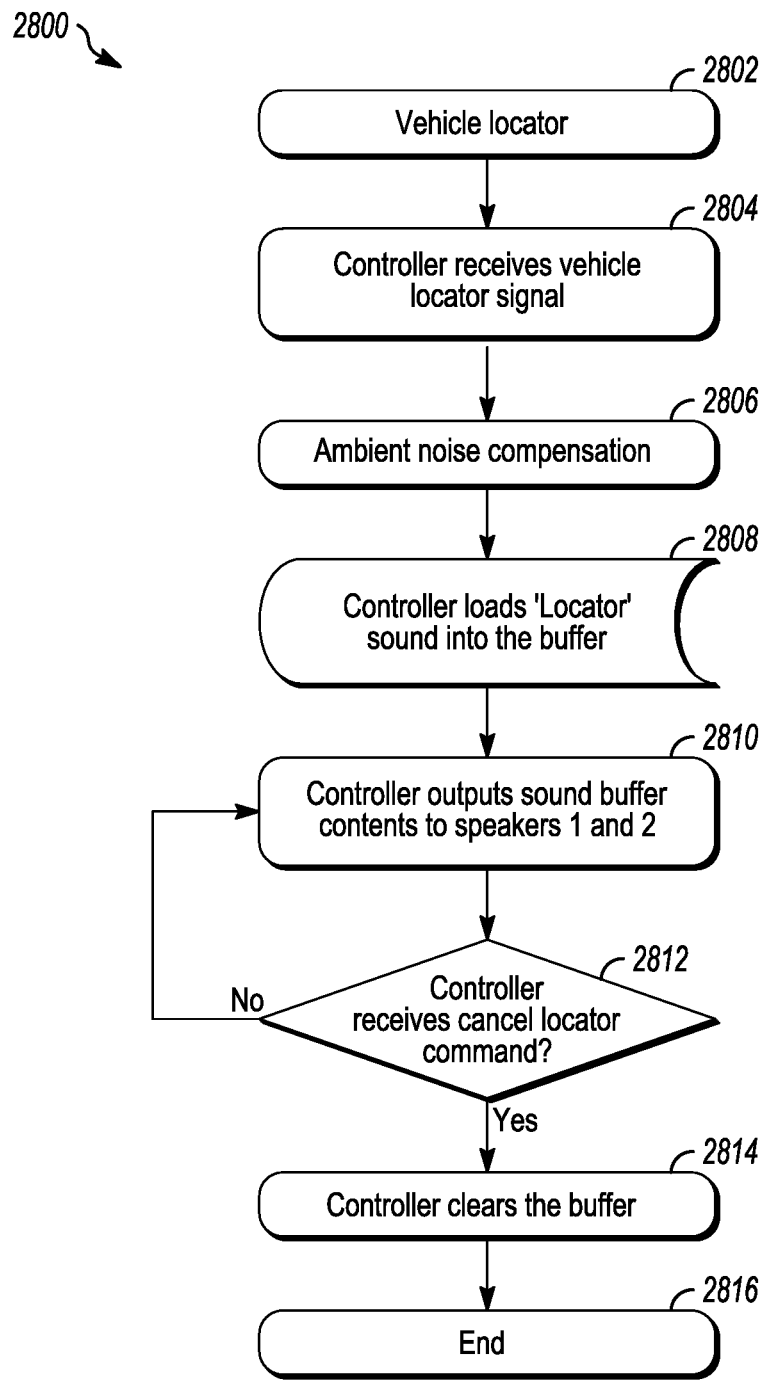
FIG. 28 is a flow diagram generally illustrating an alternative vehicle alert generation method according to the principles of the present disclosure.

FIG. 28 is a flow diagram generally illustrating an alternative vehicle alert generation method 2800 according to the principles of the present disclosure. At 2802, the method 2800 begins. At 2804, the method 2800 initiates a vehicle locator sound. For example, the operator may initiate a vehicle locator sound. At 2806, the method 2800 applies an ambient noise compensation. For example, the system 100 determines the loudness of the sound based on the various sensor data. At 2808, the method 2800 loads a locator sound into the buffer. For example, the system 100 loads the locator sound into the buffer. At 2810, the method 2800 outputs the sound buffer contents. For example, the system 100 outputs the sound buffer contents to the input/output devices 118. At 2812, the method 2800 determines whether a cancel sound signal was received. For example the system 100 determines whether a cancel sound signal was received using the various sensor data. If true, the method 2800 continues at 2814. If false, the method 2800 continues at 2810. At 2814, the method 2800 clears the buffer. For example, the system 100 clears the buffer. At 2816, the method 2800 ends.

Figure 29:
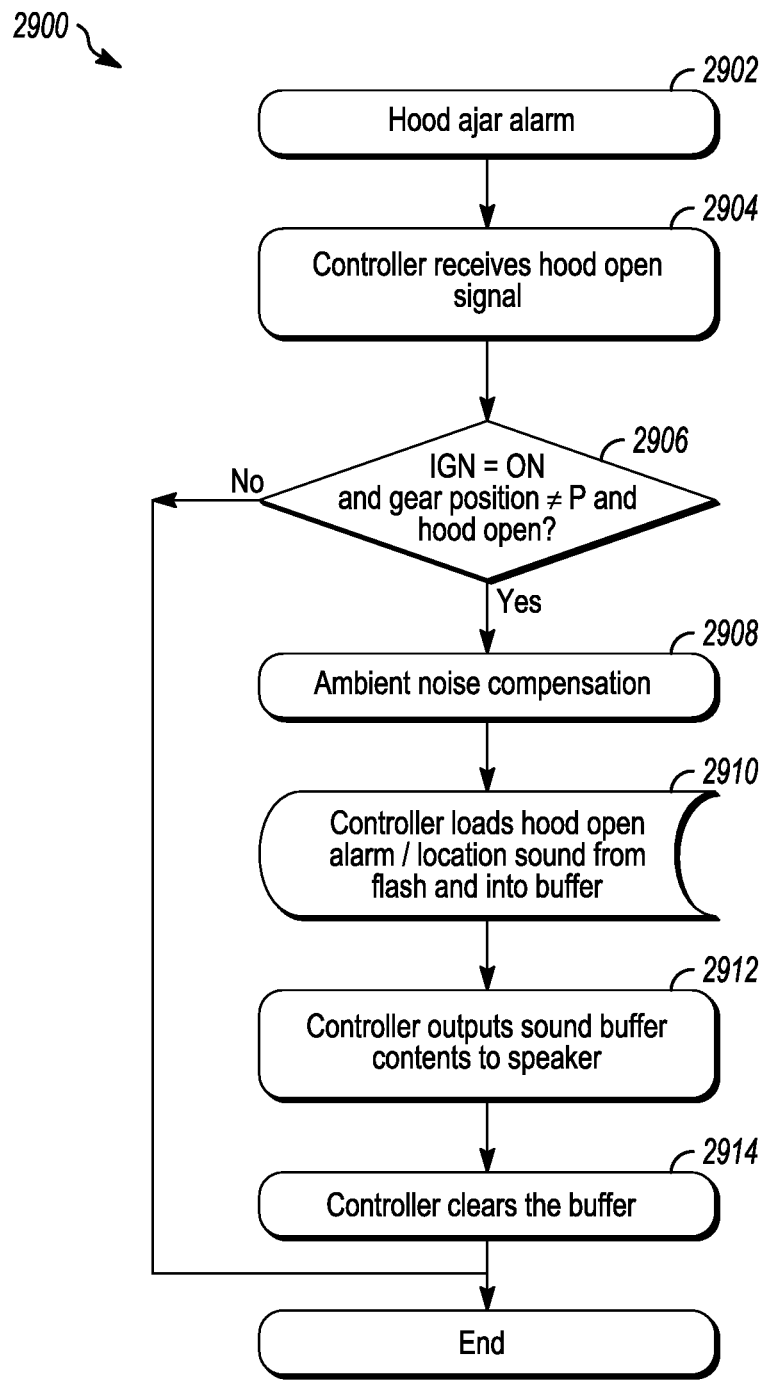
FIG. 29 is a flow diagram generally illustrating an alternative vehicle alert generation method according to the principles of the present disclosure.

FIG. 29 is a flow diagram generally illustrating an alternative vehicle alert generation method 2900 according to the principles of the present disclosure. At 2902, the method 2900 begins. At 2904, the method 2900 receives a hood open signal. For example, the system 100 receives a hood open signal as part of the various sensor data. At 2906, the method 2900 determines whether the hood is open and the ignition is on and the gear position is not equal to Park. For example, the system 100 determines whether the hood is open and the ignition is on and the gear Position is not equal to Park based on the various sensor data. If false the method 2900 ends. If true, the method 2900 continues at 2908. At 2908, the method 2900 applies an ambient noise compensation. For example, the system 100 determines the loudness of the sound based on the various sensor data. At 2910, the method 2900 loads a hood open alarm/location sound into the buffer. For example, the system 100 loads the hood open alarm/location sound into the buffer. At 2912, the method 2900 outputs the contents of the buffer. For example, the system 100 outputs the contents of the buffer to the input/output devices 118. At 291, the method 2900 clears the buffer. For example, the system 100 clears the buffer. At 2914, the method 2900 ends.

Figure 30:
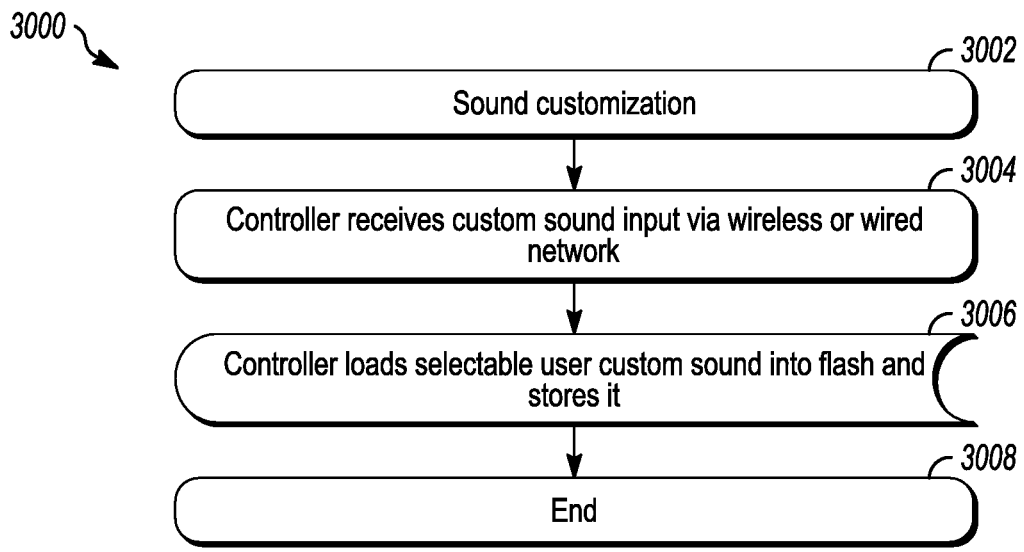
FIG. 30 is a flow diagram generally illustrating an alternative vehicle alert generation method according to the principles of the present disclosure.

FIG. 30 is a flow diagram generally illustrating an alternative vehicle alert generation method 3000 according to the principles of the present disclosure. At 3002, the method 3000 begins. At 3004, the method 3000 receives a custom sound input via a wireless device, a vehicle network, or a direct correction. For example, the system 100 receives a custom sound input via a wireless device, a vehicle network, or a direct correction. At 3006, the method 3000 loads selectable user custom sound and stores it. For example, the system 100 loads selectable user custom sound and stores it in memory for later retrieval. The method 3000 ends.

Figure 31:
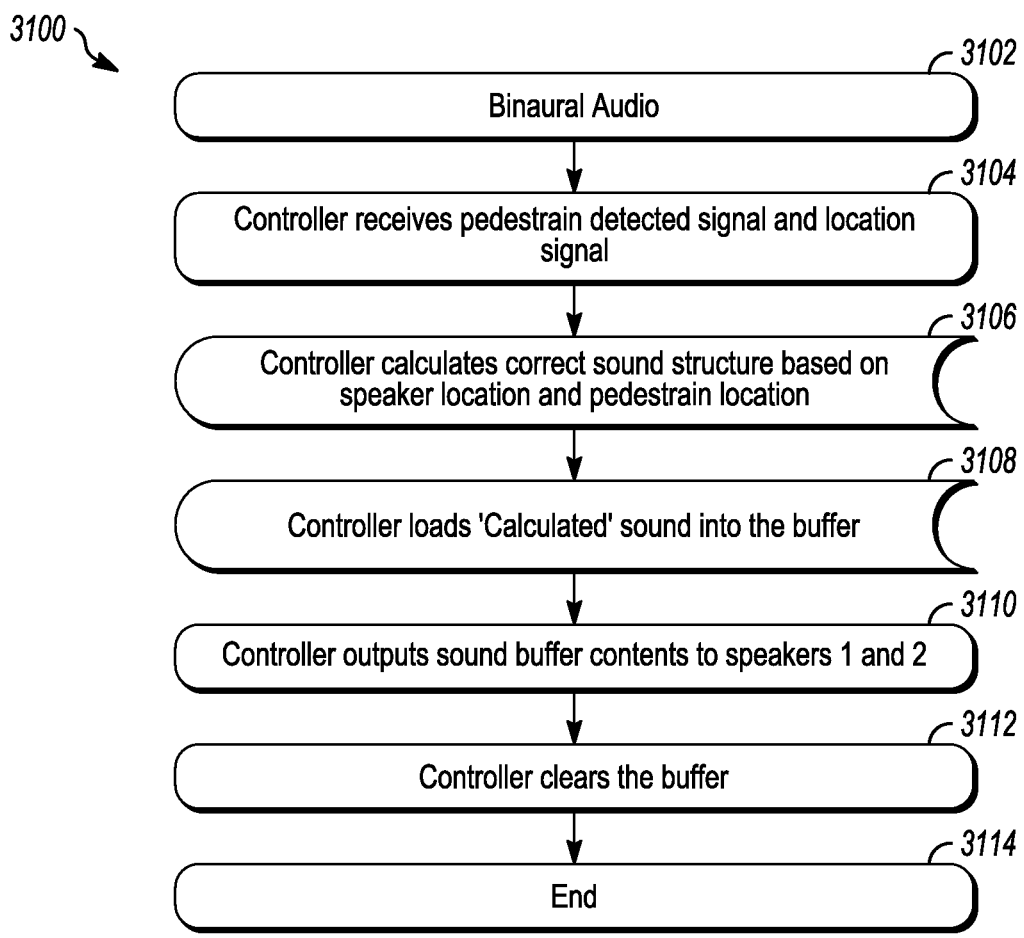
FIG. 31 is a flow diagram generally illustrating an alternative vehicle alert generation method according to the principles of the present disclosure.

FIG. 31 is a flow diagram generally illustrating an alternative vehicle alert generation method 3100 according to the principles of the present disclosure. At 3102, the method 3100 begins. At 3104, the method 3100 receives a pedestrian detected signal and location signal. For example, the system 100 receives a pedestrian detected signal and location signal as part of the various sensor data. At 3106, the method 3100 calculates a correct sound structure based on speaker location and pedestrian location. For example, the system 100 may calculate a correct sound structure based on speaker location and pedestrian location using the various sensor data. At 3108, the method 3100 loads the calculated sound into the buffer. For example, the system 100 loads the calculated sound into the buffer. At 3110, the method 3100 outputs the contents of the buffer. For example, the system 100 outputs the contents of the buffer to the input/output devices 118. At 3112, the method 3100 clears the buffer. For example, the system 100 clears the buffer. The method 3100 ends.

Figure 32:
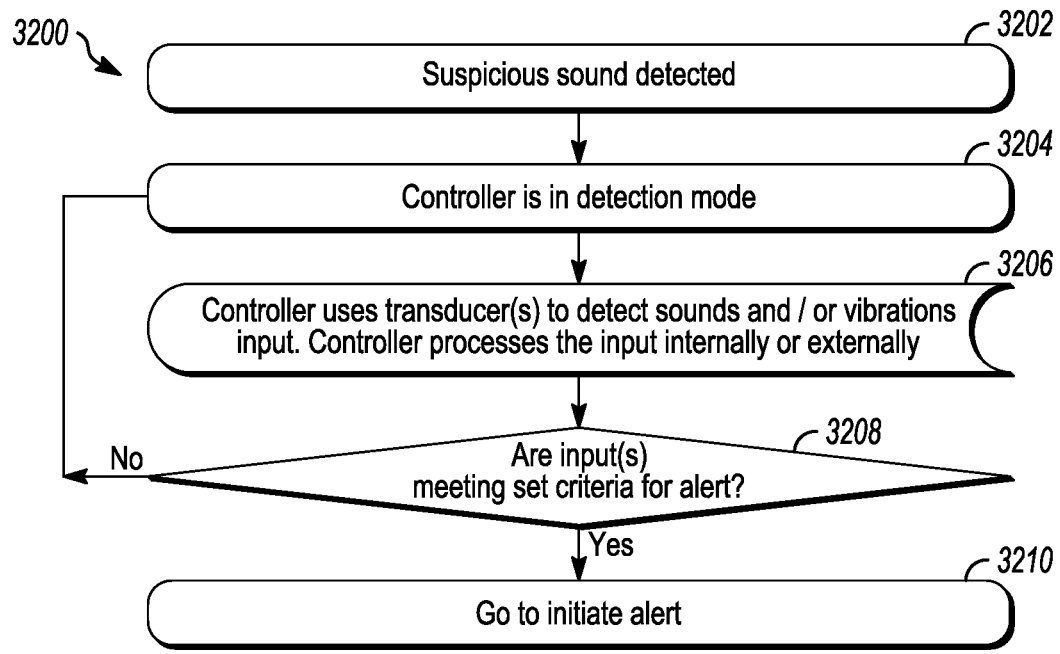
FIG. 32 is a flow diagram generally illustrating an alternative vehicle alert generation method according to the principles of the present disclosure.

FIG. 32 is a flow diagram generally illustrating an alternative vehicle alert generation method 3200 according to the principles of the present disclosure. At 3202, the method 3200 begins. At 3204, the method 3200 enters a detection mode. For example, the system 100 enters a detection mode. At 3206, the method 3200 uses transducers to detect sound and/or vibrations as input and processes the input internally or externally. For example, the system 100 uses the input/output devices 118 to detect sound and/or vibrations (e.g., using microphones or other input devices of the input/output devices 118) as input and processes the input internally or externally. At 3208, the method 3200 determines whether the inputs are meeting set criteria for an alert. For example, the system 100 may determine whether the inputs are meeting set criteria for an alert. If false, the method 3200 continues at 3204. If true, the method 3200 continues at 3210. At 3210, the method 3200 initiates the alert. For example, the system 100 initiates the alert.

Figure 33:
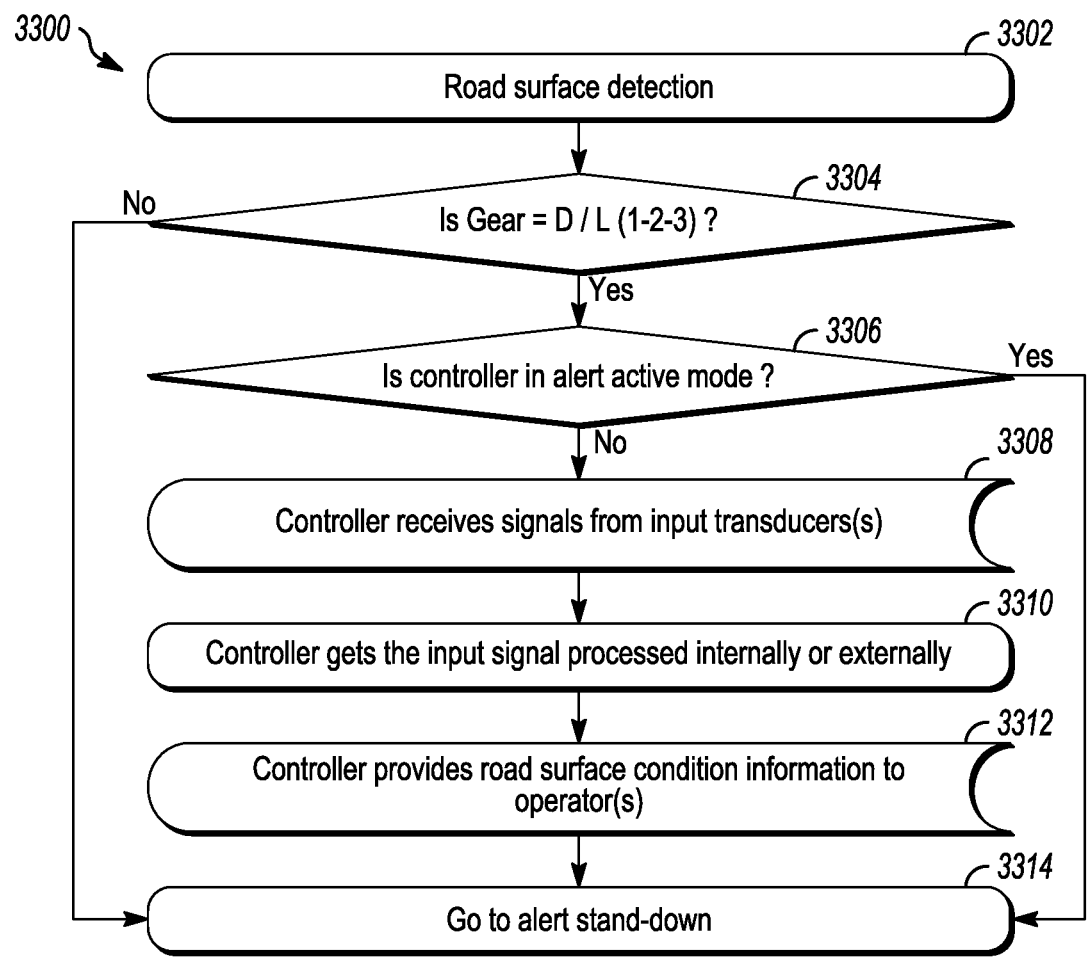
FIG. 33 is a flow diagram generally illustrating an alternative vehicle alert generation method according to the principles of the present disclosure.

FIG. 33 is a flow diagram generally illustrating an alternative vehicle alert generation method 3300 according to the principles of the present disclosure. At 3302, the method 3300 begins. At 3304, the method 3300 determine whether the vehicle gear is drive or low (e.g., first gear, second gear, third gear). For example, the system 100 determines whether the vehicle gear is drive or low (e.g., first gear, second gear, and third gear) based on the various sensor data. If false, the method 3300 continue at 3314. If true, the method 3300 continues at 3306. At 3306, the method 3300 determines whether the controller is in alert active mode. For example, the system 100 determines whether the controller 102 is in the alert active mode. If true, the method 3300 continues at 3314. If false, the method 3300 continues at 3308. At 3308, the method 3300 receives signals from input transducers. For example, the system 100 may receive input signals from the input/output devices 118. At 3310, the method 3300 processes the input signals internally and/or externally. For example, the system 100 may process the input signals internally and/or externally. At 3312, the method 3300 provides road service condition information to the operator. For example, the system 100 may use the various sensor data, including the input signals, to generate information corresponding to the road surface condition. The system 100 provides the information to the operation via a display (e.g., within the vehicle, on a mobile device, or other suitable display). At 3314, the method 3300 enters an alert stand-down mode. For example, the system 100 enters the alert stand-down mode.

Figure 34:
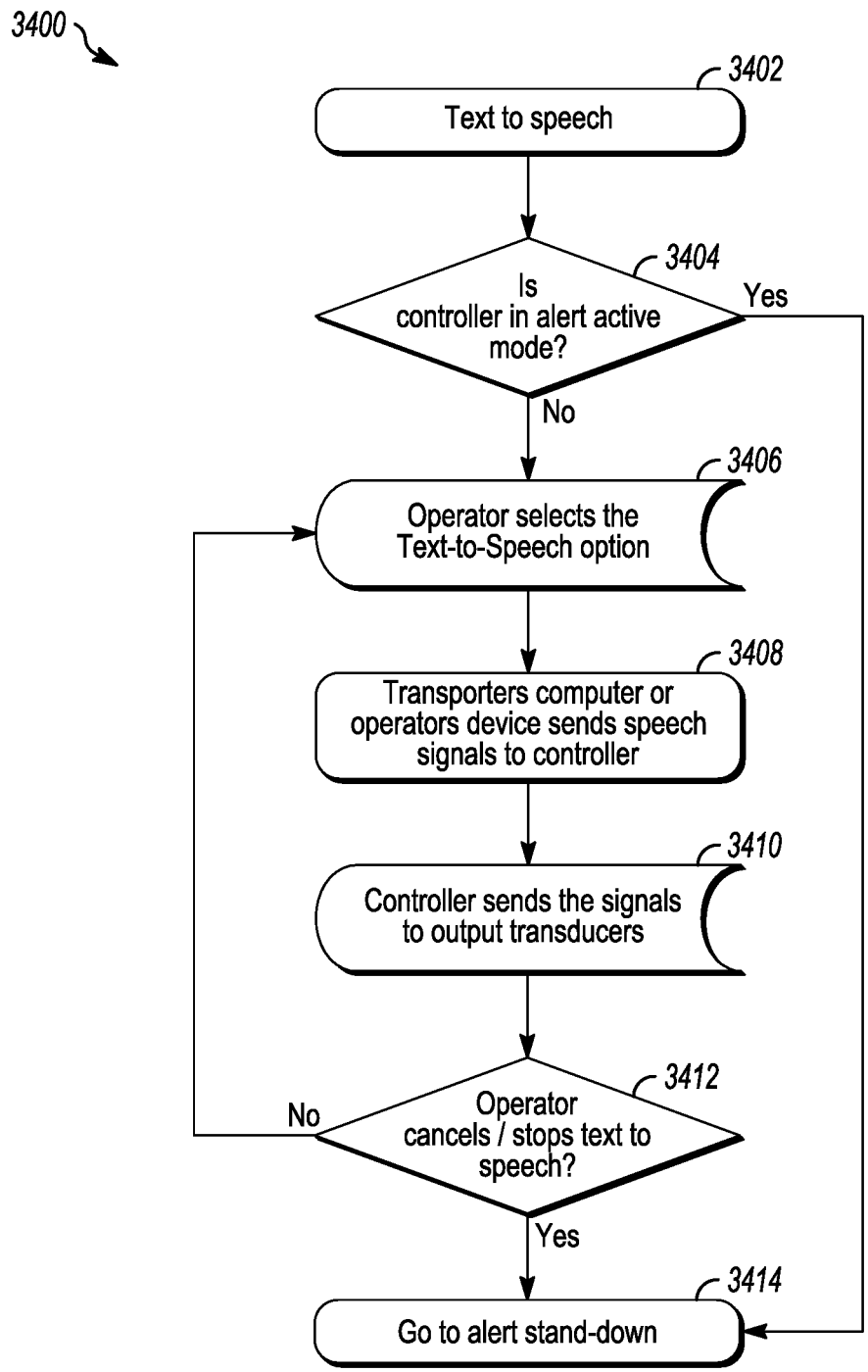
FIG. 34 is a flow diagram generally illustrating an alternative vehicle alert generation method according to the principles of the present disclosure.

FIG. 34 is a flow diagram generally illustrating an alternative vehicle alert generation method 3400 according to the principles of the present disclosure. The method 3400 may be customizable. For example, the operator may interact with the system 100 to customize the method 3400 (e.g., by providing various input and/or instructions). At 3402, the method 3400 begins. At 3404, the method 3400 determines whether the controller is in the alert active mode. For example, the system 100 determines whether the controller 102 is in the alert active mode. If false, the method 3400 continues at 3406. If true, the method 340 continues at 3414. At 3406, the method 3400 selects the text-to-speech option. For example, the operator may select the text-to-speech option (e.g., from a suitable display). At 3408, the method 3400 sends speech signals to the controller. For example, the system 100, another computer within the vehicle, or a mobile device of the operator communications speed signals to the controller 102. At 3410, the method 3400 communicates the speech signals to output transducers. For example, the system 100 communicates the speed signals to the input/output devices 118. At 3412, the method 3400 determines whether the operator canceled or stopped the text-to-speech. For example, the system 100 determines whether the operator canceled or stopped the text-to-speech based on the various sensor data. If false, the method 3400 continues at 3406. If true, the method 3400 continues at 3414. At 3414, the method 3400 enters the alert stand-down mode. For example, the system 100 enters the alert stand-down mode.

Figure 35:
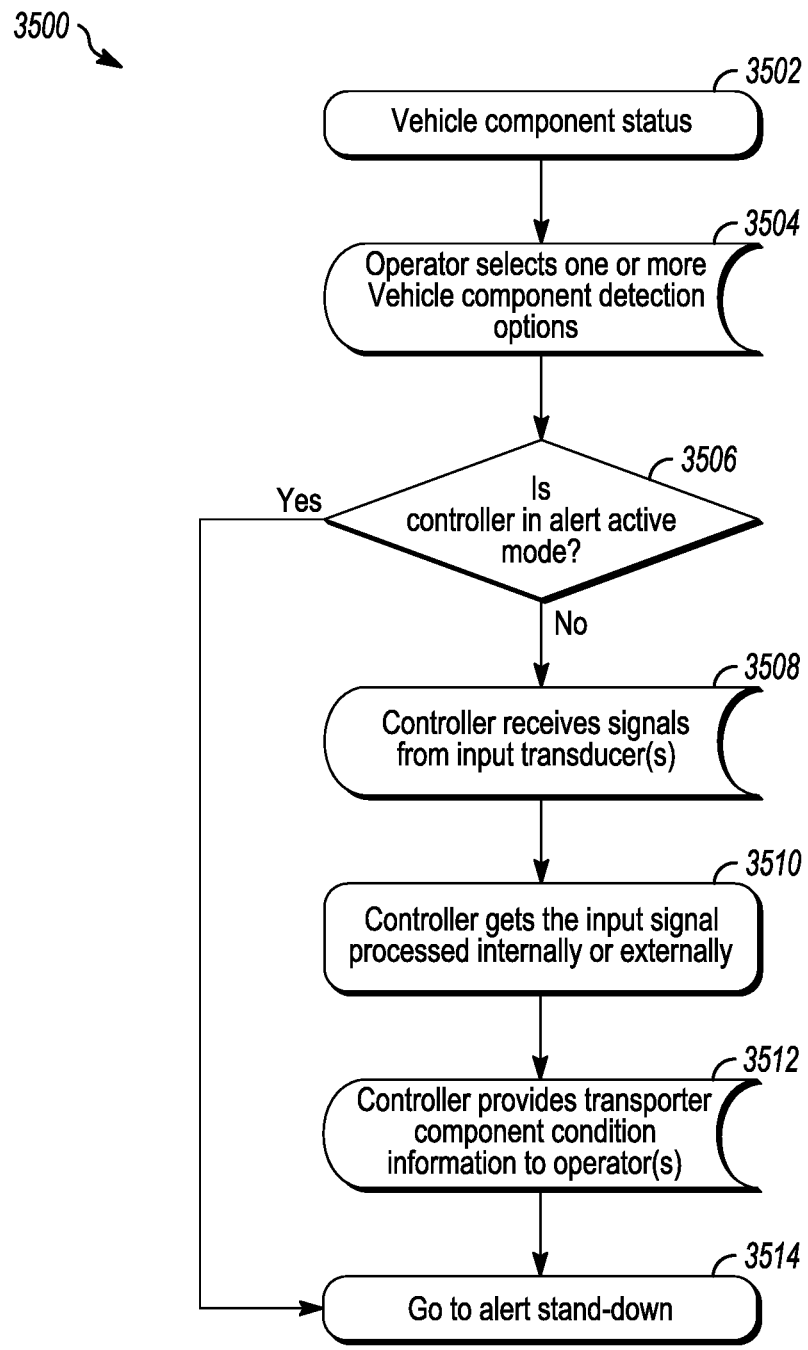
FIG. 35 is a flow diagram generally illustrating an alternative vehicle alert generation method according to the principles of the present disclosure.

FIG. 35 is a flow diagram generally illustrating an alternative vehicle alert generation method 3500 according to the principles of the present disclosure. At 3502, the method 3500 begins. At 3504, the method 3500 selects one or more vehicle component detection operations. For example, the operator selects one more vehicle component detection operations from a suitable display. At 3506, the method 3500 determines whether the controller is in alert active mode. For example, the system 100 determines whether the controller 102 is in the alert active mode. If true, the method 3500 continues at 3514. If false, the method 3500 continues at 3508. At 3508, the method 3500 receives signals from input transducers. For example, the system 100 may receive input signals from the input/output devices 118. At 3510, the method 3500 processes the input signals internally and/or externally. For example, the system 100 may process the input signals internally and/or externally. At 3512, the method 3500 provides road service condition information to the operator. For example, the system 100 may use the various sensor data, including the input signals, to generate information corresponding to the road surface condition. The system 100 provides the information to the operation via a display (e.g., within the vehicle, on a mobile device, or other suitable display). At 3514, the method 3500 enters an alert stand-down mode. For example, the system 100 enters the alert stand-down mode.

Figure 36:
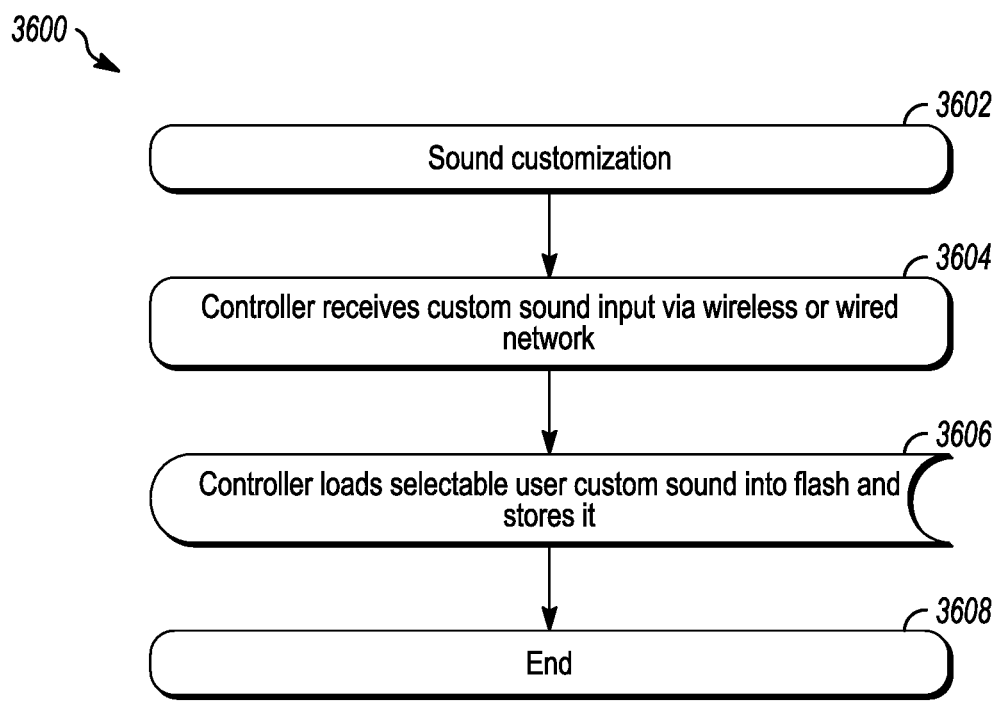
FIG. 36 is a flow diagram generally illustrating an alternative vehicle alert generation method according to the principles of the present disclosure.

FIG. 36 is a flow diagram generally illustrating an alternative vehicle alert generation method 3600 according to the principles of the present disclosure. At 3602, the method 3600 begins. At 3604, the method 3600 receives a plurality of custom sound inputs. For example, the system 100 receives a plurality of custom sound inputs from various suitable sources. At 3606, the method 3600 loads selectable user custom sounds and stores them. For example, the system 100 loads selectable user custom sounds and stores them in memory for later retrieval. At 3608, the method 3600 ends.

Figure 37:
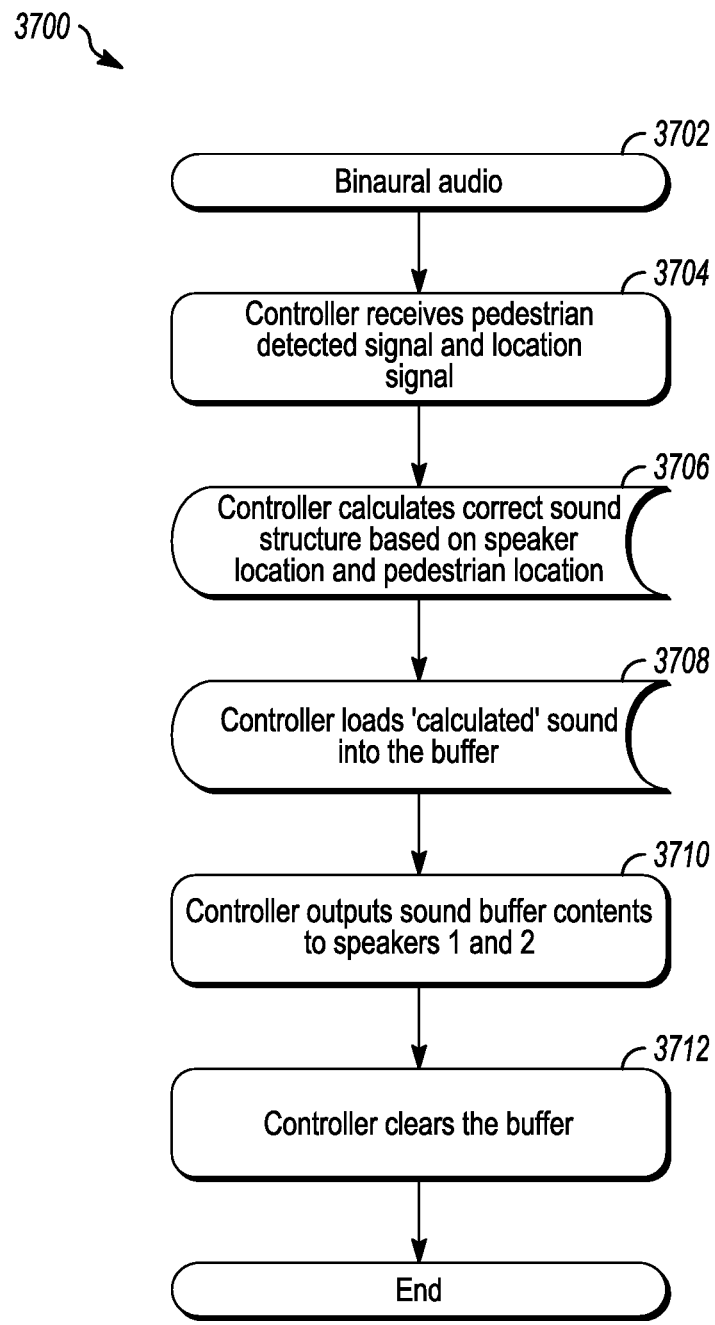
FIG. 37 is a flow diagram generally illustrating an alternative vehicle alert generation method according to the principles of the present disclosure.

FIG. 37 is a flow diagram generally illustrating an alternative vehicle alert generation method 3700 according to the principles of the present disclosure. At 3702, the method 3700 begins. At 3704, the method 3700 receives various pedestrian information. For example, the system 100 receives various pedestrian information, such as a location of a pedestrian as part of the various sensor data. At 3706, the method 3700 calculates a correct sound structure based on speaker location and the various pedestrian information. For example, the system 100 may calculate a correct sound structure based on speaker location and the various pedestrian information using the various sensor data. At 3708, the method 3700 loads the calculated sound into the buffer. For example, the system 100 loads the calculated sound into the buffer. At 3710, the method 3700 outputs the contents of the buffer. For example, the system 100 outputs the contents of the buffer to the input/output devices 118. At 3712, the method 3700 clears the buffer. For example, the system 100 clears the buffer. The method 3700 ends.

Figure 38:
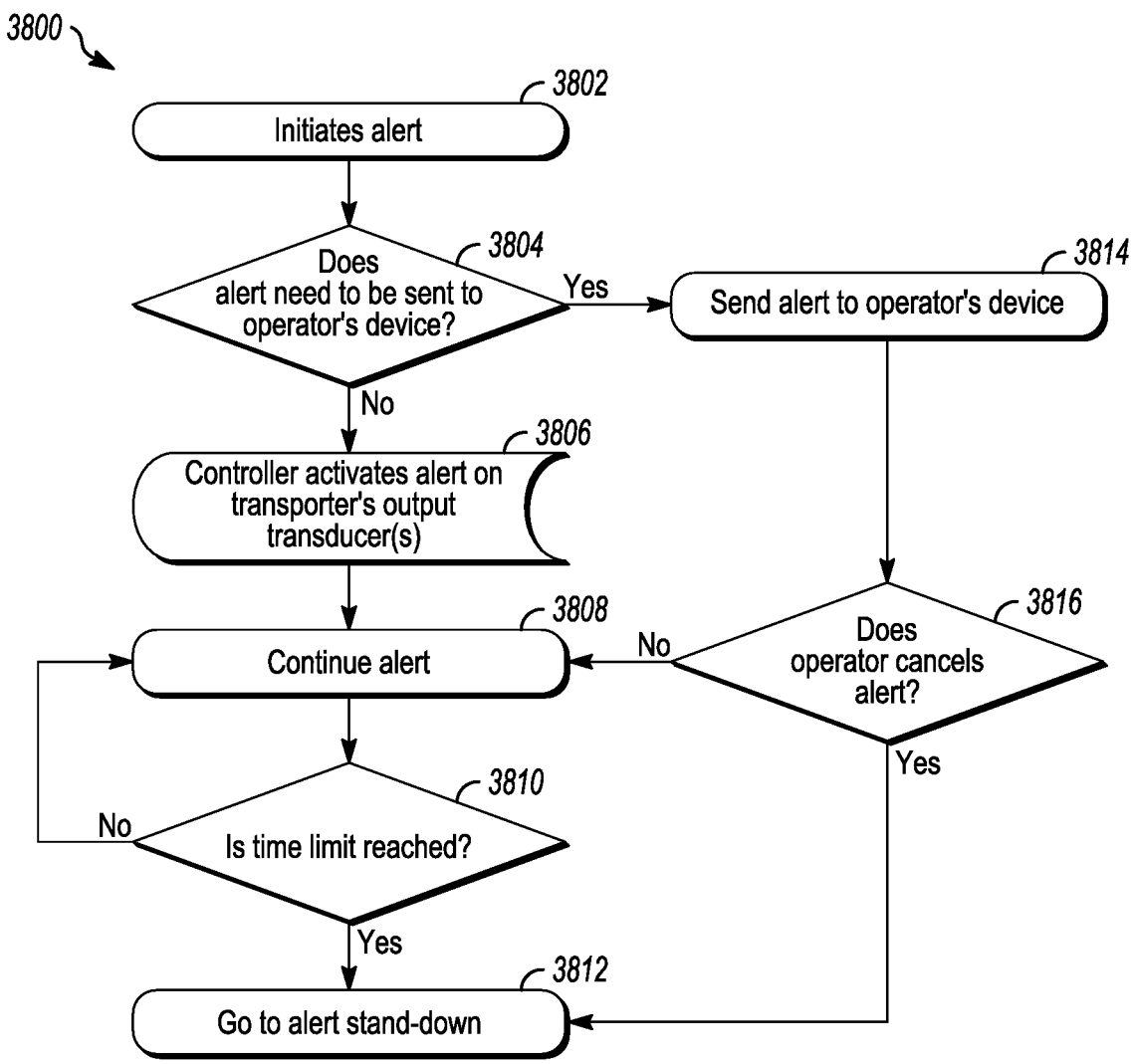
FIG. 38 is a flow diagram generally illustrating an alternative vehicle alert generation method according to the principles of the present disclosure.

FIG. 38 is a flow diagram generally illustrating an alternative vehicle alert generation method 3800 according to the principles of the present disclosure. At 3802, the method 3800 begins. At 3804, the method 3800 determines whether an alert needs to be sent to the operator device. For example, the system 100 may determine whether an alert needs to be sent to the operator device based on the various sensor data. If true, the method 3800 continues at 3814. If false, the method 3800 continues at 3806. At 3806, the method 3800 activates alert on the vehicles output transducers. For example, the system 100 communicates the alert to the input/output devices 118. At 3808, the method 3800 continues to provide the alert. For example, the system 100 continues to provide the alert to the input/output devices 118. At 3810, the method 3800 determines whether a time limit has been reached. For example, the system 100 determines whether a time limit has been reached (e.g., that the alert should be disabled) based on the various sensor data. If false, the method 3800 continues at 3808. If true, the method continues at 3812. At 3814, the method 3800 sends the alert to the operator's device. For example, the system 100 provides the alert to the operator's device using a wireless network, a direct connection, or other suitable communication mechanism. At 3816, the method 3800 determines whether the operator cancelled the alert. For example, the system 100 determines whether the operator cancelled the alert on the mobile device using the various sensor data. If false, the method 3800 continues at 3808. If true, the method continues at 3812. At 3812, the method 3800 enters the alert stand-down mode. For example, the system 100 enters the alert stand-down mode.

Figure 39:
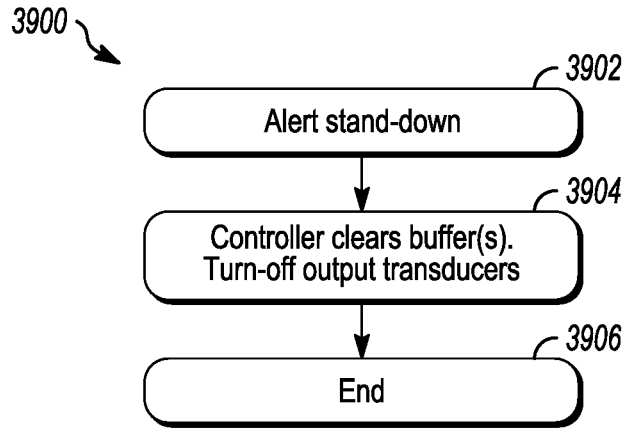
FIG. 39 is a flow diagram generally illustrating an alternative vehicle alert generation method according to the principles of the present disclosure.

FIG. 39 is a flow diagram generally illustrating an alternative vehicle alert generation method 3900 according to the principles of the present disclosure. At 3902, the method 3900 begins. At 3904, the method 3900 clears buffers and turns off the output transducers. For example, the system 100 clears the buffers and turn off the input/output devices 118. The method 3900 ends.

Figure 40:
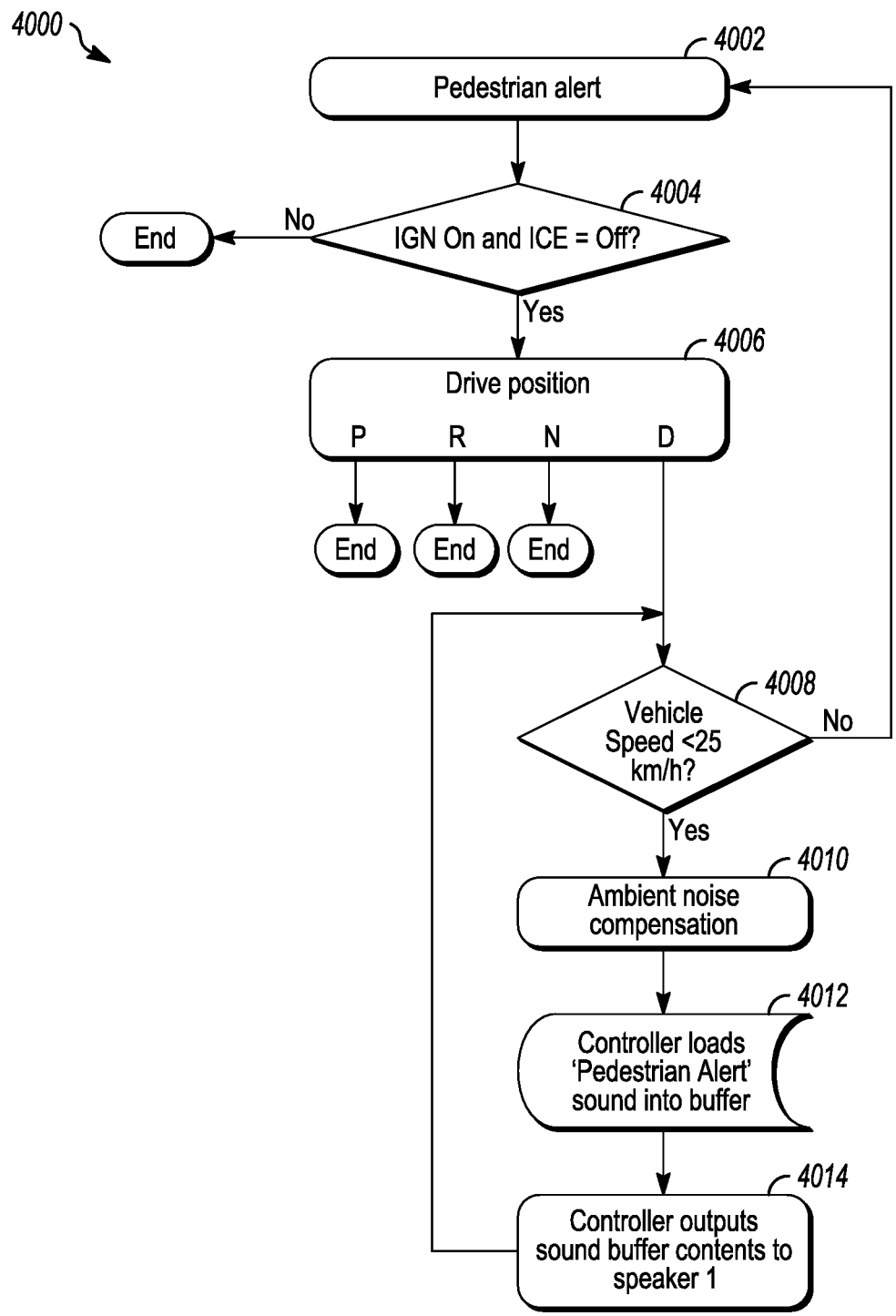
FIG. 40 is a flow diagram generally illustrating an alternative vehicle alert generation method according to the principles of the present disclosure.

FIG. 40 is a flow diagram generally illustrating an alternative vehicle alert generation method 4000 according to the principles of the present disclosure. The method 4000 may be configured to alert pedestrians and bystanders that an electric vehicle is approaching, maneuvering, or leaving their vicinity. At 4002, the method 4000 begins. At 4004, the method 4000 determines whether an ignition and an engine/motor of the vehicle are both off. For example, the system 100 determines whether the ignition and the engine/motor of the vehicle are off based on the various sensor data. If the system 100 determines that the ignition and the engine/motor are both off, the method 4000 ends.

If the system 100 determines that the ignition and the engine/motor are both on, the method 4000 continues at 4006. At 4006, the method 4000 determines a drive or propulsion position (e.g., the drive or propulsion position may be referred to as any suitable position configured to propel the vehicle forward) of the vehicle. For example, the system 100 determines whether the vehicle is in park, reverse, neutral or drive based on the various sensor data. If the system 100 determines that the vehicle is in park, neutral, or reverse the method 4000 ends. If the system 100 determines that the vehicle is in drive, the method 4000 continues at 4008. In some embodiments, the vehicle may include an alternative fuel system, such as Hybrid, EV, Fuel Cell or other suitable alternative fuel system. The vehicle may use an alternate method of drive designations other than Part, Neutral, Drive, and Reverse. Such alternate designations may be used interchangeably (e.g., propulsion instead of drive).

At 4008, the method 4000 determines whether the vehicle speed is below a threshold. For example, the system 100 determines whether the vehicle speed is less than 25 kilometers per hour, or other suitable speed, based on the various sensor data. If the system 100 determines that the vehicle speed is greater than the threshold, the method 4000 continues at 4002. If the system 100 determines that the vehicle speed is less than the threshold, the method 4000 continues at 4010.

At 4010, the method 400 applies an ambient noise compensation. For example, the system 100 determines the loudness of the sound based on the various sensor data. At 4012, the method 4000 loads a sound into a buffer. For example, the system 100 loads a sound corresponding to a pedestrian alert into the buffer. At 4014, the method 4000 outputs the sound buffer contents. For example, the system 100 outputs the sound in the buffer to the devices 118.

Figure 41:
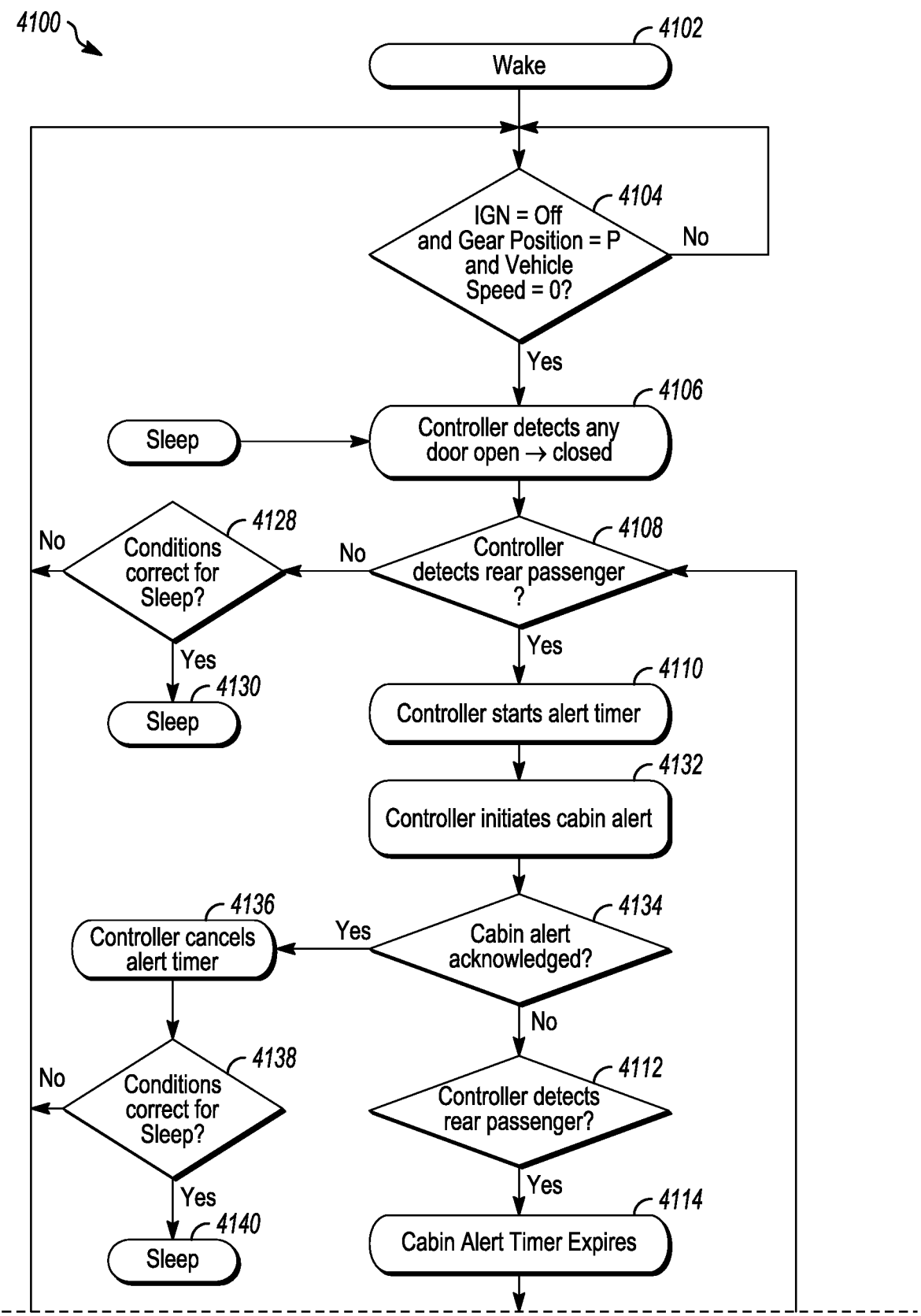
FIG. 41 is a flow diagram generally illustrating an alternative vehicle alert generation method according to the principles of the present disclosure.
Figure 41:
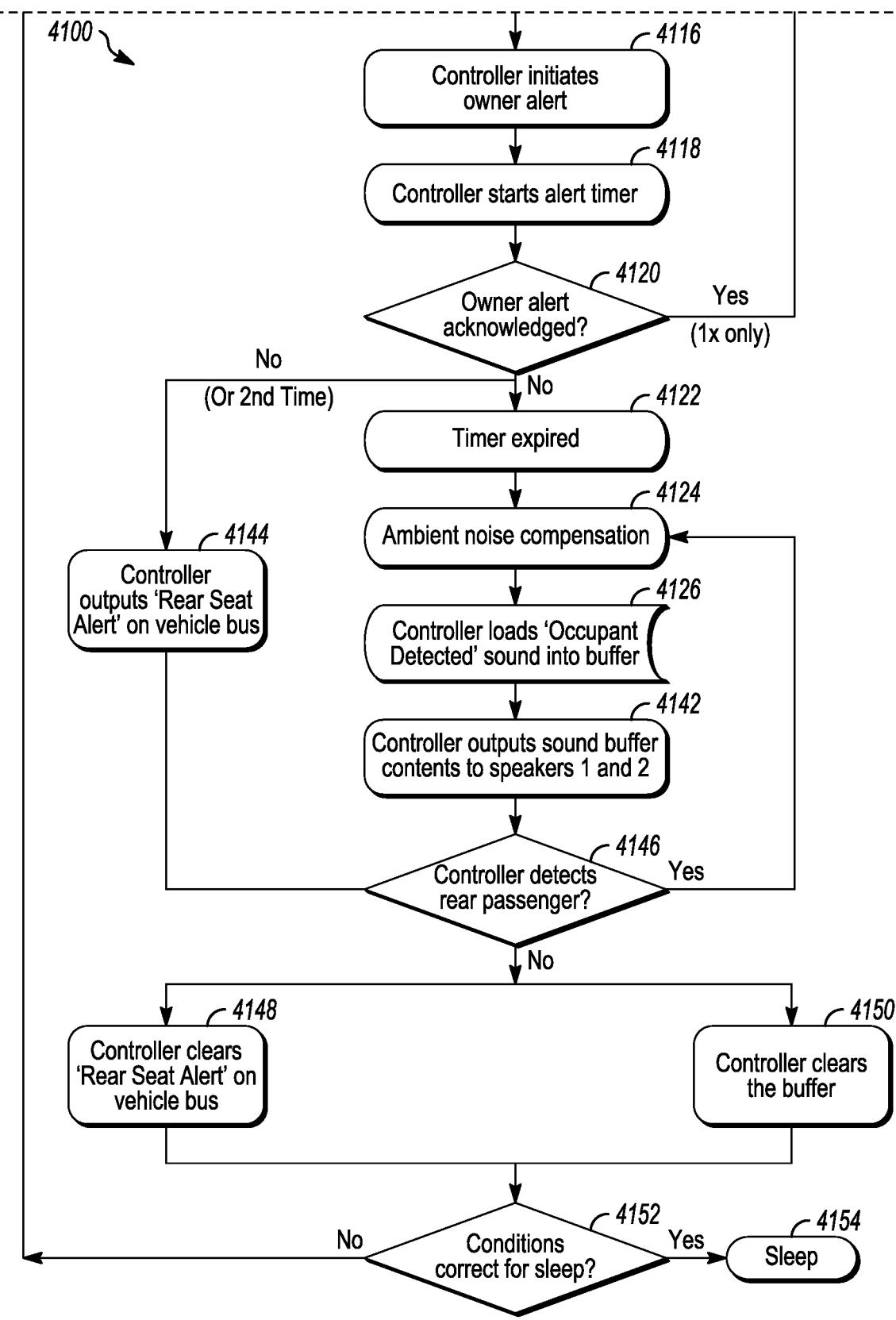

FIG. 41 is a flow diagram generally illustrating an alternative vehicle alert generation method 4100 according to the principles of the present disclosure. The method 4100 may be configured to generate an alert intended to notify or indicate to a vehicle operator of a person or animal that is left in the rear seat of a vehicle. At 4102, the method 4100 begins or wakes (e.g., initiates).

At 4104, the method 4100 determines whether the ignition is off and the vehicle gear position is park and the vehicle speed is 0. For example, the system determines whether the ignition is off and the vehicle gear position is park and the vehicle speed is 0 based on the various sensor data. If the system 100 determines all are not true, the method 4100 continues at 404. If the system 100 determines all are true, the method 4100 continues at 4106.

At 4106, the method 4100 detects whether any door of the vehicle opened and closed. For example, the system 100 determines whether any door of the vehicle opened and closed using the various sensor data. If the system 100 detects that any door of the vehicle opened and closed, the method 4100 continues at 4108.

At 4108, the method 4100 determines whether an occupant is in a rear seat of the vehicle. For example, the system 100 determines, using sensor data and/or one or more signals or messages from an associated controller, sensor, and the like, whether an occupant is in a rear seat of the vehicle. If the system 100 determines that an occupant is in a rear seat of the vehicle, the method 4100 continues at 4110. If the system 100 determines that no occupant is in any rear seat of the vehicle, the method 4100 continues at 4128. At 4128, the method 4100 determines whether conditions are correct for sleep. For example, the system 100 determines whether conditions are correct to allow the system 100 or a portion of the system 100 to sleep. If the system 100 determines the conditions are correct for sleep, the method continues at 4130. If the system 100 determines the conditions are not correct for sleep, the method 4100 continues at 4104. At 4130, the method 4100 sleeps. For example, the system 100 initiates a sleep function.

At 4110, the method 4100 starts an alert timer. For example, the system 100 starts an alert timer. The alert timer may include any suitable timer. At 4132, the method 4100 initiates a cabin alert. For example, the system 100 may generate an alert. The alert may include an audible alert, a visual alert, and/or other suitable alert. The system 100 may provide the alert to an output device within the cabin of the vehicle. The output device may include a speaker, a display, and/or other suitable output device. At 4134, the method 4100 determines whether the cabin alert was acknowledged. For example, the system 100 may determine whether the cabin alert has been acknowledged by the operator or other occupant of the vehicle. The operator or other occupant of the vehicle may acknowledge the cabin alert by interacting with an interface within the vehicle, such as a display or other suitable interface. The system 100 may receive a signal indicating that the operator or other occupant of the vehicle acknowledged the cabin alert. If the system 100 determines that the cabin alert has been acknowledged, the method 4100 continues at 4136. If the system 100 determines that the cabin alert has not been acknowledged, the method 4100 continues at 4112.

At 4136, the method 4100 cancels the alert timer. For example, the system 100 cancels the alert timer. At 4138, the method 4100 determines whether conditions are correct for sleep. For example, the system 100 determines whether conditions are correct to allow the system 100 or a portion of the system 100 to sleep. If the system 100 determines the conditions are correct for sleep, the method continues at 4140. If the system 100 determines the conditions are not correct for sleep, the method 4100 continues at 4104. At 4140, the method 4100 sleeps. For example, the system 100 initiates a sleep function.

At 4112, the method 4100 determines whether an occupant is in a rear seat of the vehicle. For example, the system 100 determines whether the previously detected occupant and/or another occupant is still in the rear seat of the vehicle. If the system 100 determines that no occupant is in any rear seat of the vehicle, the method 4100 continues at 4136. If the system 100 determines that the previously detected occupant or another occupant is in a rear seat of the vehicle, the method 4100 continues at 4114.

At 4114, the timer expires. At 4116, the method 4100 initiates an owner alert. For example, the system 100 may generate an owner alert. The owner alert may include an audible alert, a visual alert, and/or other suitable alert. The system 100 may provide the owner alert to a device associated with an owner of the vehicle, such as a mobile computing device, or other suitable device. For example, the system 10 may provide the owner alert (e.g., at a speaker, a display, or other suitable output device) at a smartphone associated with the owner.

At 4118, the method 4100 initiates an alert timer. At 4120, the method 4100 determines whether the owner alert has been acknowledged and/or whether a door opened or closed a second time. For example, the system 100 determines whether the owner alert has been acknowledged by the owner, operator, or other occupant of the vehicle. The owner, operator, or other occupant of the vehicle may acknowledge the owner alert by interacting with an interface on the device associated with the owner, such as a display or other suitable interface. The system 100 may receive a signal indicating that the owner, operator, or other occupant of the vehicle acknowledged the owner alert. If the system 100 determines that the owner alert has not been acknowledged, the method 4100 continues at 4122. If the system 100 determines that the owner alert has been acknowledged the method 4100 continues at 4108 and this acknowledgement is stored in the memory of the system 100. If the owner alert has been acknowledged a second time and the system 100 still detects a rear passenger, the method 4100 continues at 4144.

At 4122, the timer expires. At 4124, the method 4100 generates an ambient noise compensation. For example, the system 100 applies an ambient noise compensation. For example, the system 100 determines the loudness of the sound based on the various sensor data. At 4126, the method 4100 loads an occupant detected sound into the buffer. For example, the system 100 loads the occupant-detected sound into the buffer. At 4142, the method 4100 outputs the contents of the buffer. For example, the system 100 outputs the contents of the buffer to the input/output devices 118.

At 4146, the method 4100 determines whether an occupant is in a rear seat of the vehicle. For example, the system 100 determines whether an occupant is in a rear seat of the vehicle from the various sensor data. If the system 100 determines that an occupant is in a rear seat of the vehicle, the method 4100 continues at 4124. If the system 100 determines that no occupant is in any rear seat of the vehicle, the method 4100 continues at 4148 and 4150.

At 4144, the method 4100 outputs a rear seat alert on the vehicle bus. For example, the system 100 may generate a rear seat alert. The rear seat alert may include any suitable alert, such as those described herein. The system 100 outputs the rear seat alert on the vehicle bus.

At 4148, the method 4100 clears the rear seat alert from the vehicle bus. For example, the system 100 clears the rear seat alert from the vehicle bus. At 4150, the method 4100 clears the buffer. For example, the system 100 clears the buffer. At 4152, the method 4100 determines whether conditions are correct for sleep. For example, the system 100 determines whether conditions are correct to allow the system 100 or a portion of the system 100 to sleep. If the system 100 determines the conditions are correct for sleep, the method continues at 4154. If the system 100 determines the conditions are not correct for sleep, the method 4100 continues at 4104. At 4154, the method 4100 sleeps. For example, the system 100 initiates a sleep function.

Figure 42:
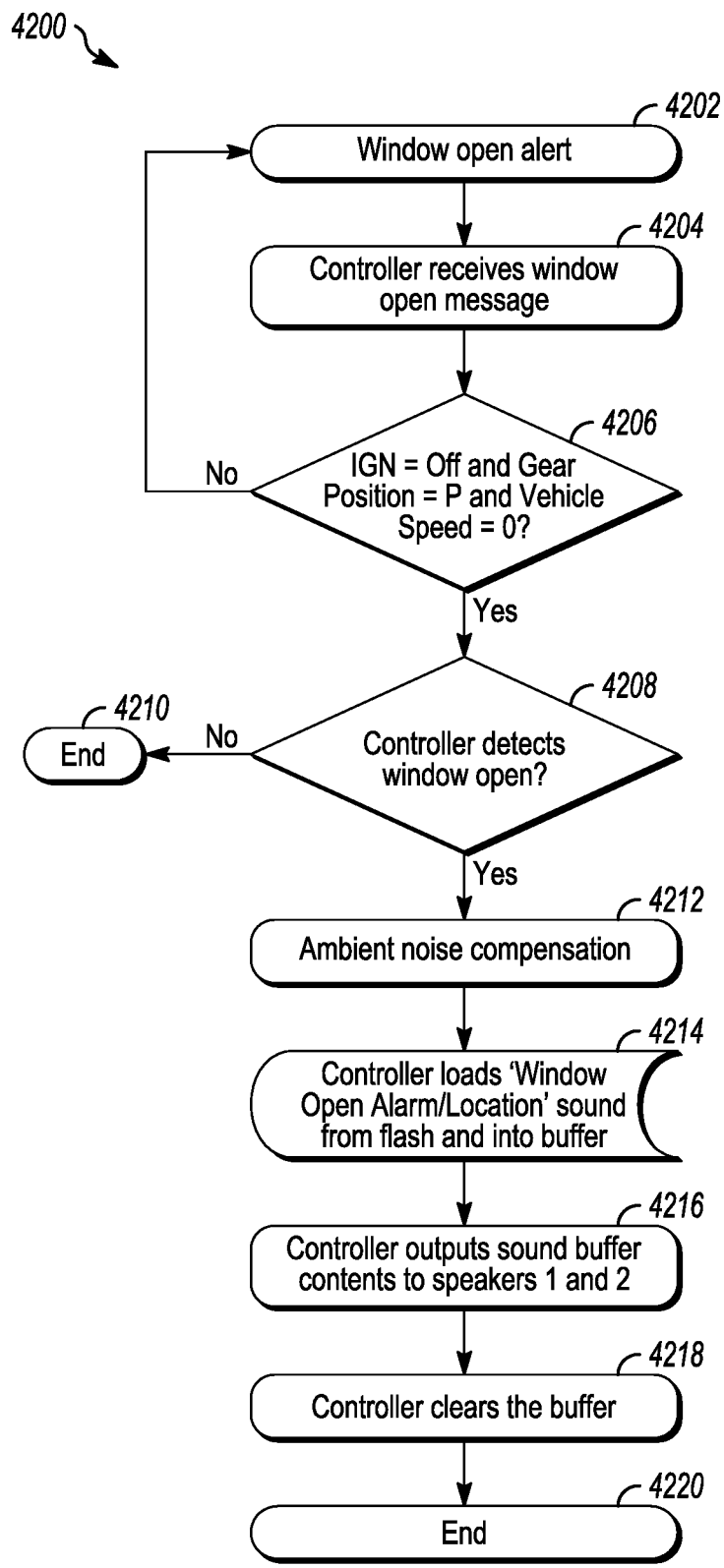
FIG. 42 is a flow diagram generally illustrating an alternative vehicle alert generation method according to the principles of the present disclosure.

FIG. 42 is a flow diagram generally illustrating an alternative vehicle alert generation method 4200 according to the principles of the present disclosure. The method 4200 may be configured to inform the operator if the windows of the vehicle are open. At 4202, the method 4200 begins. At 4204, the method 4200 receives a sunroof open message. For example, the system 100 receives the sunroof open message and determines the sunroof is open based on the various sensor data. At 4206, the method 4200 determines whether the ignition is off, the gear position is park and the vehicle speed is equal to 0. For example, the system 100 determines whether the ignition is off, the gear position is park and the vehicle speed is equal to 0 based on various sensor data. If false, the method 4200 continues at 4202. If true, the method 4200 continues at 4208.

At 4208, the method 4100 determine whether a window of the vehicle is open. For example, the system 100 determines, using various sensor data, whether a window of the vehicle is open. If the system 100 determines that a window of the vehicle is open, the method 4200 continues at 4212. If the system 100 determines that no windows of the vehicle are open, the method 4200 continues at 4210. At 4210, the method 4200 ends.

At 4212, the method 4200 applies an ambient noise compensation. For example, the system 100 determines the loudness of the sound based on the various sensor data. At 4214, the method 4200 loads a window open alarm/location sound into the buffer. For example, the system 100 loads the window open alarm/location sound into the buffer. At 4216, the method 4200 outputs the contents of the buffer. For example, the system 100 outputs the contents of the buffer to the input/output devices 118. At 4218, the method 4200 clears the buffer. For example, the system 100 clears the buffer. At 4220, the method 4200 ends.

Figure 43:
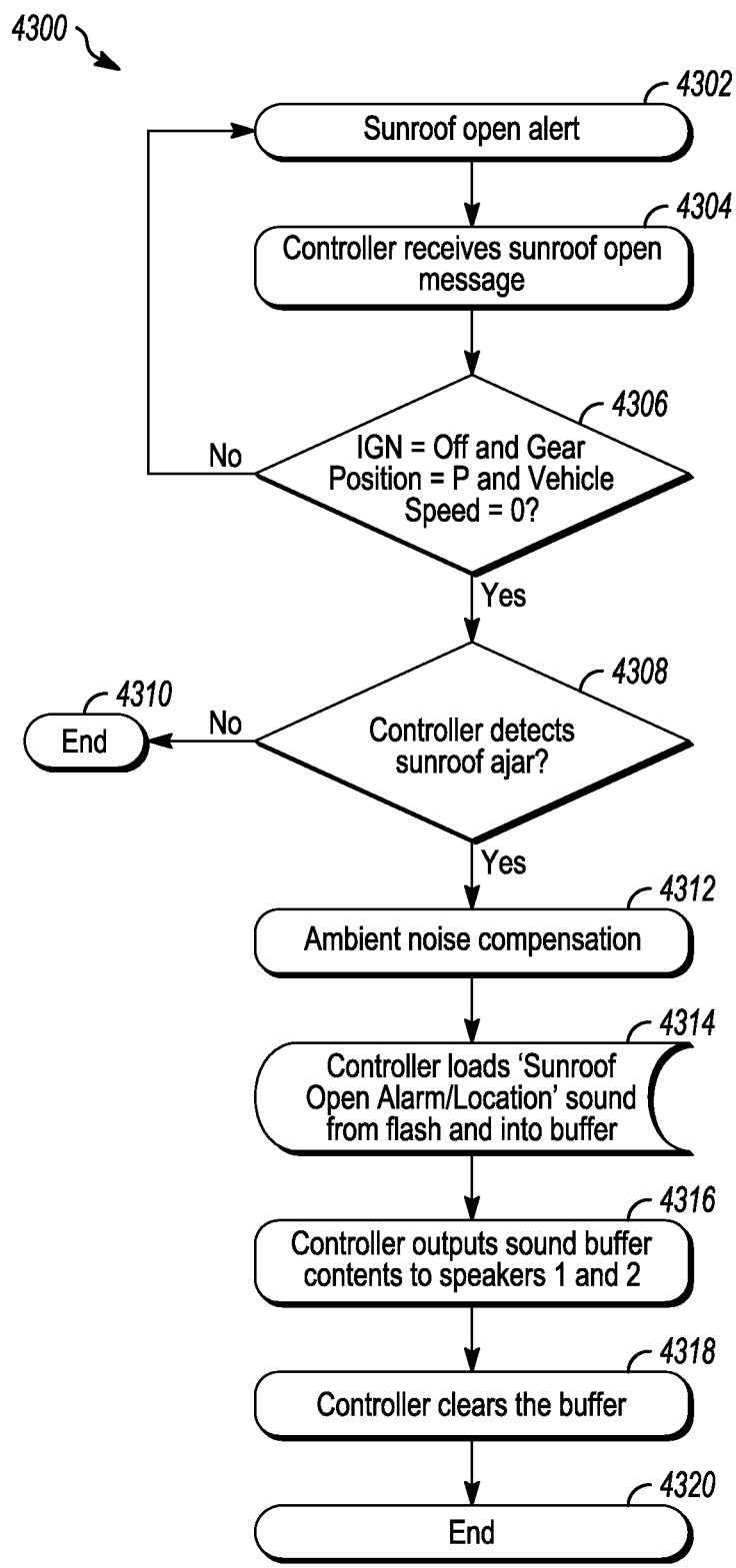
FIG. 43 is a flow diagram generally illustrating an alternative vehicle alert generation method according to the principles of the present disclosure.

FIG. 43 is a flow diagram generally illustrating an alternative vehicle alert generation method 4300 according to the principles of the present disclosure. The method 4300 may be configured to inform the operator if a sunroof of the vehicle is open. At 4302, the method 430 begins. At 4304, the method 4300 receives a sunroof open message. For example, the system 100 receives the sunroof open message and determines the sunroof is open based on the various sensor data.

At 4306, the method 4300 determines whether the ignition is off, the gear position is park and the vehicle speed is equal to 0. For example, the system 100 determines whether the ignition is off, the gear position is park and the vehicle speed is equal to 0 based on various sensor data. If false, the method 4300 continues at 4302. If true, the method 4300 continues at 4308.

At 4308, the method 4300 determines whether the sunroof of the vehicle is open. For example, the system 100 determines, using various sensor data, whether the sunroof of the vehicle is open. If the system 100 determines that the sunroof of the vehicle is open, the method 4300 continues at 4312. If the system 100 determines that the sunroof of the vehicle is not open, the method 4300 continues at 4310 At 4310, the method 4300 ends.

At 4312, the method 4300 applies an ambient noise compensation. For example, the system 100 determines the loudness of the sound based on the various sensor data. At 4314, the method 4300 loads a sunroof open alarm/location sound into the buffer. For example, the system 100 loads the sunroof open alarm/location sound into the buffer. At 4316, the method 4300 outputs the contents of the buffer. For example, the system 100 outputs the contents of the buffer to the input/output devices 118. At 4318, the method 4300 clears the buffer. For example, the system 100 clears the buffer. At 4320, the method 4300 ends.

Figure 44:
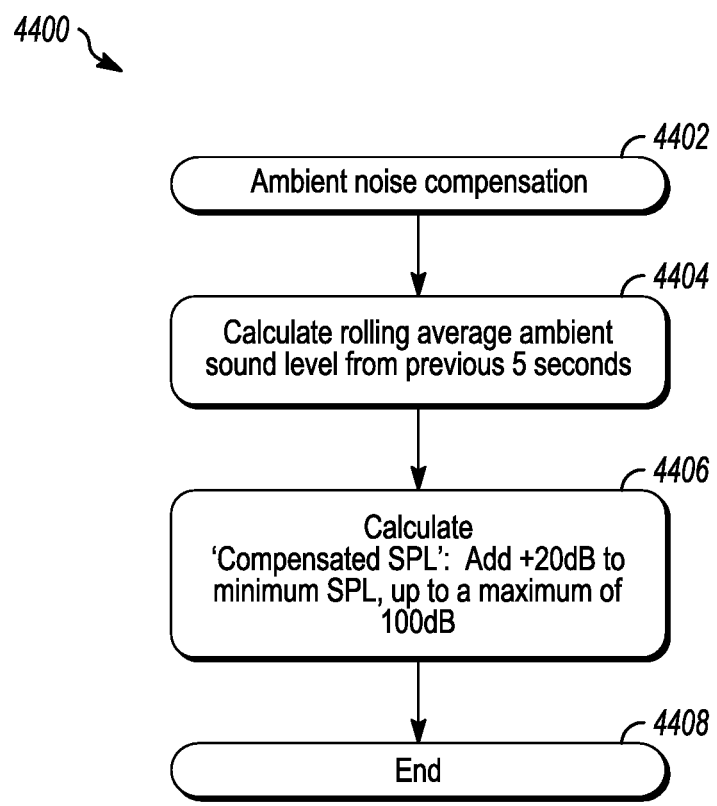
FIG. 44 is a flow diagram generally illustrating an alternative vehicle alert generation method according to the principles of the present disclosure.

FIG. 44 is a flow diagram generally illustrating an alternative vehicle alert generation method 4400 according to the principles of the present disclosure. The method 440 may be configured to provide ambient noise compensation. At 4402, the method 4404 begins. At 4404, the method 4400 calculates rolling average ambient sound level from previous period. For example, the system 100 calculates a rolling average ambient sound level (e.g., using various sensors configured to detect ambient sound levels internal to or external from the vehicle) during a predetermined period. The predetermined period may include any suitable period, such as 5 seconds, 10 seconds, and the like At 4406, the method 4400 calculates a compensation Sound Pressure Level (SPL) and adds a compensation value to a minimum SPL. For example, the system 100 calculates a compensation SPL based on the average rolling ambient sound level. The system 100 adds a compensation value, such as 20 dB or other suitable value, to a minimum SPL (e.g., up to a maximum of 100 dB). At 4408, the method 4400 ends.

Figure 45:
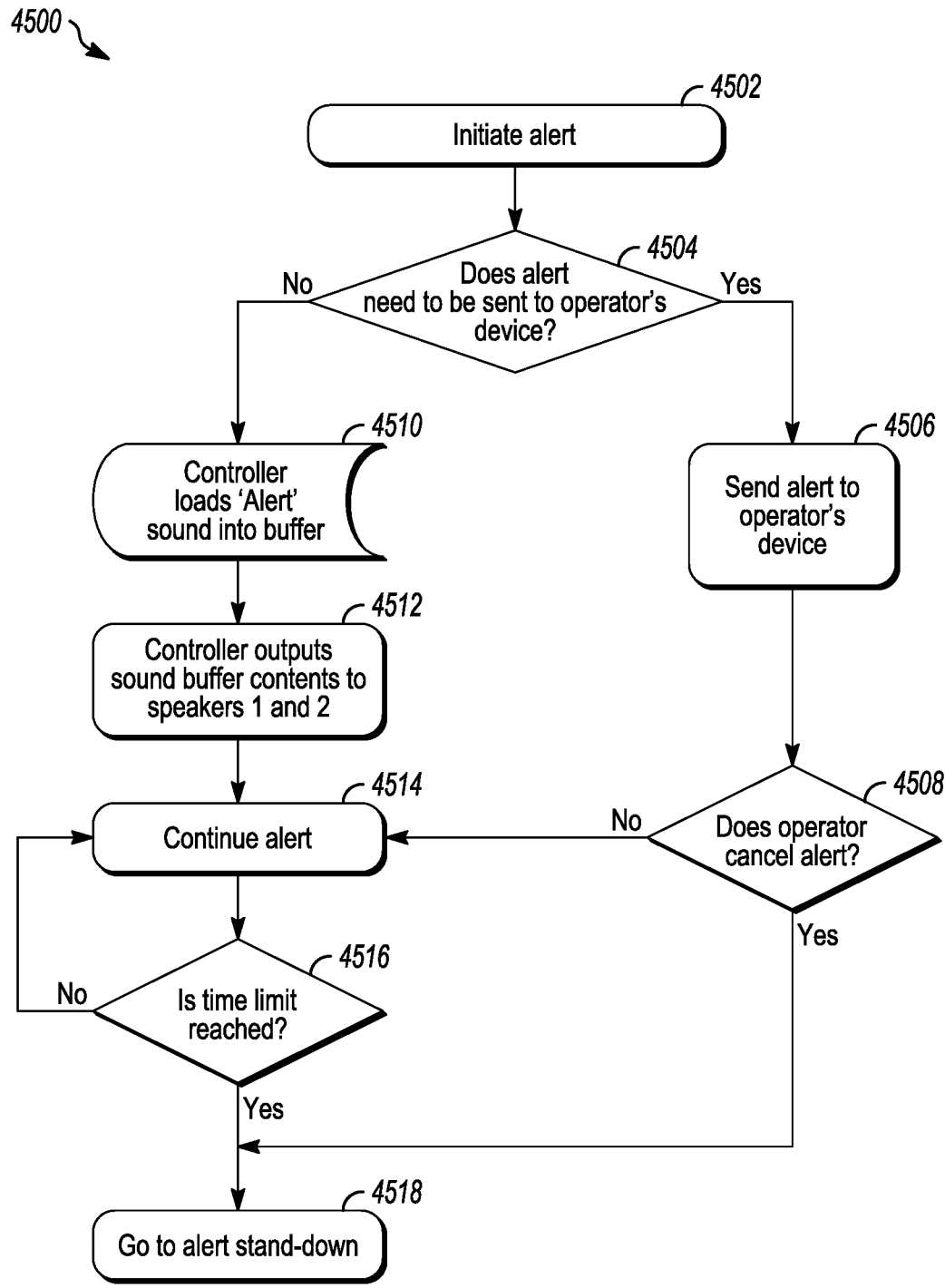
FIG. 45 is a flow diagram generally illustrating an alternative vehicle alert generation method according to the principles of the present disclosure.

FIG. 45 is a flow diagram generally illustrating an alternative vehicle alert generation method 4500 according to the principles of the present disclosure. The method 4500 may be configured to initiate an alert. At 4502, the method 4500 begins. At 4504, the method 4500 determines whether an alert should be sent to a device associated with the operator of the vehicle. For example, the system 100 determines, based on various sensor data and/or signals generated within the system 100 or external to the system 100, whether an alert (e.g., any alert described herein and generated or retrieved by the system 100) should be sent to the device associated with the operator of the vehicle. If the system 100 determines that an alert should be sent to the device associated with the operator, the method 4500 continues at 4506. If the system 100 determines that an alert should not be sent to the device, the method 4500 continues at 4510.

At 4506, the method 4500 sends the alert to the device associated with the operator. For example, the system 100 sends the alert to the device associated with the operator. At 4508, the method 4500 determines whether the operator has cancelled the alert. For example, the system 100 determines whether the operator has cancelled the alert. The operator may cancel the alert using any suitable technique. If the system 100 determines the operator cancelled the alert, the method 4500 continues at 4518. If the system 100 determines that the operator has not cancelled the alert, the method 4500 continues at 4514.

At 4510, the method 4500 loads the alert sound into the buffer. For example, the system 100 loads the sound associated with the alert into the buffer. At 4512, the method

4500 outputs the contents of the buffer. For example, the system 100 outputs the contents of the buffer to the input/output devices 118. At 4514, the method 4500 continues the alert. At 4516, the method 4500 determines whether a time limit has been reached. For example, the system 100 determines whether a time limit has been reached. If the system 100 determines that the time limit has been reached, the method 4500 continues at 4518. If the system 100 determines that the time limit has not been reached, the method 4500 continues at 4514. At 4518, the method 4500 goes to an alert stand-down. For example, the system 100 clears the buffers and/or discontinues the alert.

In some embodiments, any of the sounds described herein may be customizable based on operator or user input. Additionally, or alternatively, any of the embodiments described herein may be combined without limitation.

In some embodiments, a system for providing vehicle alerts includes a processor and a memory. The memory includes instructions that, when executed by the processor, cause the processor to: receive various input data; analyze the various input data; generate one or more output signals based on the analysis of the various input data; and selectively control one or more acoustic output devices using the one or more output signals.

In some embodiments, a system for providing vehicle alerts includes a processor and a memory. The memory includes instructions that, when executed by the processor, cause the processor to: receive an ignition signal indicating a current status of an ignition of a vehicle; receive a gear position signal indicating a current gear position of a transmission of the vehicle; receive a vehicle speed signal indicating a current vehicle speed of the vehicle; identify a vehicle alert data file based on at least the ignition signal, the gear position signal, the vehicle speed signal; retrieve the vehicle alert data file from a vehicle alert database; load data associated with the vehicle alert data file into a buffer; and output contents of the buffer to at least one output device of the vehicle.

In some embodiments, the at least one output device includes an audio output device. In some embodiments, the at least one output device is disposed within a cabin of the vehicle. In some embodiments, the at least one output device is disposed on an external portion of the vehicle. In some embodiments, the instructions further cause the processor to, in response to a determination that: the ignition signal indicates that the current status of the ignition is on; the gear position signal indicating the current gear position of the transmission is one of drive and reverse; and the vehicle speed signal indicates that the vehicle speed is greater than 0; determine whether an object is within a sensor range of the vehicle. In some embodiments, the vehicle alert data file corresponds to a collision vehicle alert data file in response to a determination that the object is within the sensor range of the vehicle. In some embodiments, the instructions further cause the processor to, in response to a determination that: the ignition signal indicates that the current status of the ignition is off; the gear position signal indicating the current gear position of the transmission is park; the vehicle speed signal indicates that the vehicle speed is 0; and a vehicle door signal indicates that a vehicle door is in an open condition; determine, based on a rear occupant signal, whether a first occupant is present in a rear seat of the vehicle. In some embodiments, the instructions further cause the processor to determine, after a predetermined period, whether a front occupant signal indicates that a second occupant is present in a front seat of the vehicle, and, in response to a determination that the front occupant signal indicates that the second occupant is not in the front seat of the vehicle and in response to a determination that the, after the predetermine period, a subsequent rear occupant signal indicates that the first occupant is present in the rear seat of the vehicle, determine an ambient noise compensation value based on ambient noise detected in an environment external to the vehicle. In some embodiments, the vehicle alert data file corresponds to an occupant detected vehicle alert data file.

In some embodiments, a method for providing vehicle alerts may include receiving an ignition signal indicating a current status of an ignition of a vehicle and receiving a gear position signal indicating a current gear position of a transmission of the vehicle. The method may also include receiving a vehicle speed signal indicating a current vehicle speed of the vehicle and identifying a vehicle alert data file based on at least the ignition signal, the gear position signal, the vehicle speed signal. The method may also include retrieving the vehicle alert data file from a vehicle alert database and loading data associated with the vehicle alert data file into a buffer. The method may also include outputting contents of the buffer to at least one output device of the vehicle.

In some embodiments, the at least one output device includes an audio output device. In some embodiments, the at least one output device is disposed within a cabin of the vehicle. In some embodiments, the at least one output device is disposed on an external portion of the vehicle. In some embodiments, the method may also include, in response to a determination that: the ignition signal indicates that the current status of the ignition is on; the gear position signal indicating the current gear position of the transmission is one of drive and reverse; and the vehicle speed signal indicates that the vehicle speed is greater than 0, determining whether an object is within a sensor range of the vehicle. In some embodiments, the vehicle alert data file corresponds to a collision vehicle alert data file in response to a determination that the object is within the sensor range of the vehicle. In some embodiments, the method may also include, in response to a determination that: the ignition signal indicates that the current status of the ignition is off; the gear position signal indicating the current gear position of the transmission is park; the vehicle speed signal indicates that the vehicle speed is 0; and a vehicle door signal indicates that a vehicle door is in an open condition, determining, based on a rear occupant signal, whether a first occupant is present in a rear seat of the vehicle. In some embodiments, the method may also include determining, after a predetermined period, whether a front occupant signal indicates that a second occupant is present in a front seat of the vehicle, and, in response to a determination that the front occupant signal indicates that the second occupant is not in the front seat of the vehicle and in response to a determination that the, after the predetermine period, a subsequent rear occupant signal indicates that the first occupant is present in the rear seat of the vehicle, determining an ambient noise compensation value based on ambient noise detected in an environment external to the vehicle. In some embodiments, the vehicle alert data file corresponds to an occupant detected vehicle alert data file.

In some embodiments, a vehicle alert system includes a processor and a memory. The memory includes instructions that, when executed by the processor, cause the processor to: receive an ignition signal indicating a current status of an ignition of a vehicle; receive a gear position signal indicating a current gear position of a transmission of the vehicle; identify a vehicle alert data file based on at least the ignition signal and the gear position signal; load data associated with the vehicle alert data file into a buffer; output contents of the buffer to at least one output device of the vehicle; and clear the contents of the buffer.

In some embodiments, the at least one output device includes an audio output device.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for providing vehicle alerts, the system comprising:
   a processor; and
   a memory that includes instructions that, when executed by the processor, cause the processor to:
      receive an ignition signal indicating a current status of an ignition of a vehicle;
      receive a gear position signal indicating a current gear position of a transmission of the vehicle;
      receive a vehicle speed signal indicating a current vehicle speed of the vehicle;
      identify a first vehicle alert data file based on at least the ignition signal, the gear position signal, the vehicle speed signal;
      retrieve the first vehicle alert data file from a vehicle alert database;
      load data associated with the first vehicle alert data file into a buffer;
      output contents of the buffer to at least one output device of the vehicle;
      in response to receiving a distress signal:
         identify a second vehicle alert data file based on the distress signal;
         retrieve the second vehicle alert data file from the vehicle alert database;
         load data associated with the second vehicle alert data file into the buffer; and
         output the contents of the buffer to the at least one output device of the vehicle;
      in response to receiving a window open signal:
         determine a position of the vehicle in response to a determination that inclement weather is proximate the vehicle;
         retrieve, in response to the position of the vehicle indicating that the vehicle is in a location affected by the inclement weather, a third vehicle alert data file from the vehicle alert database;
         load data associated with the third vehicle alert data file into the buffer;
         output the contents of the buffer to the at least one output device of the vehicle; and discard the window open signal in response to the position of the vehicle indicating that the vehicle is in a location unaffected by the inclement weather, and in response to a determination that (i) the ignition signal indicates that the current status of the ignition is off, (ii) the gear position signal indicating the current gear position of the transmission is park, (iii) the vehicle speed signal indicates that the current vehicle speed is 0, and iv a vehicle door signal indicates that a vehicle door is in an open condition;

determine, based on a rear occupant signal, whether a first occupant is present in a rear seat of the vehicle;

determine, after a predetermined period, whether a front occupant signal indicates that a second occupant is present in a front seat of the vehicle;

in response to a determination that the front occupant signal indicates that the second occupant is not in the front seat of the vehicle and in response to a determination that, after the predetermine period, a subsequent rear occupant signal indicates that the first occupant is present in the rear seat of the vehicle, determine an ambient noise compensation value based on ambient noise detected in an environment external to the vehicle;

retrieve a fourth vehicle alert data file, adjust the fourth vehicle alert date file using the ambient noise compensation value;

load data associated with the adjusted fourth vehicle alert data file into the buffer; and output the contents of the buffer to the at least one output device of the vehicle.

2. The system of claim 1, wherein the at least one output device includes an audio output device.

3. The system of claim 1, wherein the at least one output device is disposed within a cabin of the vehicle.

4. The system of claim 1, wherein the at least one output device is disposed on an external portion of the vehicle.

5. The system of claim 1, wherein the instructions further cause the processor to, in response to a determination that:
the ignition signal indicates that the current status of the ignition is on,
the gear position signal indicating the current gear position of the transmission is one of drive and reverse, and
the vehicle speed signal indicates that the current vehicle speed is greater than 0, determine whether an object is within a sensor range of the vehicle.

6. The system of claim 5, wherein the first vehicle alert data file corresponds to a collision vehicle alert data file in response to a determination that the object is within the sensor range of the vehicle.

7. The system of claim 1, wherein the first vehicle alert data file corresponds to an occupant detected vehicle alert data file.

8. A method for providing vehicle alerts, the method comprising:
receiving an ignition signal indicating a current status of an ignition of a vehicle;
receiving a gear position signal indicating a current gear position of a transmission of the vehicle;
receiving a vehicle speed signal indicating a current vehicle speed of the vehicle;
identifying a first vehicle alert data file based on at least the ignition signal, the gear position signal, the vehicle speed signal;

retrieving the first vehicle alert data file from a vehicle alert database;
loading data associated with the first vehicle alert data file into a buffer;
outputting contents of the buffer to at least one output device of the vehicle;
in response to receiving a distress signal:
identifying a second vehicle alert data file based on the distress signal;
retrieving the second vehicle alert data file from the vehicle alert database;
loading data associated with the second vehicle alert data file into the buffer; and
outputting the contents of the buffer to the at least one output device of the vehicle;
in response to receiving a window open signal:
determining a position of the vehicle in response to a determination that inclement weather is proximate the vehicle;
retrieving, in response to the position of the vehicle indicating that the vehicle is location affected by the inclement weather, a third vehicle alert data file from the vehicle alert database;
loading data associated with the third vehicle alert data file into the buffer;
outputting the contents of the buffer to the at least one output device of the vehicle; and
discarding the window open signal in response to the position of the vehicle indicating that the vehicle is in a garage; and
in response to a determination that (i) the ignition signal indicates that the current status of the ignition is off, (ii) the gear position signal indicating the current gear of the transmission is park, (iii) the vehicle speed signal indicates that the current vehicle speed is 0, and (iv) a vehicle door signal indicates that a vehicle door is in an open condition;
determining, based on a rear occupant signal, whether a first occupant is present in a rear seat of the vehicle;
determining, after a predetermined period, whether a front occupant signal indicates that a second occupant is present in a front seat of the vehicle;
in response to a determination that the front occupant signal indicates that the second occupant is not in the front seat of the vehicle and in response to a determination that, after the predetermine period, a subsequent rear occupant signal indicates that the first occupant is present in the rear seat of the vehicle, determining an ambient noise compensation value based on ambient noise detected in an environment external to the vehicle,
retrieving a fourth vehicle alert data file;
adjusting the fourth vehicle alert date file using the ambient noise compensation value;
loading data associated with the adjusted fourth vehicle alert data file into the buffer; and
outputting the contents of the buffer to the at least one output device of the vehicle.

9. The method of claim 8, wherein the at least one output device includes an audio output device.

10. The method of claim 8, wherein the at least one output device is disposed within a cabin of the vehicle.

11. The method of claim 8, wherein the at least one output device is disposed on an external portion of the vehicle.

12. The method of claim 8, further comprising, in response to a determination that:

the ignition signal indicates that the current status of the ignition is on, the gear position signal indicating the current gear position of the transmission is one of drive and reverse, and the vehicle speed signal indicates that the current vehicle speed is greater than 0, determining whether an object is within a sensor range of the vehicle.

13. The method of claim 12, wherein the first vehicle alert data file corresponds to a collision vehicle alert data file in response to a determination that the object is within the sensor range of the vehicle.

14. The method of claim 8, wherein the first vehicle alert data file corresponds to an occupant detected vehicle alert data file.

15. A vehicle alert system comprising:
a processor; and
a memory that includes instructions that, when executed by the processor, cause the processor to:
receive an ignition signal indicating a current status of an ignition of a vehicle;
receive a gear position signal indicating a current gear position of a transmission of the vehicle;
identify a first vehicle alert data file based on at least the ignition signal and the gear position signal;
output a signal associated with the first vehicle alert data file to at least one output device of the vehicle;
in response to receiving a distress signal:
identify a second vehicle alert data file based on the distress signal; and
output a signal associate with the second vehicle alert data file to the at least one output device of the vehicle; and
in response to receiving a window open signal:
determine a position of the vehicle in response to a determination that inclement weather is proximate the vehicle;
identify, in response to the position of the vehicle indicating that the vehicle is in a location affected by the inclement weather, a third vehicle alert data file based on the window open signal; and output a signal associated with the third vehicle alert data file to the at least one output device of the vehicle; and discard the window open signal in response to the position of the vehicle indicating that the vehicle is in a location unaffected by the inclement weather; and in response to a determination that (i) the ignition signal indicates that the current status of the ignition is off, (ii) the gear position signal indicating the current gear position of the transmission is park, (iii) the vehicle speed signal indicates that the current vehicle speed is 0, and (iv) a vehicle door signal indicates that a vehicle door is in an open condition;

determine, based on a rear occupant signal, whether a first occupant is present in a rear seat of the vehicle;

determine, after a predetermined period, whether a front occupant signal indicates that a second occupant is present in a front seat of the vehicle; and in response to a determination that the front occupant signal indicates that the second occupant is not in the front seat of the vehicle and in response to a determination that, after the predetermine period, a subsequent rear occupant signal indicates that the first occupant is present in the rear seat of the vehicle, determine an ambient noise compensation value based on ambient noise detected in an environment external to the vehicle;

identify a fourth vehicle alert data file based on the read occupant signal;

adjust the fourth vehicle alert date file using the ambient noise compensation value; and output a signal associated with the fourth vehicle alert data file to the at least one output device of the vehicle.

16. The system of claim 15, wherein the at least one output device includes an audio output device.

* * * * *